United States Patent
Zhevelev et al.

(10) Patent No.: US 7,705,310 B2
(45) Date of Patent: Apr. 27, 2010

(54) PASSIVE INFRA-RED DETECTORS

(75) Inventors: Boris Zhevelev, Rishon LeZion (IL); Yaacov Kotlicki, Ramat Gan (IL); Michael Lahat, Kiryat Ono (IL)

(73) Assignee: Visonic Ltd., Tel Aviv-Yafo (IL)

( * ) Notice: Subject to any disclaimer, the term of this patent is extended or adjusted under 35 U.S.C. 154(b) by 163 days.

(21) Appl. No.: 11/744,176

(22) Filed: May 3, 2007

(65) Prior Publication Data

US 2009/0014654 A1    Jan. 15, 2009

Related U.S. Application Data

(63) Continuation of application No. 10/596,695, filed as application No. PCT/IL2006/000356 on Mar. 20, 2006.

(60) Provisional application No. 60/664,231, filed on Mar. 21, 2005.

(51) Int. Cl.
G08B 13/193 (2006.01)
(52) U.S. Cl. ................................. 250/339.02
(58) Field of Classification Search ............ 250/339.02, 250/338.3, 342, 221
See application file for complete search history.

(56) References Cited

U.S. PATENT DOCUMENTS

| | | | |
|---|---|---|---|
| 3,524,180 A | 8/1970 | Crouse | |
| 3,958,118 A | 5/1976 | Schwarz | |
| 4,058,726 A | 11/1977 | Paschedag et al. | |
| 4,081,680 A | 3/1978 | Keller et al. | |
| 4,087,688 A | 5/1978 | Keller et al. | |
| 4,271,359 A | 6/1981 | Herwig et al. | |
| 4,375,034 A | 2/1983 | Guscott | |
| 4,429,224 A | 1/1984 | Wagli et al. | |
| 4,479,056 A | 10/1984 | Zierhut et al. | |
| 4,604,524 A | 8/1986 | Kotlicki et al. | |
| 4,614,938 A | 9/1986 | Weitman | |
| 4,645,930 A | 2/1987 | Zierhut et al. | |

(Continued)

FOREIGN PATENT DOCUMENTS

JP    408240482    9/1996

OTHER PUBLICATIONS

U.S. Appl. No. 60/664,231.

(Continued)

*Primary Examiner*—David P Porta
*Assistant Examiner*—Djura Malevic
(74) *Attorney, Agent, or Firm*—Darby & Darby P.C.

(57) ABSTRACT

A passive infra-red detector including at least three sub-detectors, each sub-detector being operative to receive infra-red radiation from a corresponding one of at least three sub fields-of-view, each sub field-of-view being exclusively defined by an optical element which does not define any other sub field of view, the sub fields-of-view being angled with respect to each other, adjacent ones of the sub fields-of-view being separated by a gap of no more than 30 degrees and at least one of the sub fields-of-view having at least one of the following characteristics: extending over no more then 45 degrees in azimuth; and including not more than three azimuthally distributed detection zones, and signal processing circuitry, operative to receive output signals from the sub detectors and to provide a motion detection output.

4 Claims, 48 Drawing Sheets

U.S. PATENT DOCUMENTS

| | | |
|---|---|---|
| 4,704,533 A | 11/1987 | Rose et al. |
| 4,709,152 A | 11/1987 | Muller et al. |
| 4,746,910 A | 5/1988 | Pfister et al. |
| 4,751,396 A | 6/1988 | Daigle et al. |
| 4,772,875 A | 9/1988 | Maddox et al. |
| 4,787,722 A | 11/1988 | Claytor |
| 4,912,748 A | 3/1990 | Horii et al. |
| 4,914,283 A | 4/1990 | Brinckmann et al. |
| 4,943,800 A | 7/1990 | Ikeda et al. |
| 5,077,549 A | 12/1991 | Hershkovitz et al. |
| 5,268,680 A | 12/1993 | Zantos |
| 5,296,707 A | 3/1994 | Nozu et al. |
| 5,465,080 A | 11/1995 | Liddiard et al. |
| 5,475,367 A | 12/1995 | Prevost et al. |
| 5,559,496 A | 9/1996 | Dubats |
| 5,570,079 A | 10/1996 | Dockery |
| 5,572,033 A | 11/1996 | Grant et al. |
| RE35,534 E | 6/1997 | Claytor |
| 5,693,943 A | 12/1997 | Tchernihovski et al. |
| 5,703,368 A | 12/1997 | Tomooka et al. |
| 5,757,270 A | 5/1998 | Mori et al. |
| 5,834,765 A | 11/1998 | Ashdown et al. |
| 5,844,240 A | 12/1998 | Lee et al. |
| 5,929,445 A | 7/1999 | Barone |
| 5,963,131 A | 10/1999 | D'Angelo et al. |
| 6,031,456 A | 2/2000 | Hanyuda et al. |
| 6,078,253 A | 6/2000 | Fowler |
| 6,150,658 A | 11/2000 | Hagiwara et al. |
| 6,163,025 A * | 12/2000 | Pantus ............... 250/338.3 |
| 6,211,522 B1 | 4/2001 | Kotlicki et al. |
| 6,215,399 B1 | 4/2001 | Shpater |
| 6,222,191 B1 | 4/2001 | Myron et al. |
| 6,239,437 B1 | 5/2001 | Barone |
| 6,262,661 B1 | 7/2001 | Mahler et al. |
| 6,324,008 B1 | 11/2001 | Baldwin et al. |
| 6,415,205 B1 | 7/2002 | Myron et al. |
| 6,653,635 B2 | 11/2003 | Liao et al. |
| 6,690,018 B1 | 2/2004 | Barone |
| 6,756,595 B2 | 6/2004 | Barone |
| 6,818,881 B1 | 11/2004 | Chernichovski et al. |
| 7,008,063 B2 | 3/2006 | Porter et al. |
| 7,053,374 B2 | 5/2006 | Barone |
| 7,075,431 B2 * | 7/2006 | Buckley et al. .......... 340/545.3 |
| 7,115,871 B1 | 10/2006 | Tracy et al. |
| 2003/0156027 A1 * | 8/2003 | Seo ..................... 340/523 |
| 2004/0200955 A1 * | 10/2004 | Andzelevich ............ 250/221 |
| 2005/0030180 A1 | 2/2005 | Pantus et al. |
| 2005/0236572 A1 * | 10/2005 | Micko ................. 250/342 |

OTHER PUBLICATIONS http://www.optex.co, accessed Jul. 31, 2007.
http://www.paradox.ca, accessed Jul. 24, 2007.
http://www.crowelec.com, accessed Jul. 24, 2007.

* cited by examiner

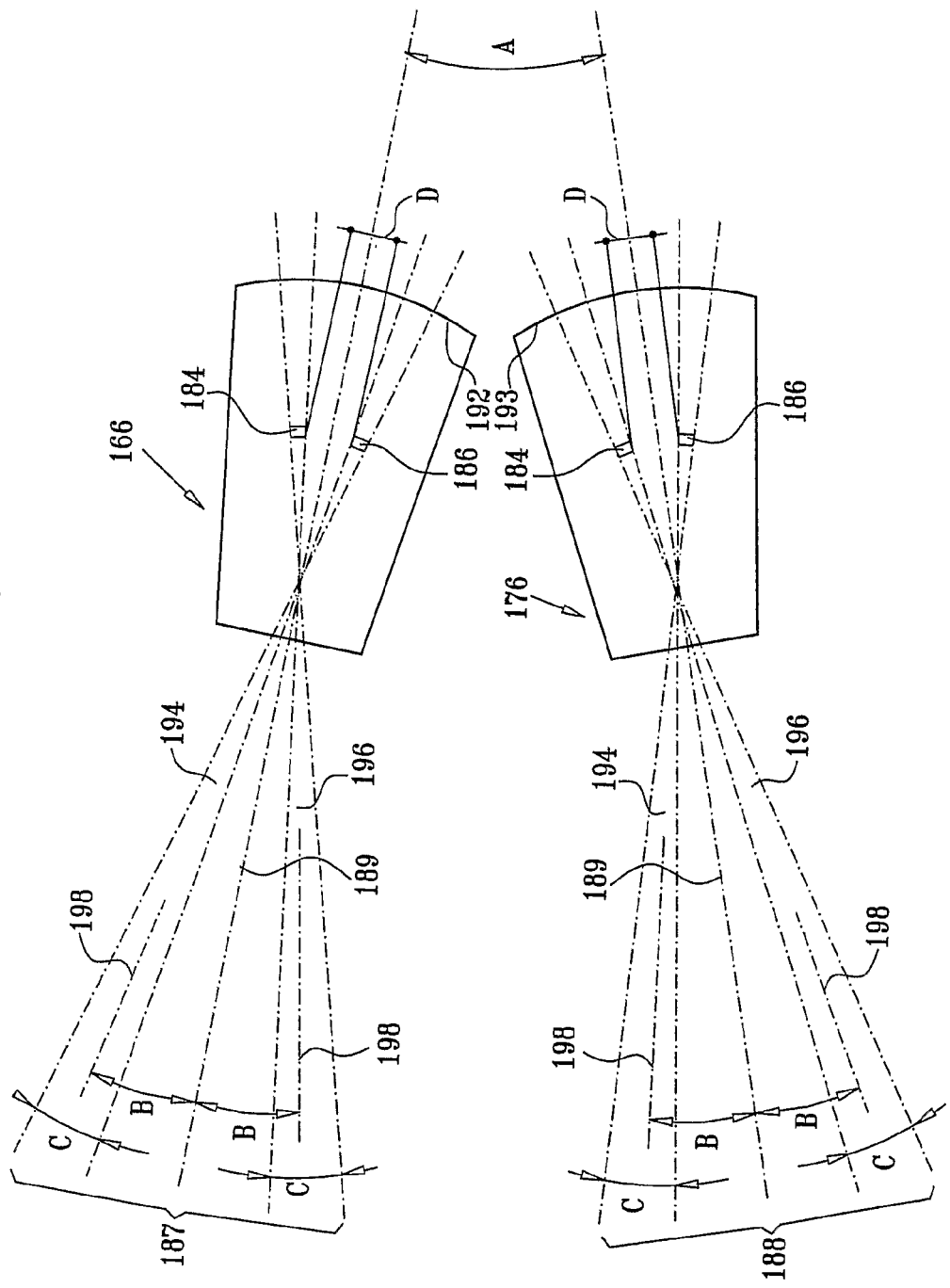

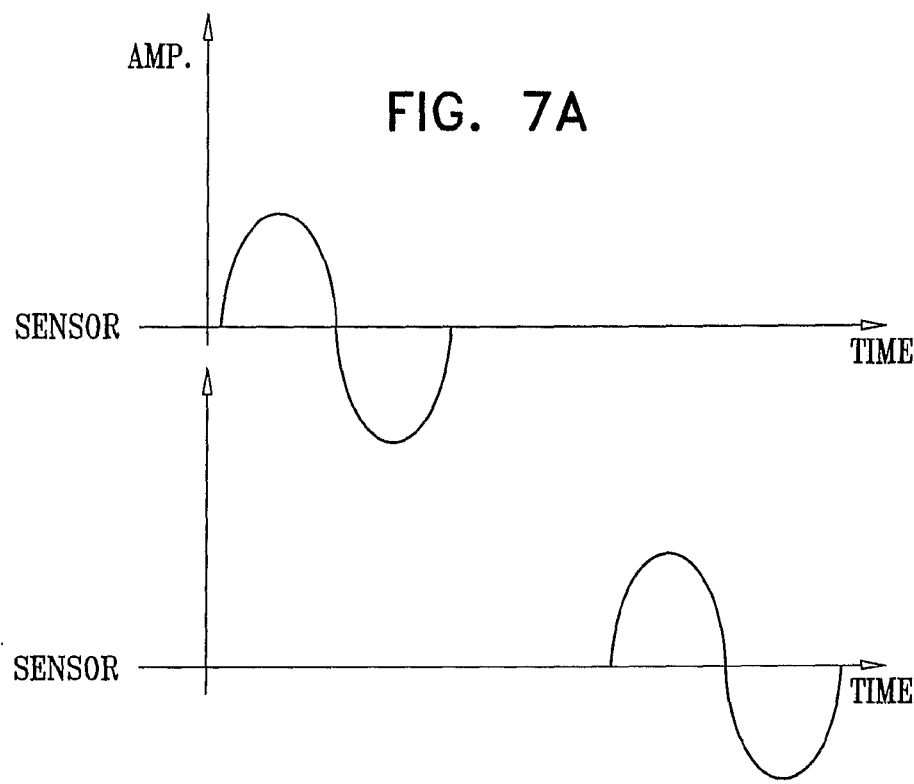
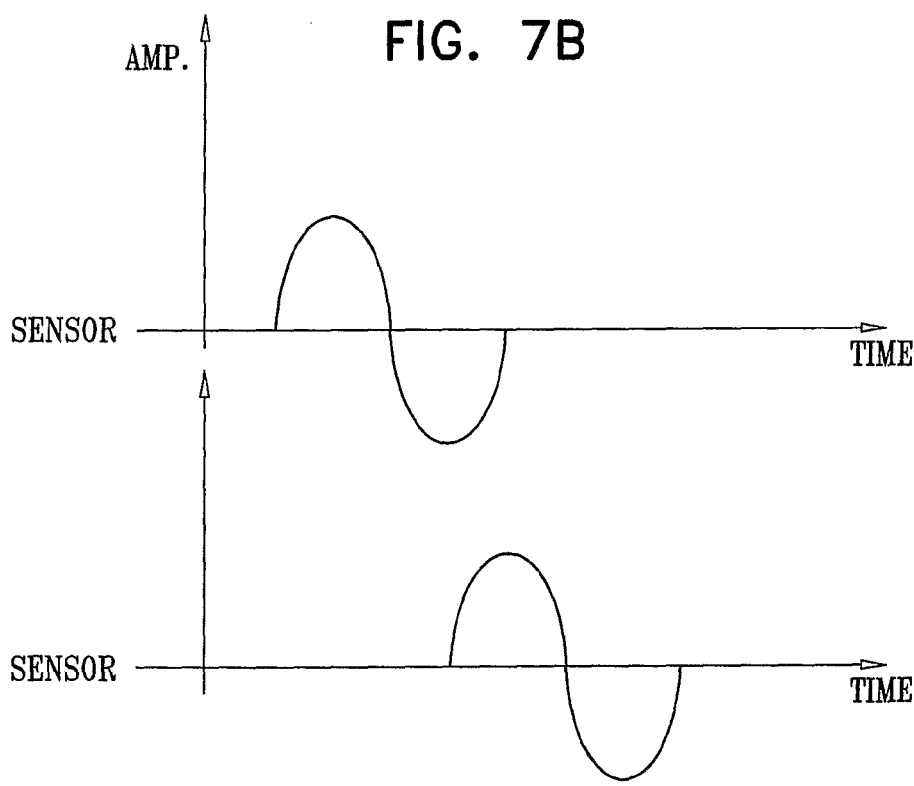

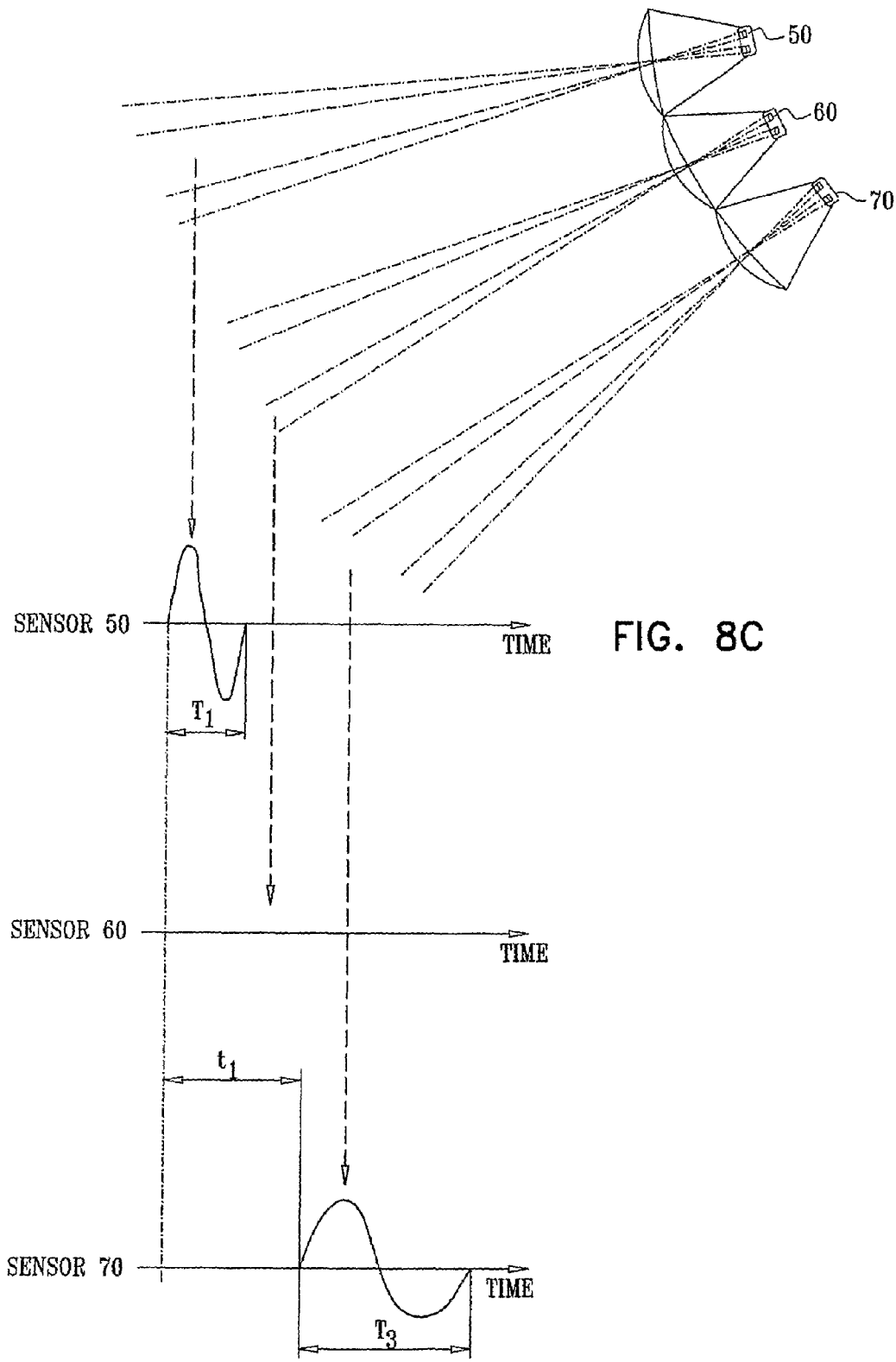

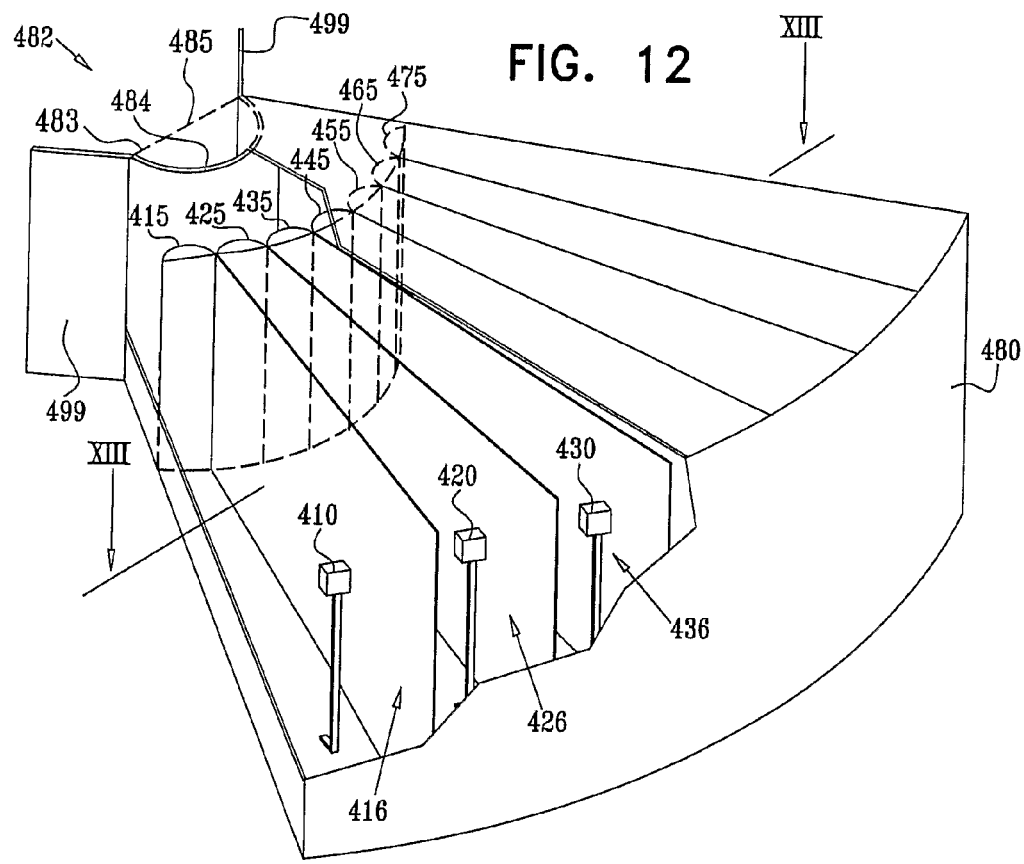
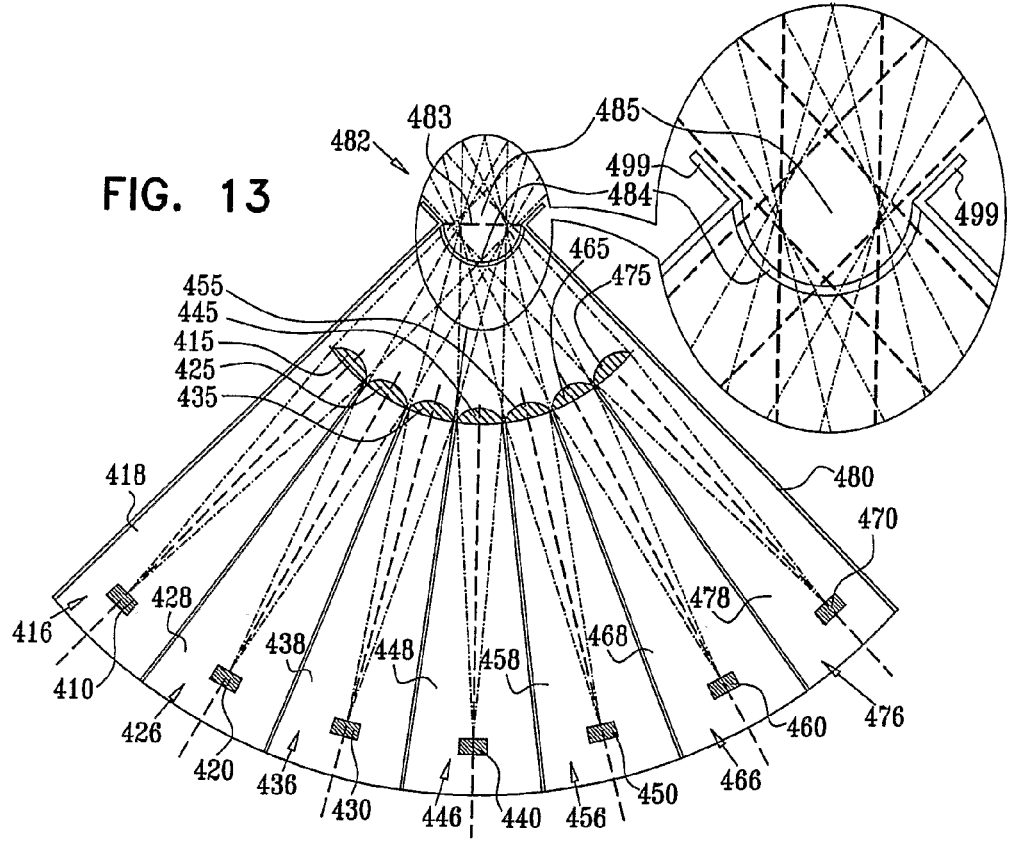

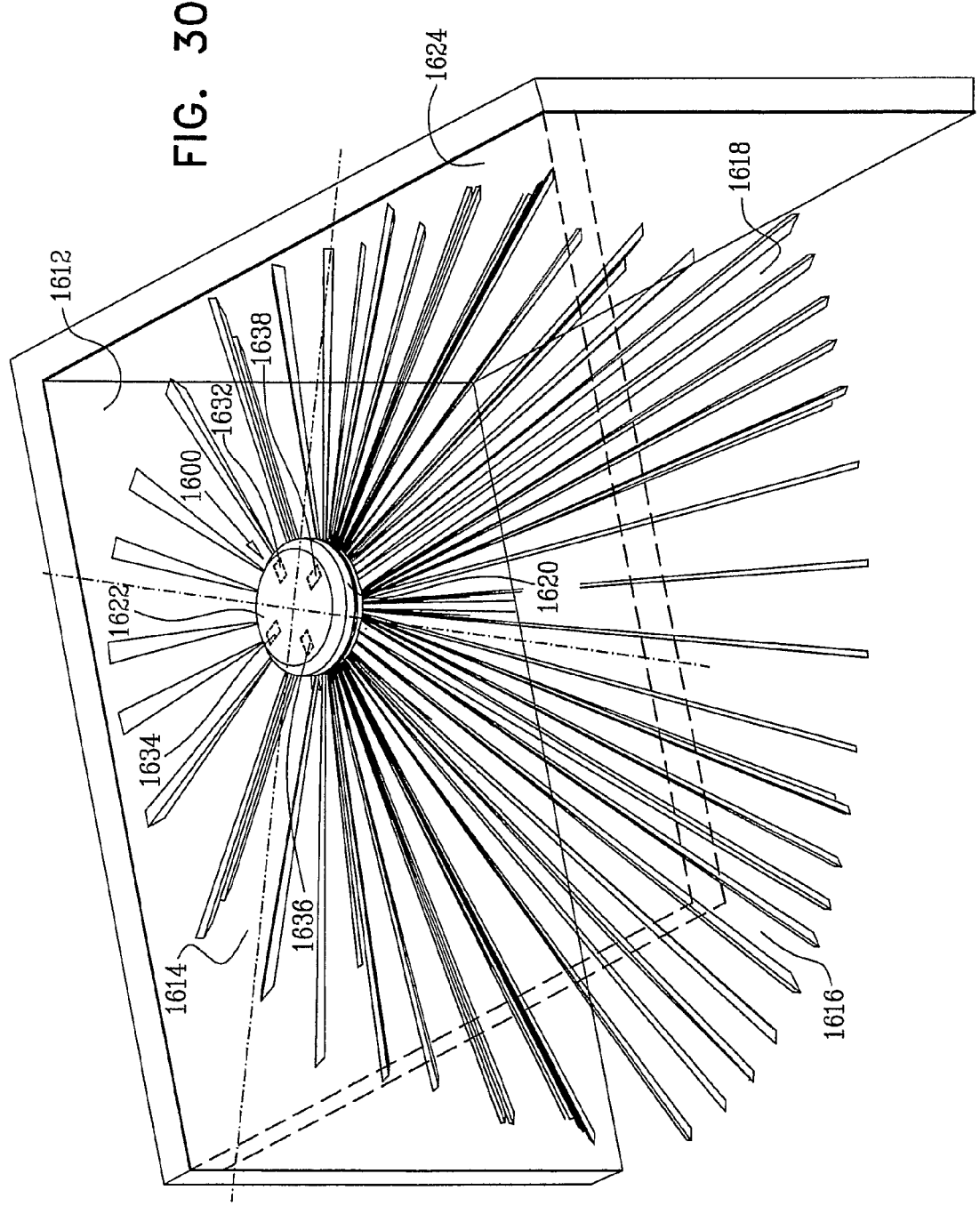

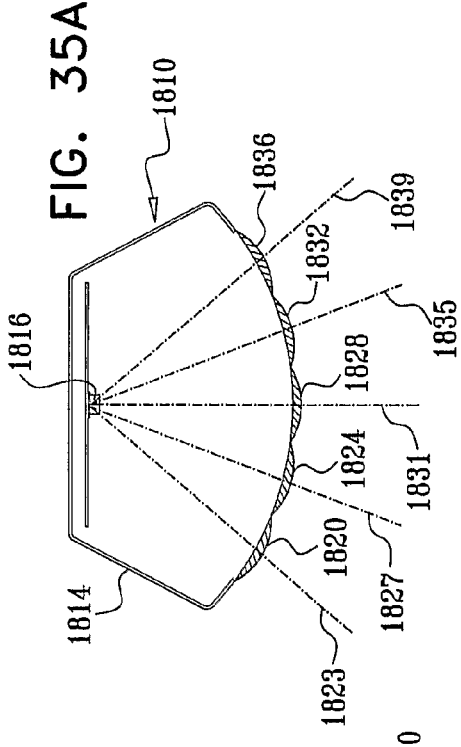
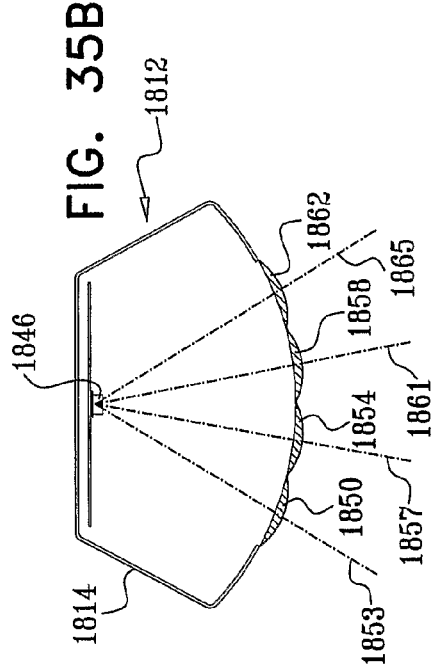
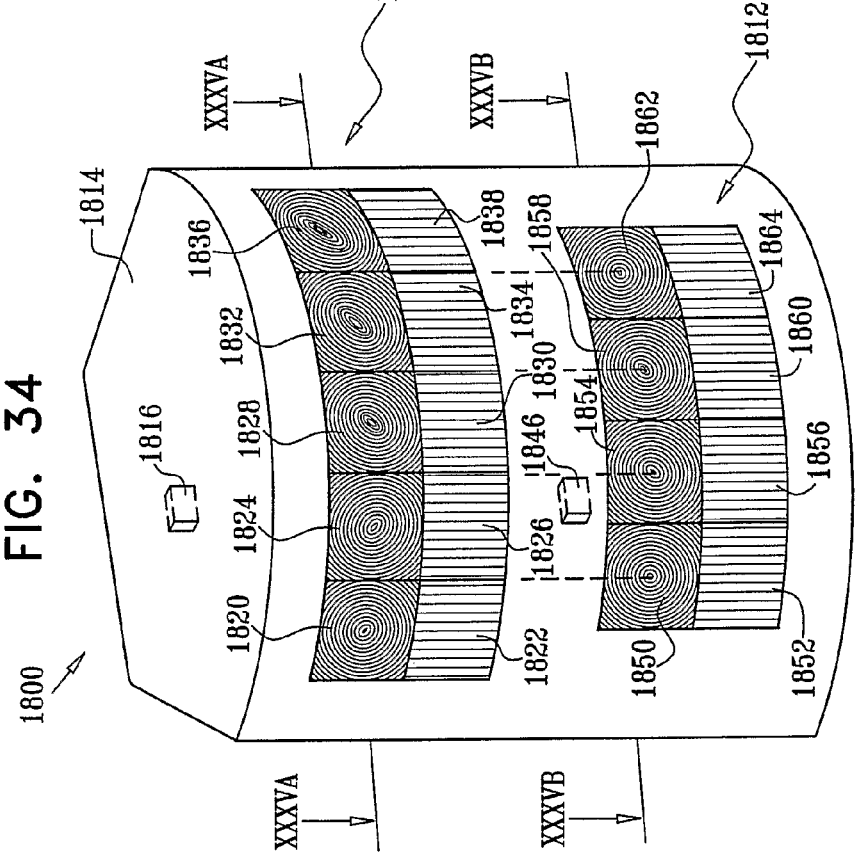

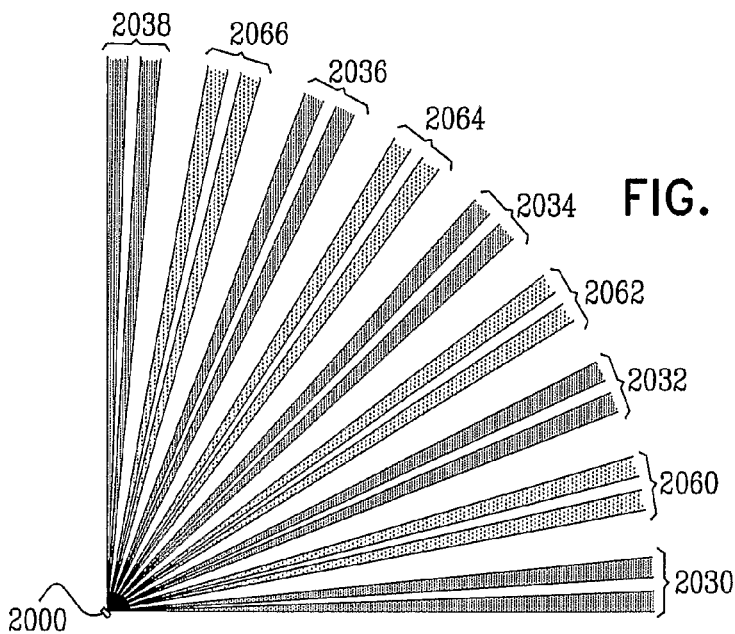
FIG. 42A
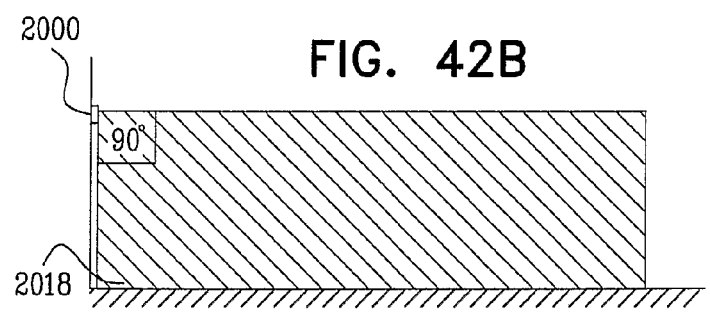
FIG. 42B
FIG. 43
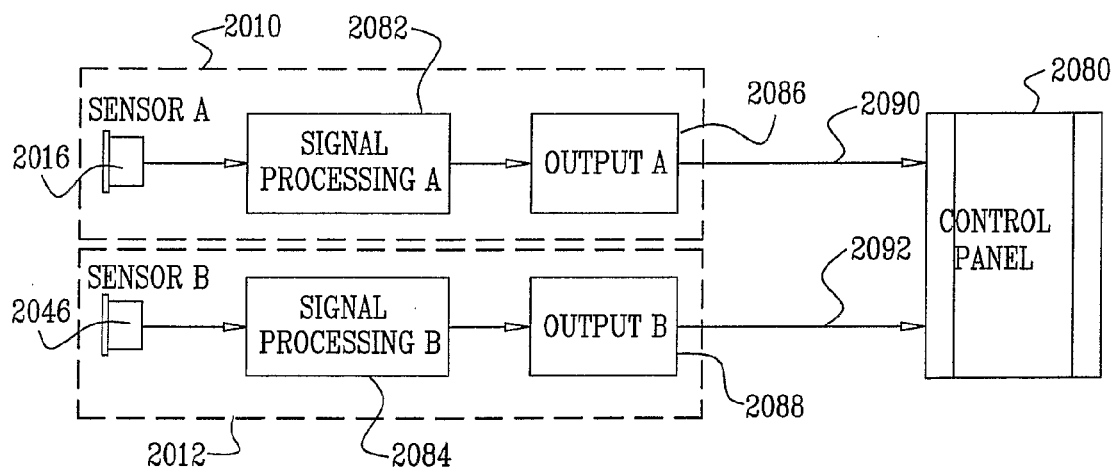

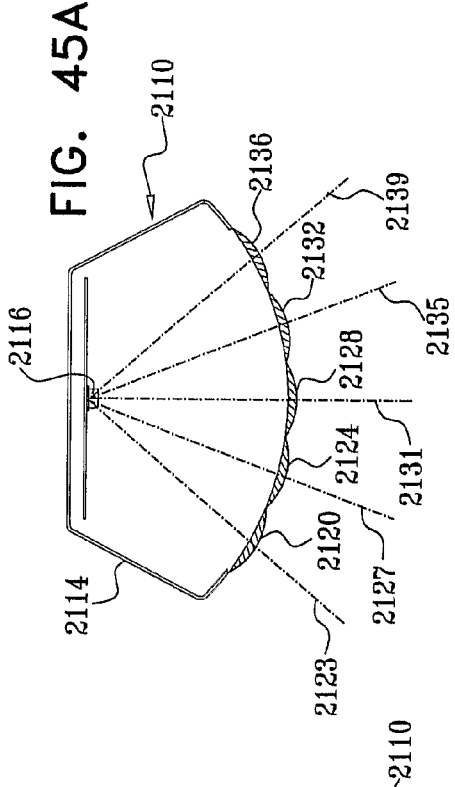
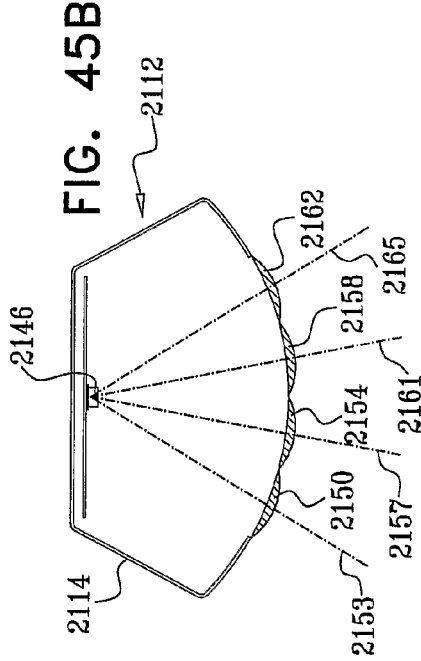
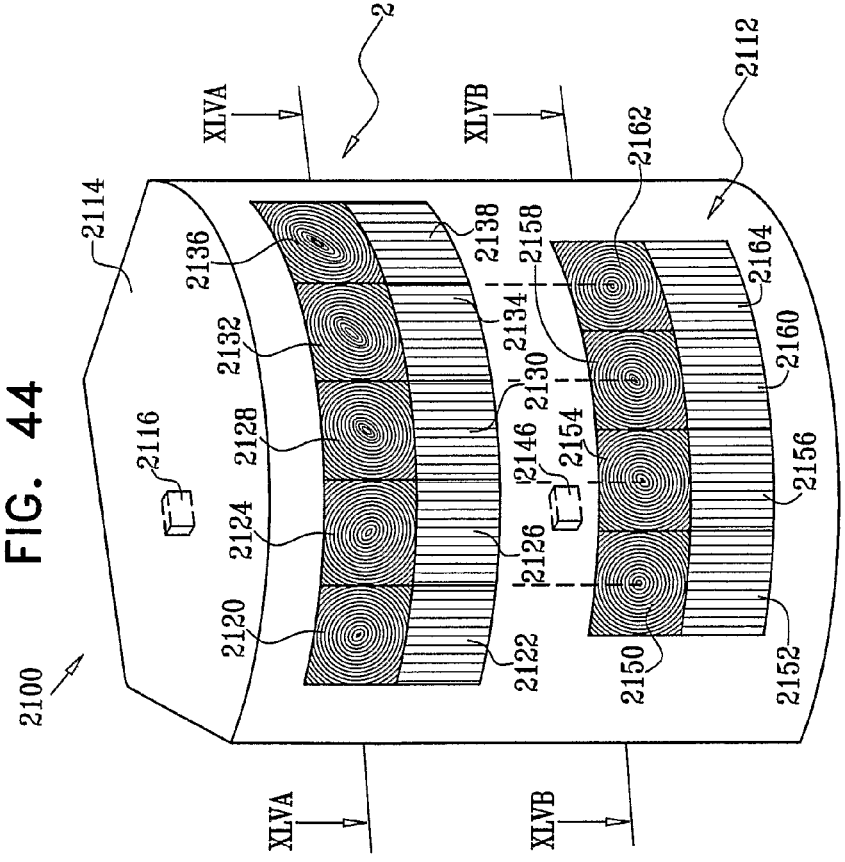

PASSIVE INFRA-RED DETECTORS

Reference is made to U.S. Provisional Patent Application No. 60/664,231, entitled PASSIVE INFRA-RED DETECTORS AND TECHNIQUES EMPLOYING SUB-DETECTORS, filed Mar. 21, 2005, the disclosure of which is hereby incorporated by reference and priority of which is hereby claimed pursuant to 37 CFR 1.78(a)(4) and (5)(i).

FIELD OF THE INVENTION

The present invention relates to passive infrared detectors generally.

BACKGROUND OF THE INVENTION

Passive infrared detectors known in the art have an optical design which is usually based on the use of multiple optical elements, such as lens or mirror segments, arranged in one or more rows, each row including one or more segments. The segments within the rows are arranged with their optical axes spread azimuthally in a plane, generally parallel to the horizontal, or inclined with respect to the horizontal. Each of the segments is arranged to focus IR energy emanating from a pre-defined detection zone onto an infrared sensor such as a pyroelectric sensor, which is common to multiple segments. The combined detection zones of the multiple optical elements or segments, constitute the field-of-view of the detector, which is defined as the detection region covered by the detector or the "coverage" of the detector.

A commercially successful prior art detector is the Coral Plus detector, commercially available from Visonic Ltd. of Israel. This detector includes a lens assembly and a dual element pyroelectric sensor, comprising a pair of sensor elements. The pyroelectric sensor employed in this detector is a Perkin-Elmer LHi-968 dual element sensor. The lens assembly includes multiple Fresnel lens segments arranged in three rows, which are positioned in front of the sensor and serve as a detector window. Other prior art lens assemblies comprise only two rows of optical segments, an upper row, including Fresnel lens segments, and a lower row, including cylindrical optical segments.

A person moving through the field-of-view of the detector causes generation of a signal output from the sensor. This signal is defined to be a "desired signal". Signal processing circuitry of the detector detects and processes the desired signal and activates an alarm signal output.

There are also known detectors which operate similarly to the lens-based detectors described hereinabove but employ mirror segments rather than lens segments. In such detectors, incoming infrared radiation enters the detector through a wide IR transparent window in the detector housing and is reflected by the mirror segments to focus onto a pyroelectric sensor. The window is provided to prevent insects and other spurious matter from entering the detector. In lens-based detectors of the type described hereinabove, the lens itself also functions as a window.

The prior art detectors described hereinabove, whether lens-based, mirror-based or employing both lenses and mirrors, are particularly suitable for indoor applications. However, when installed outdoors or in harsh environments, such detectors are subject to operational conditions of various types, which cause false alarms. These conditions may include, but are not limited to:

Wind bursts which produce flows of hot or cold air onto and into the detector and cause a change in the temperatures of various elements of the detector, such as the housing, the window or the sensor.

Rain and snow which cause changes in the temperature of the background as well as changes in the temperature of the housing and the window. These effects are amplified when the detector is also subject to wind.

Extreme environmental conditions and extreme changes thereof which cause significant thermal interference signals.

Large variations in temperature within the field-of-view. For instance, a black asphalt road that is exposed to the sun can reach temperatures as high as 50° C.-60° C. while a nearby pool or irrigated grass can have temperatures as low as 15° C. In such cases, a moving person having a temperature of 35° C.-37° C. will differ from the background by over +20° C. with respect to the irrigated grass and −15° C. with respect to the asphalt road.

Movement of background elements in the field-of-view.

Fast changes in background temperature within the field-of-view.

High level of sunlight radiation.

Presence of animals, such as pets and rodents.

In prior art PIR detectors, the pyroelectric sensor receives not only "desired signals" but also simultaneously receives undesired thermal interference signals ("undesired signals") emanating concurrently from within the field-of-view.

Thus, for example, if a detector, having nine lens or mirror segments in a horizontal row which define nine detection zones, is designed to detect "desired signals" emanating from a single detection zone at a given moment in time, it actually receives at the same time also "undesired signals" emanating concurrently from the eight remaining detection zones. The "undesired signals" result from temperature variations at the wide detector window and the housing, air drafts, moving trees and bushes, animals and other sources as described above.

Accordingly, in this example, the total level of the "undesired signals" (interference) to which the detector is exposed, is about nine times larger than the "desired signal" emanating from a single zone. In many cases, especially in outdoor environments, the total level of the "undesired signals" may be even larger than that of the "desired signal" which the detector is designed to detect. This is the main reason for the many false alarms in outdoor environments.

Various solutions have been proposed for outdoor applications by manufacturers such as Optex Co. Ltd. of Japan, Crow Electronic Engineering Ltd. of Israel, and Paradox Security Systems Ltd. of Canada. Generally, the proposed solutions incorporate two sensors, having generally overlapping fields-of-view, into the same detector housing to activate a common alarm output upon generally simultaneous detection of motion by both sensors. Prevention of false alarms is based on the statistical assumption that the probability that each of the two sensors will generate a false alarm at approximately the same instant is very low. On the other hand, inasmuch as both detectors have more or less the same field-of-view, detection processing is based on detecting a "desired signal" in both sensors at approximately the same time. Although such detectors perform better outdoors than a detector employing a single sensor, they still do not provide sufficiently reliable detection, because much of the interference existing outdoors, as explained hereinabove, generates "undesired signals" simultaneously in both sensors, due inter-alia, to the fact that both sensors view the same field-of-view.

The following published patent documents and other publications are believed to represent the current state of the art:

U.S. Pat. Nos. 3,524,180; 3,958,118; 4,058,726; 4,081,680; 4,087,688; 4,271,359; 4,375,034; 4,479,056; 4,604,524;

4,614,938; 4,645,930; 4,704,533; 4,709,152; 4,912,748; 4,943,800; 5,296,707; 5,559,496; 5,693,943; 5,703,368; 5,844,240; 6,150,658; 6,163,025 and 6,211,522.

Product sheets of known outdoor detectors on the market:

Optex Co. Ltd.—models LX-402/802N and VX-402/402R/402REC. Model VX-402/402R/402REC is described in U.S. Pat. No. 5,703,368.

Crow Electronic Engineering Ltd.—D&D (Daredevil) and MRX-300. The MRX-300 incorporates a micro-wave detector.

Paradox Security Systems Ltd.—Digigard DG85.

SUMMARY OF THE INVENTION

A principal objective of the present invention is to manage interference and substantially decrease the "undesired signals" detected by a sensor, and as a result to increase the ratio between the "desired signal" and the "undesired signals", arising from interference, at every point in time. An additional objective of the invention is to provide improved signal processing to enable the detector to better distinguish between the "desired signals" and the "undesired signals". A further objective of the invention is to provide an improved optical mechanical design that performs better and is more immune to false alarms.

There is thus provided in accordance with a preferred embodiment of the present invention a passive infra-red detector including at least three sub-detectors, each of the at least three sub-detectors being operative to receive infra-red radiation from a corresponding one of at least three sub fields-of-view, each of the at least three sub fields-of-view being exclusively defined by an optical element which does not define any other of the at least three sub fields of view, the at least three sub fields-of-view being angled with respect to each other, adjacent ones of the at least three sub fields-of-view being separated by a gap of no more than 30 degrees and at least one of the at least three sub fields-of-view having at least one of the following characteristics: extending over no more then 45 degrees in azimuth; and including not more than three azimuthally distributed detection zones, and signal processing circuitry, operative to receive output signals from the at least three sub detectors and to provide a motion detection output.

In accordance with a preferred embodiment of the present invention the at least three sub fields-of-view are substantially non-overlapping. Preferably, each optical element is directed in a corresponding direction, the corresponding directions of the optical elements of each two of the at least three sub-detectors being different.

In accordance with another preferred embodiment of the present invention the optical element includes a non focusing optical element. Preferably, the non-focusing optical element includes a reflective optical element. Additionally or alternatively, the optical element includes a focusing element. Preferably, the focusing element includes at least one of a reflective element, a refractive element, a diffractive element and a cylindrical optical element.

In accordance with yet another preferred embodiment of the present invention the azimuthally distributed detection zones have corresponding divergence angles and the gap has an angular extent which is less than or equal to twice the largest angular extent of the divergence angles of detection zones of the adjacent ones of the at least three sub fields-of-view. Alternatively, the gap has an angular extent which is less than or equal to a largest azimuthal angle A-2B between any two adjacent detection zones of the adjacent ones of the at least three sub fields-of-view.

There is also provided in accordance with another preferred embodiment of the present invention a passive infra-red detector including at least three sub-detectors, each operative to receive infra-red radiation from a corresponding one of at least three sub fields-of-view and signal processing circuitry, receiving output signals from at least two of the at least three sub-detectors and providing a motion detection output in response to receipt of the output signals; noting, within a predetermined first time period, multiple detections by one of the at least two sub-detectors and the absence of detections by another of the at least two sub-detectors and being operative to ignore future detections by the one of the at least two sub-detectors for at least a predetermined second time period.

In accordance with a preferred embodiment of the present invention, the at least three sub fields-of-view are substantially non-overlapping. Preferably, the signal processing circuitry is operative to ignore the future detections only in a case where the multiple detections fulfill predetermined pre-alarm criteria.

In accordance with a further preferred embodiment of the present invention the signal processing circuitry is operative to ignore the future detections only in a case where the multiple detections fulfill predetermined alarm criteria. Additionally or alternatively, the signal processing circuitry is operative to extend the predetermined second time period in response to detections by the one of the at least two sub-detectors during the predetermined second time period.

In accordance with yet a further preferred embodiment of the present invention the signal processing circuitry is operative to note a sequence of receipt of the output signals by the at least three sub-detectors and to provide motion direction output based on the sequence. Additionally or alternatively, the signal processing circuitry is operative to note a sequence of receipt of the output signals by the at least three sub-detectors and to provide motion path output information based on the sequence.

In accordance with a still further preferred embodiment of the present invention the signal processing circuitry is operative to process the output signals according to at least one predefined criterion. Preferably, the at least one predefined criterion includes whether a time duration between receipt of the output signals from adjacent ones of the at least three sub-detectors lies within a predetermined range of values.

In accordance with yet another preferred embodiment of the present invention the signal processing circuitry is operative to process the output signals according to the at least one predefined criterion by noting time durations of the output signals from adjacent ones of the at least three sub-detectors and providing the motion detection output at least when the ratio between the time durations is within certain limits. Preferably, the ratio is in the range of 0.5 to 2.0.

In accordance with still another preferred embodiment of the present invention, the signal processing circuitry is operative to process the output signals according to the at least one predefined criterion by noting a time difference between receipt of the output signals and time durations of the output signals and to provide the motion detection output in response to receipt of the output signals from at least two adjacent ones of the at least three sub-detectors having respective time durations and a time difference therebetween, the time durations and the time difference therebetween having a time relationship therebetween which meets at least one predetermined criterion.

In accordance with an additional preferred embodiment of the present invention the at least one predetermined criterion includes whether a ratio between the time difference and at least one of the time durations lies within a predetermined range of values. Alternatively or additionally, the at least one predetermined criterion includes whether ratios between the time difference and each of the time durations lie within a predetermined range of values. Preferably, the predetermined range of values is based at least in part on divergence angles of at least two zones of two different ones of the at least three sub fields-of-view corresponding to the at least two adjacent ones of the at least three sub-detectors. Alternatively, the predetermined range of values is based at least in part on an angle between of at least two zones of two different ones of the at least three sub fields-of-view corresponding to the at least two adjacent ones of the at least three sub-detectors.

In accordance with another preferred embodiment of the present invention the passive infra-red detector is operative to receive radiation from a field-of-view having a field-of-view divergence angle of at least 45 degrees. Preferably, at least one of the at least three sub fields-of-view includes a single coplanar azimuthally distributed detection zone. Additionally or alternatively, at least one of the at least three sub fields-of-view includes multiple coplanar azimuthally distributed detection zones.

In accordance with yet another preferred embodiment of the present invention at least one of the at least three sub fields-of-view includes a single vertically distributed detection zone. Additionally or alternatively, at least one of the at least three sub fields-of-view includes multiple vertically distributed detection zones.

In accordance with still another preferred embodiment of the present invention the passive infra-red detector also includes a housing formed with an aperture adapted for passage therethrough of infra-red radiation, wherein the at least three sub fields-of-view intersect generally at an intersection region located at the aperture, and the aperture is generally equal in size to the size of the intersection region. Preferably, a window transparent to infra-red radiation is located adjacent the aperture.

In accordance with a further preferred embodiment of the present invention a center of the window is located generally at a center of the aperture. Preferably, the window has a circular cross-section. Alternatively, the window is generally flat. Preferably, the window is formed of at least one of HDPE, Silicon and Germanium.

In accordance with another further preferred embodiment of the present invention the passive infra-red detector also includes masking detection functionality for providing an alarm output upon detection of masking materials obstructing the window. Preferably, the passive infra-red detector also includes a guard element surrounding the window for providing mechanical protection to the window.

There is further provided in accordance with yet another preferred embodiment of the present invention a passive infra-red detector including at least three sub-detectors, each of the at least three sub-detectors being operative to receive infra-red radiation from a corresponding one of at least three sub fields-of-view, each of the at least three sub fields-of-view being exclusively defined by an optical element which does not define any other of the at least three sub fields of view, the at least three sub fields-of-view being angled with respect to each other and reduced false alarm signal processing circuitry, receiving output signals from the at least three sub-detectors and providing a motion detection output and being operative to eliminate at least some false alarms at least based on sensed time relationships between the output signals.

In accordance with a preferred embodiment of the present invention the at least three sub fields-of-view are substantially non-overlapping. Preferably, the signal processing circuitry is operative to process the output signals by noting time durations of the output signals from adjacent ones of the at least three sub-detectors and providing the motion detection output at least when the ratio between the time durations is within a predetermined range of values. More preferably, the predetermined range of values is 0.5 to 2.0.

In accordance with another preferred embodiment of the present invention the signal processing circuitry is operative to process the output signals by noting a time difference between receipt of the output signals and time durations of the output signals and to provide the motion detection output if, in response to receipt of the output signals from at least two adjacent ones of the at least three sub-detectors having respective time durations and a time difference therebetween, the time durations and the time difference therebetween having a time relationship therebetween which meets at least one predetermined criterion.

In accordance with yet another preferred embodiment of the present invention the at least one predetermined criterion includes whether a ratio between the time difference and at least one of the time durations lies within a predetermined range of values. Additionally or alternatively, the at least one predetermined criterion includes whether ratios between the time difference and each of the time durations lie within a predetermined range of values. Preferably, the predetermined range of values is based at least in part on divergence angles of at least two zones of two different ones of the at least three sub fields-of-view corresponding to the at least two adjacent ones of the at least three sub-detectors. Alternatively, the predetermined range of values is based at least in part on an angle between at least two zones of two different ones of the at least three sub fields-of-view corresponding to the at least two adjacent ones of the at least three sub-detectors.

In accordance with still another preferred embodiment of the present invention each optical element is directed in a corresponding direction, the corresponding directions of the optical elements of each two of the at least three sub-detectors being different.

In accordance with a further preferred embodiment of the present invention the optical element includes a non-focusing optical element. More preferably, the non-focusing optical element includes a reflective optical element. Alternatively, the optical element includes a focusing element. Preferably, the focusing element includes at least one of a reflective element, a refractive element, a diffractive element and a cylindrical optical element.

There is still further provided in accordance with another preferred embodiment of the present invention a passive infra-red detector including at least three sub-detectors, each operative to receive infra-red radiation from a corresponding one of at least three sub fields-of-view, the at least three sub fields-of-view being substantially non-overlapping and being angled with respect to each other and signal processing circuitry, receiving output signals from the at least three sub-detectors and noting time differences between receipt of the output signals from adjacent ones of the at least three sub-detectors and providing a motion detection output in response to receipt of the output signals from the adjacent ones of the at least three sub-detectors having a time difference which is at least within certain predetermined limits.

There is yet further provided in accordance with yet a further preferred embodiment of the present invention a passive infra-red detector including at least three sub-detectors, each operative to receive infra-red radiation from a corresponding one of at least three sub fields-of-view, the at least three sub fields-of-view being angled with respect to each other and signal processing circuitry, receiving output signals from at least two adjacent ones of the at least three sub-detectors, noting time durations of the output signals and providing a motion detection output in response to receipt of the output signals from the at least two adjacent ones of the at least three sub-detectors having respective time durations, the ratio of which is within predetermined limits.

In accordance with a preferred embodiment of the present invention the at least three sub fields-of-view are substantially non-overlapping. Preferably, the ratio is within the range of 0.5 to 2.0.

There is additionally provided in accordance with another preferred embodiment of the present invention a passive infra-red detector including at least three sub-detectors, each operative to receive infra-red radiation from a corresponding one of at least three sub fields-of-view, the at least three sub fields-of-view being angled with respect to each other and signal processing circuitry, receiving output signals from at least two adjacent ones of the at least three sub-detectors, noting time differences between receipt of the output signals and time durations of the output signals and providing a motion detection output in response to receipt of the output signals from at least two adjacent ones of the at least three sub-detectors having respective time durations and a time difference therebetween, the time durations and the time difference therebetween having a time relationship therebetween which meets at least one predetermined criterion.

In accordance with a preferred embodiment of the present invention, the at least three sub fields-of-view are substantially non-overlapping. Preferably, the at least one predetermined criterion includes whether a ratio between the time difference and at least one of the time durations lies within a predetermined range of values. Alternatively, the at least one predetermined criterion includes whether ratios between the time difference and each of the time durations lie within a predetermined range of values.

In accordance with another preferred embodiment of the present invention the predetermined range of values is based at least in part on divergence angles of at least two zones of two different ones of the at least three sub fields-of-view corresponding to the at least two adjacent ones of the at least three sub-detectors. Additionally or alternatively, the predetermined range of values is based at least in part on an angle between at least two zones of two different ones of the at least three sub fields-of-view corresponding to the at least two adjacent ones of the at least three sub-detectors.

In accordance with another preferred embodiment of the present invention the signal processing circuitry is operative to note a sequence of receipt of the output signals by the at least three sub-detectors and to provide motion direction output based on the sequence. Alternatively, the signal processing circuitry is operative to note a sequence of receipt of the output signals by the at least three sub-detectors and to provide motion path output information based on the sequence. Preferably, the passive infrared detector is operative to receive radiation from a field-of-view having a field-of-view divergence angle of at least 45 degrees.

In accordance with yet another preferred embodiment of the present invention at least one of the at least three sub fields-of-view includes a single coplanar azimuthally distributed detection zone. Alternatively, at least one of the at least three sub fields-of-view includes multiple coplanar azimuthally distributed detection zones.

In accordance with still another preferred embodiment of the present invention at least one of the at least three sub fields-of-view includes a single vertically distributed detection zone. Alternatively, at least one of the at least three sub fields-of-view includes multiple vertically distributed detection zones.

In accordance with a further preferred embodiment of the present invention adjacent ones of the at least three sub fields-of-view are separated by a gap of no more than 30 degrees. Preferably, the azimuthally distributed detection zones have corresponding divergence angles and the gap has an angular extent which is less than or equal to twice the largest angular extent of the divergence angles of detection zones of the adjacent ones of the at least three sub fields-of-view. Additionally or alternatively, the gap has an angular extent which is less than or equal to a largest azimuthal angle A-2B between any two adjacent detection zones of the adjacent ones of the at least three sub fields-of-view.

In accordance with another further preferred embodiment of the present invention the passive infra-red detector also includes a housing formed with an aperture adapted for passage therethrough of infra-red radiation, wherein the at least three sub fields-of-view intersect generally at an intersection region located at the aperture, and the aperture is generally equal in size to the size of the intersection region.

In accordance with yet a further preferred embodiment of the present invention a window transparent to infra-red radiation is located adjacent the aperture. Preferably, a center of the window is located generally at a center of the aperture.

In accordance with still a further preferred embodiment of the present invention the window has a circular cross-section. Alternatively, the window is generally flat. Preferably, the window is formed of at least one of HDPE, Silicon and Germanium.

In accordance with another preferred embodiment of the present invention the passive infra-red detector also includes masking detection functionality for providing an alarm output upon detection of masking materials obstructing the window. Preferably, the passive infra-red detector also includes a guard element surrounding the window for providing mechanical protection to the window.

There is also provided in accordance with another preferred embodiment of the present invention a passive infra-red detector having a field-of-view including multiple detection zones, the detector including a housing having an aperture for passage of infra-red radiation therethrough, at least one sensor disposed in the housing and at least one infra-red radiation director including a plurality of infra-red optical elements each associated with a different one of the multiple detection zones, each of the plurality of infra-red optical elements being operative to receive infra-red radiation from a corresponding one of the multiple detection zones and to direct the infra-red radiation to the at least one sensor along a corresponding radiation path, a plurality of the radiation paths generally intersecting at an intersection region located at the aperture, the aperture being generally of the same size as the size of the intersection region.

In accordance with a preferred embodiment of the present invention at least one of the plurality of optical elements includes at least one non-focusing optical element. Preferably, the at least one non-focusing element includes at least one reflective optical element. Alternatively, at least one of the plurality of optical elements includes at least one focusing element. Preferably, the at least one focusing element includes at least one of a reflective element, a refractive element, a diffractive element and a cylindrical optical element.

In accordance with another preferred embodiment of the present invention the passive infra-red detector also includes a window transparent to infra-red radiation, located adjacent the aperture. Preferably, a center of the window is located generally at a center of the aperture.

In accordance with yet another preferred embodiment of the present invention the window has a circular cross-section.

Alternatively, the window is generally flat. Preferably, the window is formed of at least one of HDPE, Silicon and Germanium. Additionally or alternatively, the passive infra-red detector also includes masking detection functionality for providing an alarm output upon detection of masking materials obstructing the window.

In accordance with still another preferred embodiment of the present invention each of the multiple detection zones includes a non-masked portion when masking materials are applied to part of the window. Preferably, the passive infra-red detector also includes a guard element surrounding the window for providing mechanical protection to the window. Additionally or alternatively, the passive infra-red detector also includes at least one intermediate reflecting surface located along an optical path defined by the infra-red radiation director at a location suitable for redirecting radiation from the infra-red radiation director to the radiation sensor.

There is further provided in accordance with yet another preferred embodiment of the present invention a radiation detector including a housing defining an elongate radiation receiving slit aperture lying along a slit axis, a radiation sensor disposed within the housing along the slit axis at a location spaced from the elongate radiation receiving slit aperture and a radiation reflecting surface arranged to receive radiation passing through the elongate radiation receiving slit aperture and to focus the radiation on the radiation sensor, the radiation reflecting surface being defined at least partially by rotation through a rotation angle about the slit axis of a portion of a parabola, whose axis of symmetry extends perpendicularly to the slit axis through the radiation sensor.

There is even further provided in accordance with still another preferred embodiment of the present invention a radiation detector including a housing defining an elongate radiation receiving slit aperture lying along a slit axis, a radiation sensor disposed within the housing at a location spaced from the elongate radiation receiving slit aperture and a radiation reflecting surface arranged to receive radiation passing through the elongate radiation receiving slit aperture and to focus the radiation on the radiation sensor, the radiation reflecting surface being defined at least partially by rotation through a rotation angle about the slit axis of a portion of a parabola, whose axis of symmetry extends perpendicularly to the slit axis.

In accordance with another preferred embodiment of the present invention the rotation angle is 90 degrees. Additionally or alternatively, the radiation detector is operative such that when the slit axis is a horizontal axis, the rotation angle defines the angular extent of a radiation receiving curtain in a vertical plane.

In accordance with still another preferred embodiment of the present invention the radiation detector also includes at least one intermediate reflecting surface located along an optical path defined by the radiation reflecting surface at a location suitable for redirecting radiation from the radiation reflecting surface to the radiation sensor.

In accordance with yet another preferred embodiment of the present invention the radiation detector also includes a window transparent to infra-red radiation, located adjacent the radiation receiving slit aperture. Additionally, a center of the window is located generally at a center of the radiation receiving slit aperture. Preferably, the window has a circular cross-section. Alternatively, the window is generally flat.

In accordance with another preferred embodiment of the present invention the window does not have optical power and does have varying thickness, thereby providing varying radiation attenuation. Additionally, the varying radiation attenuation provides pet immunity.

Preferably, the window is formed of at least one of HDPE, Silicon and Germanium.

In accordance with still another preferred embodiment of the present invention the radiation reflecting surface includes a plurality of reflecting surface areas corresponding to a plurality of radiation receiving areas, wherein different ones of the plurality of reflecting surface areas have different widths, thereby providing different sensitivity of the radiation sensor at corresponding ones of the plurality of radiation receiving areas. Additionally, the different sensitivity of the radiation sensor at corresponding ones of the plurality of radiation receiving areas provides pet immunity.

In accordance with yet another preferred embodiment of the present invention the radiation sensor is operative to view a field-of-view including a curtain-like field-of-view. Preferably, the curtain-like field-of-view extends generally through 90 degrees. Additionally, the curtain-like field-of-view extends generally through 90 degrees from the vertical to the horizontal.

There is still further provided in accordance with even a further preferred embodiment of the present invention a radiation detector including a housing defining a radiation receiving slit aperture and an optical system disposed within the housing defining a field-of-view and including at least one radiation reflecting surface arranged to receive radiation passing through the radiation receiving slit aperture and to focus the radiation on a radiation sensor disposed in the housing, the at least one radiation reflecting surface being defined by a collection of curves disposed along an ellipse, the ellipse having a first focus and a second focus along a principal axis thereof, the at least one radiation reflecting surface defining a slit axis which passes through the second focus and the slit aperture, each of the curves being defined by the intersection at a point on the ellipse, of a slit axis plane which includes the slit axis and a focusing surface whose focus is at the first focus and which has an axis of symmetry which is parallel to the slit axis plane.

There is yet further provided in accordance with yet another preferred embodiment of the present invention a radiation detector including a housing defining a radiation receiving slit aperture and an optical system disposed within the housing defining a field-of-view and including at least one radiation reflecting surface arranged to receive radiation passing through the radiation receiving slit aperture and to focus the radiation on a radiation sensor disposed in the housing, the at least one radiation reflecting surface being defined by a collection of curves disposed along at least one ellipse, the at least one ellipse lying in the same plane and having a common first focus and a common second focus along a principal common axis thereof, the at least one radiation reflecting surface defining a slit axis which passes through the second focus and the slit aperture, each of the curves being defined by the intersection at a point on the at least one ellipse, of a slit axis plane which includes the slit axis and a focusing surface whose focus is at the first common focus and which has an axis of symmetry which is parallel to the slit axis plane.

In accordance with another preferred embodiment of the present invention the slit axis is generally perpendicular to the principal axis. Additionally or alternatively, the focusing surface includes at least one of a parabolic focusing surface, a spherical focusing surface and an aspheric focusing surface.

There is also provided in accordance with another preferred embodiment of the present invention a radiation detector including a housing defining a radiation receiving slit aperture and an optical system disposed within the housing defining a field-of-view and including at least one radiation reflecting surface arranged to receive radiation passing through the radiation receiving slit aperture and to focus the radiation on a radiation sensor disposed in the housing, the at least one radiation reflecting surface including at least one radiation reflecting surface segment curved in at least two mutually orthogonal planes, each of the at least one radiation reflecting surface segment being defined by an array of curves which intersect an ellipse having a first focus at a first common focus point and a second focus in the vicinity of the slit aperture, each of the array of curves being focused at the first focus of the ellipse.

In accordance with yet another preferred embodiment of the present invention each of the array of curves includes at least one of a parabolic curve, a spherical curve and an aspheric curve.

In accordance with still another preferred embodiment of the present invention the radiation sensor is located at the first focus.

In accordance with another preferred embodiment of the present invention the radiation detector also includes at least one intermediate reflecting surface located along an optical path defined by the at least one radiation reflecting surface at a location suitable for redirecting radiation from the at least one radiation reflecting surface to the radiation sensor.

In accordance with yet another preferred embodiment of the present invention the field-of-view includes a curtain-like field-of-view. Preferably, the curtain like field-of-view extends generally through 90 degrees. Additionally, the curtain like field-of-view extends generally through 90 degrees from the vertical to the horizontal.

In accordance with still another preferred embodiment of the present invention the radiation detector also includes a window transparent to infra-red radiation, located adjacent the radiation receiving slit aperture. Additionally, a center of the window is located generally at a center of the radiation receiving slit aperture. Preferably, the window has a circular cross-section. Alternatively, the window is generally flat.

In accordance with yet another preferred embodiment of the present invention the window does not have optical power and does have varying thickness, thereby providing varying radiation attenuation. Additionally, the varying radiation attenuation provides pet immunity.

In accordance with another preferred embodiment of the present invention the window is formed of at least one of HDPE, Silicon and Germanium.

Preferably, the at least one radiation reflecting surface includes a plurality of reflecting surface areas corresponding to a plurality of radiation receiving areas, wherein different ones of the plurality of reflecting surface areas have different widths thereby providing different sensitivity of the radiation sensor at corresponding ones of the plurality of radiation receiving areas. Additionally, the different sensitivity of the radiation sensor at corresponding ones of the plurality of radiation receiving areas provides pet immunity.

In accordance with yet another preferred embodiment of the present invention the slit aperture has a height in the range of 2-5 mm.

There is further provided in accordance with still another preferred embodiment of the present invention a radiation detector including a housing defining an elongate radiation receiving slit aperture through which extend a first plurality of slit axes, each of the plurality of slit axes passing through a common first focus of a second plurality of ellipses having a common second focus, the common first focus and the common second focus lying along a common primary axis of symmetry, a radiation sensor disposed within the housing and a radiation reflecting surface arranged to receive radiation passing through the elongate radiation receiving slit aperture and to focus the radiation on the radiation sensor, the radiation reflecting surface including a first plurality of radiation reflecting surface segments, each of the first plurality of radiation reflecting surface segments including a segment surface curved in at least two mutually orthogonal planes, each the segment surface including a portion of at least one of the second plurality of ellipses and being defined by a continuous array of curves which join the portion of the at least one of the second plurality of ellipses, the continuous array of curves being focused at the common second focus of the second plurality of ellipses.

In accordance with another preferred embodiment of the present invention each of the array of curves includes at least one of a parabolic curve, a spherical curve and an aspheric curve. In accordance with yet another preferred embodiment of the present invention the radiation sensor is located at the common second focus of the second plurality of ellipses.

In accordance with still another preferred embodiment of the present invention the radiation detector also includes at least one intermediate reflecting surface located along an optical path defined by the radiation reflecting surface at a location suitable for redirecting radiation from the radiation reflecting surface to the radiation sensor. In accordance with yet another preferred embodiment of the present invention the first plurality of slit axes are generally perpendicular to the common primary axis of symmetry.

In accordance with yet another preferred embodiment of the present invention the radiation reflecting surface defines a plurality of curtain-like detection zones. Preferably, each of the plurality of curtain like detection zones extends generally through 90 degrees. Additionally, each of the plurality of curtain like detection zones extends generally through 90 degrees from the vertical to the horizontal.

In accordance with still another preferred embodiment of the present invention the radiation detector also includes a window transparent to infra-red radiation, located adjacent the radiation receiving slit aperture. Preferably, a center of the window is located generally at a center of the radiation receiving slit aperture. Additionally, the window has a circular cross-section. Alternatively, the window is generally flat.

In accordance with yet another preferred embodiment of the present invention the window does not have optical power and does have varying thickness, thereby providing varying radiation attenuation. Preferably, the varying radiation attenuation provides pet immunity.

In accordance with another preferred embodiment of the present invention the window is formed of at least one of HDPE, Silicon and Germanium.

In accordance with yet another preferred embodiment of the present invention the radiation reflecting surface includes a plurality of reflecting surface areas corresponding to a plurality of radiation receiving areas, wherein different ones of the plurality of reflecting surface areas have different widths thereby providing different sensitivity of the radiation sensor at corresponding ones of the plurality of radiation receiving areas. Preferably, the different sensitivity of the radiation sensor at corresponding ones of the plurality of radiation receiving areas provides pet immunity.

In accordance with still another preferred embodiment of the present invention the window has a height in the range of 2-5 mm.

There is even further provided in accordance with still another preferred embodiment of the present invention a passive infra-red detector including at least two sub-detectors each operative to receive infra-red radiation from a corresponding one of at least two sub fields-of-view and signal processing circuitry, receiving output signals from the at least two sub-detectors and noting time relationships of the output signals from the at least two sub-detectors and providing a motion detection output in response to receipt of the output signals from the at least two sub-detectors having a time relationship which meets at least one predetermined criterion, at least one of the at least one predetermined criterion being time duration of at least one of the output signals.

In accordance with another preferred embodiment of the present invention two of the at least two sub-detectors have substantial horizontal separation therebetween. Preferably, the at least one predetermined criterion is based at least in part on the extent of the substantial horizontal separation.

In accordance with yet another preferred embodiment of the present invention the at least two sub-detectors are angled with respect to each other by a horizontal separation angle and the at least one predetermined criterion is based at least in part on the extent of the horizontal separation angle. In accordance with still another preferred embodiment of the present invention each of the at least two sub fields-of-view includes at least one detection zone which diverges by a corresponding horizontal divergence angle and the at least one predetermined criterion is based at least in part on the extent of the horizontal divergence angles.

In accordance with another preferred embodiment of the present invention the at least one predetermined criterion includes at least one of whether a time duration of at least one of the output signals lies within a predetermined range of values, whether a time duration between receipt of a first output signal from a first one of the at least two sub-detectors and receipt of a second output signal from a second one of the at least two sub-detectors lies within a predetermined range of values, whether a ratio of a first time duration of the first output signal and a second time duration of the second output signal lies within a predetermined range of values, whether a ratio of the first time duration of the first output signal and the time duration between receipt of a first output signal from a first one of the at least two sub-detectors and receipt of a second output signal from a second one of the at least two sub-detectors lies within a predetermined range of values and whether a ratio of the second time duration of the second output signal and the time duration between receipt of a first output signal from a first one of the at least two sub-detectors and receipt of a second output signal from a second one of the at least two sub-detectors lies within a predetermined range of values.

In accordance with yet another preferred embodiment of the present invention the signal processing circuitry utilizes the time relationships of the output signals from the at least two sub-detectors to compute a speed of motion of an intruder generating the output signals and provides the motion detection output if the speed of motion is within a predetermined speed range. Preferably, the predetermined speed range is between 0.1 to 3 meters per second.

Additionally or alternatively, the signal processing circuitry utilizes the time relationships of the output signals from the at least two sub-detectors to compute a distance from the detector of an intruder generating the output signals and provides the motion detection output if the distance is within a predetermined distance range. Alternatively or additionally, the signal processing circuitry utilizes the extent of at least one of the substantial horizontal separation between the at least two sub-detectors; the horizontal separation angle between the at least two sub fields-of-view and a divergence angle of at least one detection zone of at least one of the at least two sub fields-of-view to compute the distance and provides the motion detection output if the distance is within the predetermined distance range.

Additionally or alternatively, the signal processing circuitry utilizes the time relationships of the output signals from the at least two sub-detectors to compute a ratio representing an extent of change in a speed of motion of an intruder generating the output signals of the at least two sub-detectors and provides the motion detection output if the ratio, representing the extent of change in the speed of motion of the intruder, is within a predetermined ratio range. Alternatively or additionally, the signal processing circuitry utilizes the time relationships of the output signals from the at least two sub-detectors to compute a ratio $(t_1/t_2)/(Z_0/t/K)$ representing an extent of change in a speed of motion of an intruder generating the output signals of the at least two sub-detectors and provides the motion detection output if the ratio $(t_1/t_2)/(Z_0/t/K)$ is within a predetermined ratio range. Preferably, predetermined ratio range is within at least one of the ranges 0.7 to 1.5 and 0.8 to 1.3.

In accordance with another preferred embodiment of the present invention at least one of the at least two sub fields-of-view includes a curtain-like sub field-of-view. Preferably, the curtain-like sub field-of-view extends generally through 90 degrees. Additionally, the curtain-like sub field-of-view extends generally through 90 degrees from the vertical to the horizontal.

In accordance with yet another preferred embodiment of the present invention at least one of the at least two sub fields-of-view includes a non-curtain like sub field-of-view.

In accordance with another preferred embodiment of the present invention at least one of the at least two sub-detectors includes a single element sensor. Alternatively or additionally, at least one of the at least two sub-detectors includes a multiple element sensor.

In accordance with yet another preferred embodiment of the present invention the signal processing circuitry also includes a traversal logic functionality, which provides an alarm enabling signal based at least in part on a direction of traversal of the at least two sub fields-of-view, and provides the motion detection output based at least in part on the alarm enabling signal.

In accordance with another preferred embodiment of the present invention the traversal logic functionality provides the alarm enabling signal if at least one of the at least two sub fields-of-view was traversed. Additionally or alternatively, the traversal logic functionality provides the alarm enabling signal if at least two of the at least two sub fields-of-view were traversed. Additionally, the traversal logic functionality provides the alarm enabling signal if at least two of the at least two sub fields-of-view were traversed in a first direction and were not traversed in a second direction, generally opposite to the first direction. Alternatively or additionally, the traversal logic functionality provides the alarm enabling signal if at least two of the at least two sub fields-of-view were traversed in a first direction at least a predetermined time following traversal of the at least two sub fields-of-view in a second direction, generally opposite to the first direction.

There is still further provided in accordance with yet another preferred embodiment of the present invention a passive infra-red detector including at least two sub-detectors, each operative to receive infra-red radiation from a corresponding one of at least two sub fields-of-view and signal processing circuitry, receiving output signals from the at least two sub-detectors and noting time relationships of the output signals from the at least two sub-detectors and providing a motion detection output in response to receipt of the output signals from the at least two sub-detectors, representing traversal of the at least two sub fields-of-view, having a time relationship which meets at least one predetermined criterion, at least one of the at least one predetermined criterion being traversal of the at least two sub fields-of-view in a first direction at least a predetermined time following traversal of the at least two sub fields-of-view in a second direction, generally opposite to the first direction.

In accordance with another preferred embodiment of the present invention the signal processing circuitry selectably provides at least one of a visual indication and an audible indication during the predetermined time. Additionally, the signal processing circuitry selectably provides both the visual indication and the audible indication during the predetermined time.

In accordance with another preferred embodiment of the present invention the predetermined time is defined by a user.

There is yet further provided in accordance with even a further preferred embodiment of the present invention an intrusion detector including a housing and at least first and second passive infra-red detectors disposed in the housing, each being adapted for providing a separate detector output to an external alarm controller, each of the first and second passive infra-red detectors having a plurality of detection zones, the detection zones of the first passive infra-red detector being non-overlapping with the detection zones of the second passive infra-red detector, detection zones of the first passive infra-red detector being azimuthally interlaced with detection zones of the second passive infra-red detector.

In accordance with another preferred embodiment of the present invention the at least first and second passive infra-red detectors are arranged to provide coverage over generally the same azimuthal detection region. In accordance with yet another preferred embodiment of the present invention individual detection zones of the first passive infra-red detector are each located intermediate a pair of individual detection zones of the second passive infra-red detector. Additionally or alternatively, individual detection zones of the second passive infra-red detector are each located intermediate a pair of individual detection zones of the first passive infra-red detector.

In accordance with still another preferred embodiment of the present invention the detection zones of the first passive infra-red detector are azimuthally interlaced with detection zones of the second passive infra-red detector at least at a central portion of the azimuthal detection region. Additionally or alternatively, the detection zones of the first passive infra-red detector are azimuthally interlaced with detection zones of the second passive infra-red detector in a pattern such that interference confined to one detection zone of the first passive infra-red detector is not sensed by an adjacent detection zone of the second passive infra-red detector.

In accordance with another preferred embodiment of the present invention the intrusion detector also includes at least first and second signal processing circuits associated with each of the at least first and second passive infra-red detectors and at least first and second output relays associated with the first and second signal processing circuits and being operative to provide the separate detector outputs to the external alarm controller.

In accordance with yet another preferred embodiment of the present invention the at least first and second output relays are operative to provide the separate detector outputs to the external alarm controller via corresponding at least first and second connection wires. Alternatively, the at least first and second output relays include at least first and second wireless output transmitters.

In accordance with still another preferred embodiment of the present invention one of the at least first and second signal processing circuits is operative to generate a detection output signal and to provide the detection output signal to the external alarm controller only if another of the at least first and second signal processing circuits detects motion within a predetermined time separation with respect to the generation of the detection output signal by the one of the at least first and second signal processing circuits. Additionally or alternatively, one of the at least first and second signal processing circuits is operative to generate a detection output signal and to provide the detection output signal to the external alarm controller only if another of the at least first and second signal processing circuits generates a detection output signal within a predetermined time separation with respect to the generation of the detection output signal by the one of the at least first and second signal processing circuits. Alternatively or additionally, one of the at least first and second signal processing circuits is operative to generate a detection output signal and to provide the detector output signal to the external alarm controller only if another of the at least first and second signal processing circuits does not simultaneously generate a detection output signal.

In accordance with another preferred embodiment of the present invention the at least first and second signal processing circuits are operative to provide a common detection output signal to the external alarm controller.

In accordance with still another preferred embodiment of the present invention each of the plurality of detection zones includes a plurality of finger-like regions. Additionally, the plurality of finger-like regions includes four finger-like regions.

In accordance with another preferred embodiment of the present invention each of the plurality of detection zones includes a pair of vertically separated detection zones. Additionally, at least one of the pair of vertically separated detection zones includes a curtain-like detection zone.

In accordance with still another preferred embodiment of the present invention each of the plurality of detection zones includes a single vertically distributed curtain-like detection zone.

In accordance with another preferred embodiment of the present invention the plurality of detection zones is defined by a corresponding plurality of optical elements. Additionally, at least one of the corresponding plurality of optical elements includes at least one non-focusing optical element. Additionally, the at least one non-focusing optical element includes at least one reflective optical element.

Alternatively, at least one of the corresponding plurality of optical elements includes at least one focusing element. Additionally, the at least one focusing element includes at least one of a reflective element, a refractive element, a diffractive element and a cylindrical optical element.

There is still further provided in accordance with yet another preferred embodiment of the present invention a passive infra-red detector having a field-of-view including multiple detection zones, the detector including a housing adapted for mounting adjacent a ceiling of a room and having at least one aperture for passage of infra-red radiation therethrough, at least one sensor disposed in the housing and at least one infra-red radiation director including a plurality of infra-red optical elements associated with corresponding ones of the multiple detection zones, each of the plurality of infra-red optical elements being operative to receive infra-red radiation from at least one of the multiple detection zones and to direct the infra-red radiation to the at least one sensor along a corresponding radiation path, a plurality of the radiation paths generally intersecting at an intersection region located at the at least one aperture, the at least one aperture being generally of the same size as the size of the intersection region.

There is yet further provided in accordance with still another preferred embodiment of the present invention a passive infra-red detector having a field-of-view including multiple detection zones, the detector including a housing adapted for mounting adjacent a ceiling of a room and having at least one aperture for passage of infra-red radiation therethrough, at least one sensor disposed in the housing and at least one infra-red radiation director including multiple infra-red optical elements, each of the multiple detection zones being exclusively defined by one of the multiple infra-red optical elements which does not define any other of the multiple detection zones; the multiple infra-red optical elements being operative to receive infra-red radiation from the multiple detection zones and to direct the infra-red radiation to the at least one sensor along a corresponding radiation path, a plurality of the radiation paths generally intersecting at an intersection region located at the at least one aperture, the at least one aperture being generally of the same size as the intersection region.

In accordance with another preferred embodiment of the present invention the housing includes a first housing surface adapted to lie generally parallel to the ceiling and the at least one aperture is formed in a second housing surface extending generally parallel to the first housing surface. In accordance with yet another preferred embodiment of the present invention the at least one aperture includes a plurality of apertures and the at least one sensor includes a single sensor.

In accordance with still another preferred embodiment of the present invention the at least one aperture includes a first plurality of apertures and wherein the at least one sensor includes a number of sensors which is less than the first plurality. Alternatively, the at least one aperture includes a first plurality of apertures, the at least one sensor includes a first plurality of sensors and infra-red radiation received by each of the first plurality of sensors is directed through a different one of the first plurality of apertures. Alternatively, the at least one aperture includes a single aperture and wherein the at least one sensor includes a single sensor.

In accordance with another preferred embodiment of the present invention the housing is adapted for mounting adjacent the ceiling in a corner of the room.

In accordance with still another preferred embodiment of the present invention at least one of the plurality of infra-red optical elements includes a non focusing optical element. Additionally, the non-focusing element is a reflective optical element. Additionally or alternatively, at least one of the plurality of infra-red optical elements includes a focusing element. Additionally, the focusing element includes at least one of a reflective element, a refractive element, a diffractive element and a cylindrical optical element.

In accordance with another preferred embodiment of the present invention the passive infra-red detector also includes a window transparent to infra-red radiation, located adjacent the at least one aperture. In accordance with yet another preferred embodiment of the present invention a center of the window is located generally at a center of the at least one aperture.

In accordance with still another preferred embodiment of the present invention the window has a circular cross-section. Alternatively, the window is generally flat. Preferably, the window is formed of at least one of HDPE, Silicon and Germanium.

In accordance with another preferred embodiment of the present invention the passive infra-red detector also includes masking detection functionality for providing an alarm output upon detection of masking materials obstructing the window. In accordance with yet another preferred embodiment of the present invention the passive infra-red detector also includes a guard element surrounding the window for providing mechanical protection to the window.

In accordance with still another preferred embodiment of the present invention the passive infra-red detector also includes at least one intermediate reflecting surface located along an optical path defined by the at least one infra-red radiation director at a location suitable for redirecting radiation from the at least one infra-red radiation director to the at least one sensor. In accordance with another preferred embodiment of the present invention the at least one intermediate reflecting surface includes a single hyperbolic reflecting surface.

BRIEF DESCRIPTION OF THE DRAWINGS

The present invention will be understood and appreciated more fully from the following detailed description, taken in conjunction with the drawings in which:

FIG. 6 is a simplified illustration of the detector of FIGS. 4 and 5, showing details of detection zones;

FIG. 7A is a simplified illustration of intruder responsive outputs of dual element sensors, of two adjacent respective sub-detectors in the embodiments of FIGS. 1-6, whose fields-of-view do not overlap;

FIG. 7B is a simplified illustration of intruder responsive outputs of dual element sensors, of two adjacent respective sub-detectors in the embodiments of FIGS. 1-6, whose fields-of-view do overlap;

FIGS. 8B-8G are each a simplified illustration of a different signal which is not typical of a human intrusion sensed by a detector of the type shown in FIGS. 1-3 which has sub-detectors whose fields-of-view do not overlap;

FIG. 12 is a simplified pictorial illustration of a detector constructed and operative in accordance with a further preferred embodiment of the present invention;

FIG. 13 is a simplified sectional illustration of the detector of FIG. 12, taken along section lines XIII-XIII in FIG. 12;

FIG. 30 is a simplified pictorial illustration of a detector constructed and operative in accordance with another preferred embodiment of the present invention;

FIG. 34 is a simplified pictorial illustration of a detector assembly constructed in accordance with yet another preferred embodiment of the present invention;

FIGS. 35A and 35B are respective sectional illustrations of the detector assembly of FIG. 34, taken along respective section lines XXXVA-XXXVA and XXXVB-XXXVB in FIG. 34;

FIGS. 42A and 42B are respectively, a top view illustration and a side view illustration of a radiation pattern received by the detector assembly of FIG. 41;

FIG. 43 is a simplified block diagram of the detector assembly of FIG. 41;

FIG. 44 is a simplified pictorial illustration of a detector assembly constructed in accordance with still another preferred embodiment of the present invention;

FIGS. 45A and 45B are respective sectional illustrations of the detector assembly of FIG. 44, taken along respective section lines XLVA-XLVA and XLVB-XLVB in FIG. 44;

DETAILED DESCRIPTION OF PREFERRED EMBODIMENTS

Figure 1:
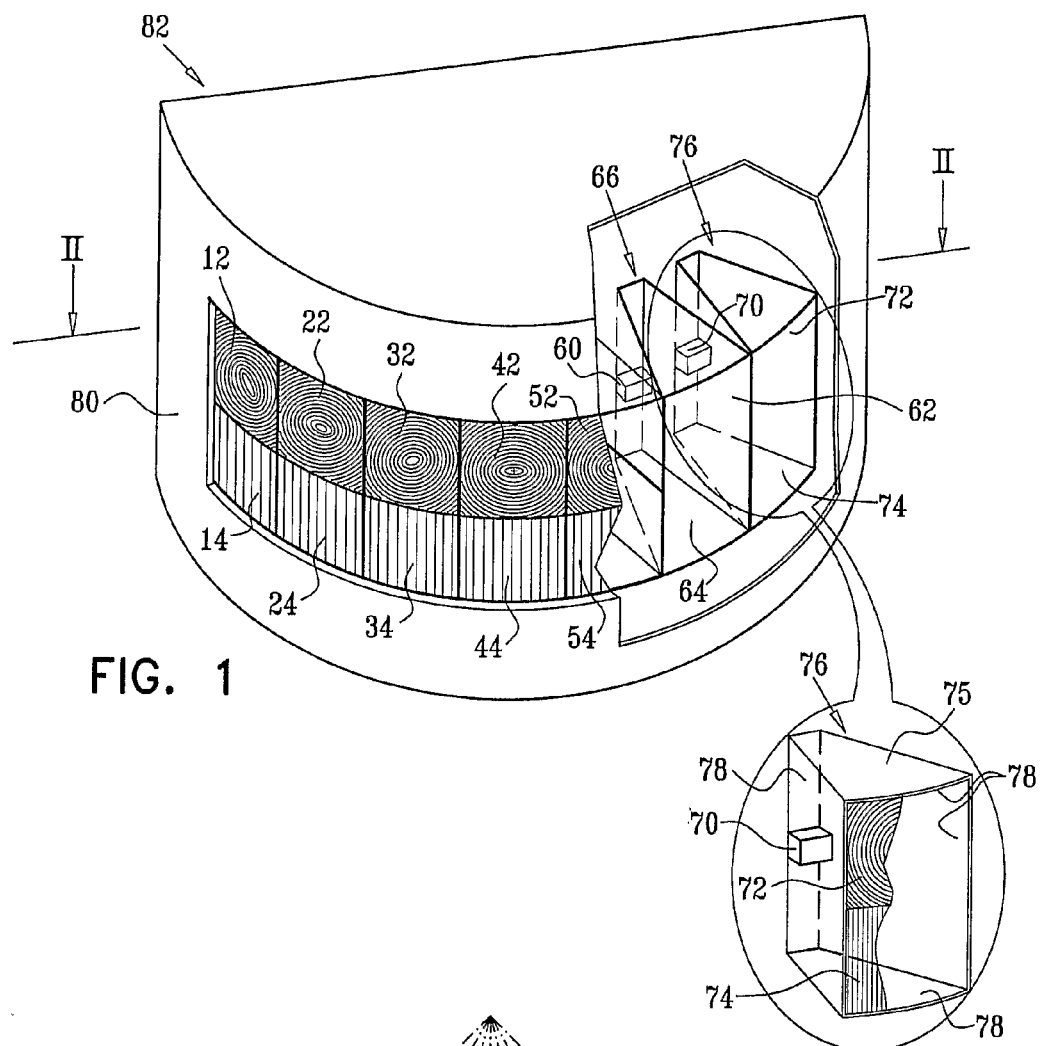
FIG. 1 is a simplified pictorial illustration of a detector, including lenses, constructed and operative in accordance with a preferred embodiment of the present invention.

For the sake of clarity of description throughout, the following definitions are employed generally throughout.

A "zone" is defined to include fingers of radiation, each corresponding to a detection region seen by a single element of a sensor through an optical segment, and the region or regions therebetween. Thus, when dual element sensors are employed, each zone includes two fingers.

A "sub field-of-view" is defined to include one or more zones and the region or regions therebetween.

A "field-of-view" is defined to include one or more sub fields-of-view.

It is important to note that in detectors designed to protect wide azimuthal areas, the field-of-view may be divided into multiple sub fields-of-view, which typically correspond in number to the number of lens or mirror segments in the uppermost row of optical elements.

The term "azimuth" refers to the angular extent of a zone, sub field-of-view or field-of-view in a plane wherein expected intruder motion mainly takes place. For the purpose of description herein, the term "horizontal" generally refers to a plane which extends generally azimuthally. It is assumed that a detector is installed such that its azimuth is generally parallel to a surface along which motion of the intruder is expected to occur.

When a person moves within the field-of-view of the detector, he traverses individual zones. As a result, a sensor which is common to all zones produces a series of electrical "desired signals" wherein each "desired signal" at any specific moment in time corresponds to the IR energy received only from the specific zone viewing the location of the person at that specific moment. Each sub field-of-view can include various zones which may correspond to optical elements located in different rows, viewing different parts of the person's body concurrently.

In general, the sensitivity of conventional detectors is selected to detect the level of a "desirable signal" that is received from a single zone or sub field-of-view when a person passes therethrough.

In accordance with a preferred embodiment of the present invention, the field-of-view is divided into generally non-overlapping sub fields-of-view, each associated with a separate sensor. Each such sensor receives radiation only from the sub field-of-view with which it is associated and not from the other sub fields-of-view. As explained hereinabove, each such sub field-of-view is associated with certain segments of the detector's lens or mirror assembly, and not with the entire optical system. In a preferred design, the multiple sensors and their associated optical segments are optically separated from each other, for instance by partitions, compartments or by the optical design, so that each sensor does not view the sub fields-of-view associated with other sensors.

Accordingly, the present invention provides an improved detector, which comprises a multiplicity of sub-detectors, each sub-detector comprising a sensor and one or more optical segments defining its corresponding sub field-of-view. Therefore, each sub-detector views only a part of the entire area covered by the detector. As a result, at any given time, each sensor is exposed to "desired signals", and interference, coming only from one sub field-of-view and only from the optical element or optical elements associated with that sub field-of-view.

Figure 2:
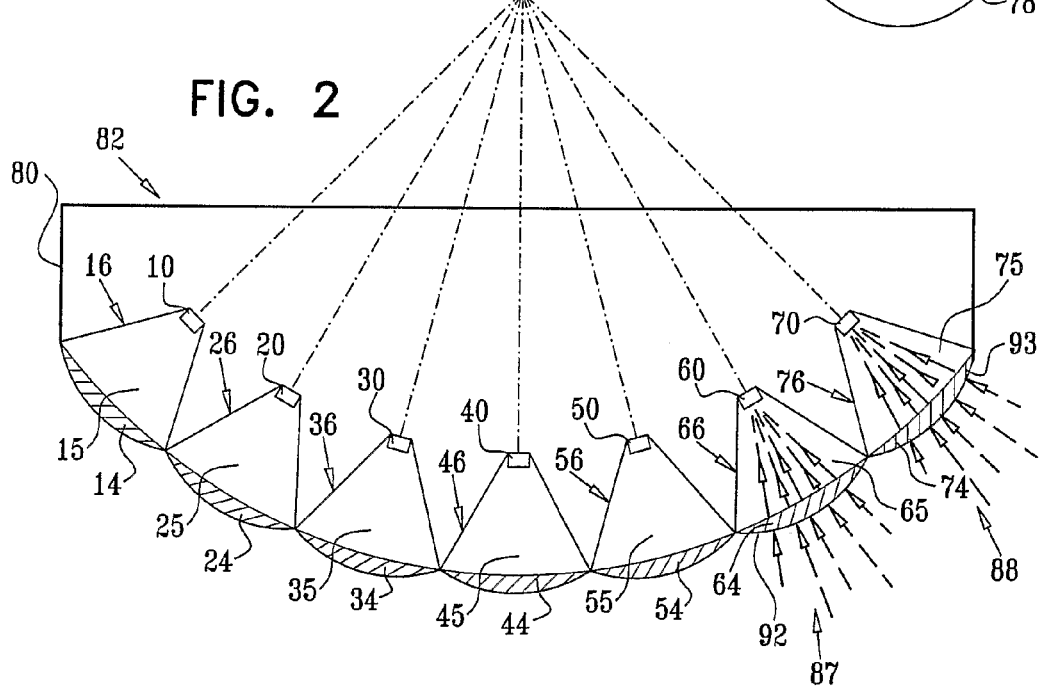
FIG. 2 is a simplified sectional illustration of the detector of FIG. 1, taken along section lines II-II in FIG. 1.
Figure 3:
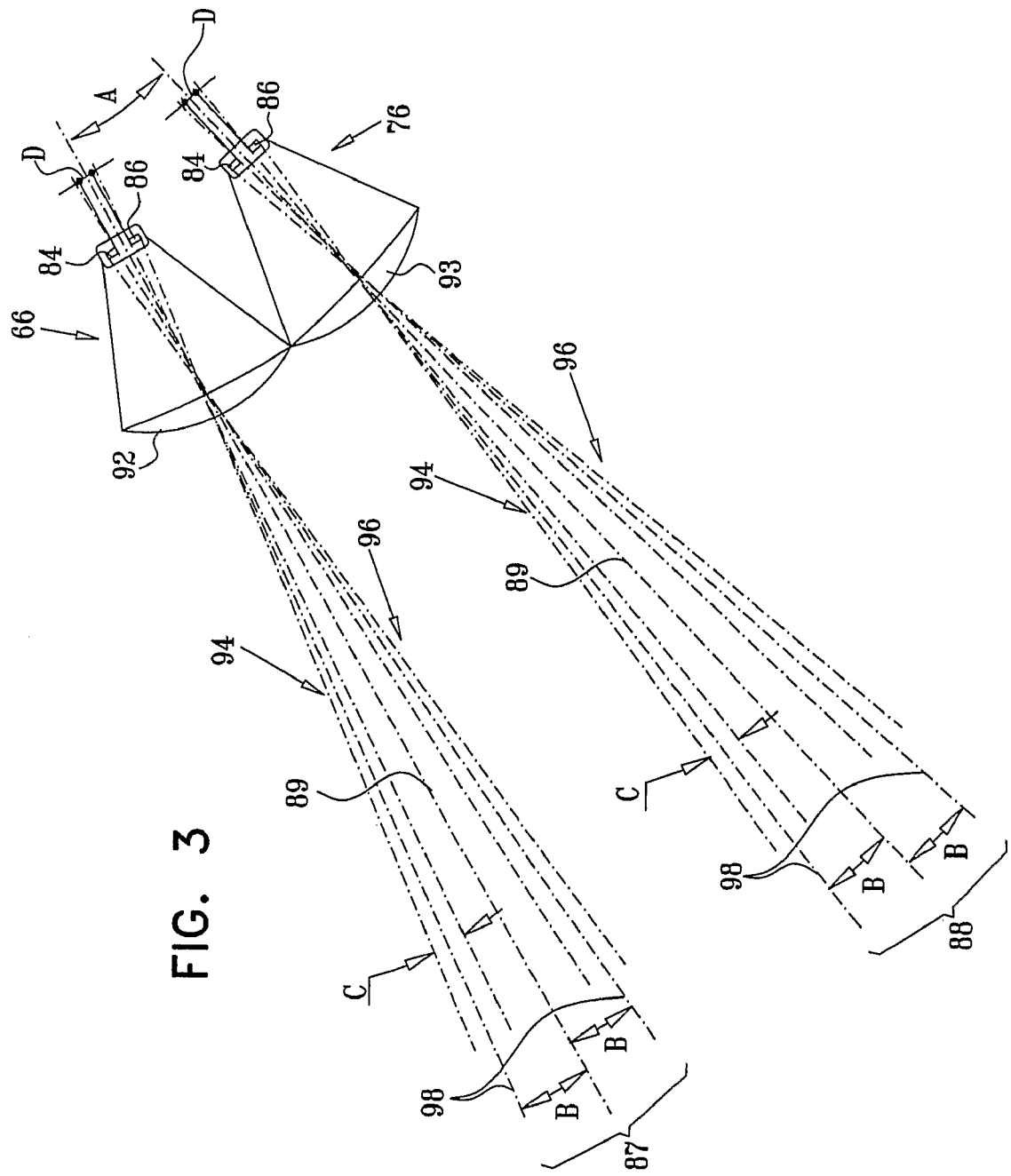
FIG. 3 is a simplified illustration of part of the detector of FIGS. 1 and 2, showing details of detection zones.

Reference is now made to FIGS. 1-3, which illustrate a lens-based outdoor detector constructed and operative in accordance with a preferred embodiment of the present invention. Specifically, FIG. 1 is a general view of a detector comprising seven sub-detectors, each sub-detector including a pyroelectric sensor associated with one or more corresponding lens segments, defining a corresponding sub field-of-view. The seven sub fields-of-view are preferably, but not necessarily, not overlapping. As shown in FIG. 2, each of the seven sub fields-of-view includes two mutually vertically separated zones.

Preferably, the sub fields-of-view, corresponding to each of the sub-detectors, are substantially non-overlapping and are angled with respect to each other, such that adjacent sub fields-of-view are separated by no more than 30 degrees or by no more than 3 meters at the effective far end of the corresponding sub fields-of-view, which is determined by the detector design. Such separation between adjacent sub fields-of-view provides detection coverage of the field-of-view as required by various international standards, such as European standard TS 50131-2-2 and IEC-639-2-6, which require the detector to detect an intruder traversing a distance of three meters at certain angles and directions. Each of the sub-detectors preferably views a portion of the entire field-of-view of the detector, such that the detector provides a wide coverage area, for example having a field-of-view divergence angle of 60 degrees or more.

As seen in FIGS. 1 and 2, the sensors are arranged so that each sensor is exclusively associated with certain lens segments. In the illustrated embodiment, a sensor 10 is associated with lens segments 12 and 14, defining a sub-detector 16. In a similar manner, sensors 20, 30, 40, 50, 60 and 70 are associated respectively with lens segments 22 and 24, 32 and 34, 42 and 44, 52 and 54, 62 and 64 and 72 and 74, defining respective sub-detectors 26, 36, 46, 56, 66, and 76. As shown in FIGS. 1 and 2, sub-detectors 16, 26, 36, 46, 56, 66 and 76 are preferably arranged in a convex arrangement in a circular arc within a housing element 80, thereby together to define the detector, which is designated by reference numeral 82. Additionally, the detector may also include several sub-detectors associated with one or more common lens segments.

The lens segments 12, 22, 32, 42, 52, 62 and 72 are preferably Fresnel lenses, while the lens segments 14, 24, 34, 44, 54, 64 and 74 are preferably cylindrical type lenses. Any other suitable type of lens elements, such as, for example, diffractive lenses, and any suitable arrangement thereof, may be employed.

Alternatively, each sub-detector may include only a single lens segment. This may be beneficial, for example, if the vertical angle between the sub fields-of-view of lens segments in upper and lower rows of lens segments is relatively large, so that a person moving in front of the detector is not normally viewed by both lens segments simultaneously. Such an embodiment reduces the "undesired signals" viewed by each sub-detector at the expense of increasing the number of sub-detectors.

As a further alternative, each sub-detector may be associated with several lens segments, including lens segments lying in the same vertical plane as well as lens segments lying in the same horizontal row. In such a case, each sub field-of-view includes plural mutually azimuthally separated detection zones and plural mutually vertically separated detection zones. For instance, a single sub-detector could be associated with lens segments 22, 32, 24 and 34. This embodiment may be beneficial for instance in cases where the number or density of the lens segments within a horizontal row is relatively high and the horizontal angle between the sub fields-of-view of the lens segments is relatively small. In such cases it may be possible to reduce the cost of the detector by reducing the number of the sub-detectors, especially when the detector is designed for indoor environments having a moderate level of "undesired signals".

As seen in FIGS. 1 and 2, each of sensors 10, 20, 30, 40, 50, 60 and 70 of respective sub-detectors 16, 26, 36, 46, 56, 66 and 76 is preferably located within a corresponding sub-detector compartment. The sub-detector compartments are designated respectively by reference numerals 15, 25, 35, 45, 55, 65 and 75. Each sub-detector compartment is defined by walls, such as walls 78 of compartment 75, seen clearly in the enlarged portion of FIG. 1, preferably having wall surfaces which are generally non-reflective to both IR and visible light. Suitable walls may be made of black plastic which is preferably conditioned to minimize reflection thereby. This arrangement allows each sensor to receive only radiation emanating from its corresponding sub field-of-view, as defined by the lens segments associated therewith.

Preferably, each sub-detector compartment is a sealed compartment that prevents entry of air drafts and insects.

It is a particular feature of an embodiment of the present invention that signal processing circuitry which receives output signals from at least two of sub-detectors 16, 26, 36, 46, 56, 66 and 76, notes multiple detections by one of the sub-detectors within a predetermined first time period and the absence of detections by another of the sub-detectors and is operative to ignore future detections by the sub-detector that had multiple detections for at least a predetermined second time period.

Preferably, the signal processing circuitry may ignore the future detections only in a case where the initial multiple detections fulfill predetermined pre-alarm criteria, and are likely to lead to a false alarm. Additionally or alternatively, the signal processing circuitry may ignore the future detections only in a case where the multiple detections fulfill predetermined alarm criteria.

The signal processing circuitry may extend the time duration during which the future detections are ignored in response to additional detections by the sub-detector during the predetermined second time period.

Additionally or alternatively, the signal processing circuitry may note a sequence of receipt of the output signals from sub-detectors 16, 26, 36, 46, 56, 66 and 76 and may provide motion path output information based on this sequence.

In accordance with a preferred embodiment of the present invention and as seen with particularity in FIG. 3, sensors 10, 20, 30, 40, 50, 60 and 70 each comprise dual element pyroelectric sensors, such as Perkin-Elmer LHi-968 sensors, each having first and second sensing elements 84 and 86, separated by a distance D.

FIG. 3 shows the detection fingers of each of sensing elements 84 and 86 for two adjacent sub-detectors such as sub-detectors 66 and 76 of detector 82. In the illustrated embodiment of FIG. 3, each sub-detector has a sub field-of-view, respectively indicated by reference numerals 87 and 88, each sub field-of-view having a central axis designated by reference numeral 89. FIGS. 2 and 3 show adjacent sub fields-of-view 87 and 88, defined by adjacent lens segments, respectively designated by reference numerals 92 and 93. The detection fingers in each of sub fields-of-view 87 and 88 are designated by reference numerals 94 and 96 in FIG. 3.

As seen in FIG. 3, each of the fingers 94 and 96 of each of the sub fields-of-view 87 and 88 is centered on a central axis indicated by reference numeral 98.

Several different angles may be seen in FIG. 3. Angle A separates the central axes 89 of adjacent sub fields-of-view 87 and 88. Angle B separates each of the central axes 98 of the fingers and the adjacent central axis 89 for each corresponding sub field-of-view. Accordingly, the angle between central axes 98 of adjacent fingers 94 and 96 in each sub field-of-view is 2B. Each of the fingers 94 and 96 diverges by a divergence angle C.

Figure 4:
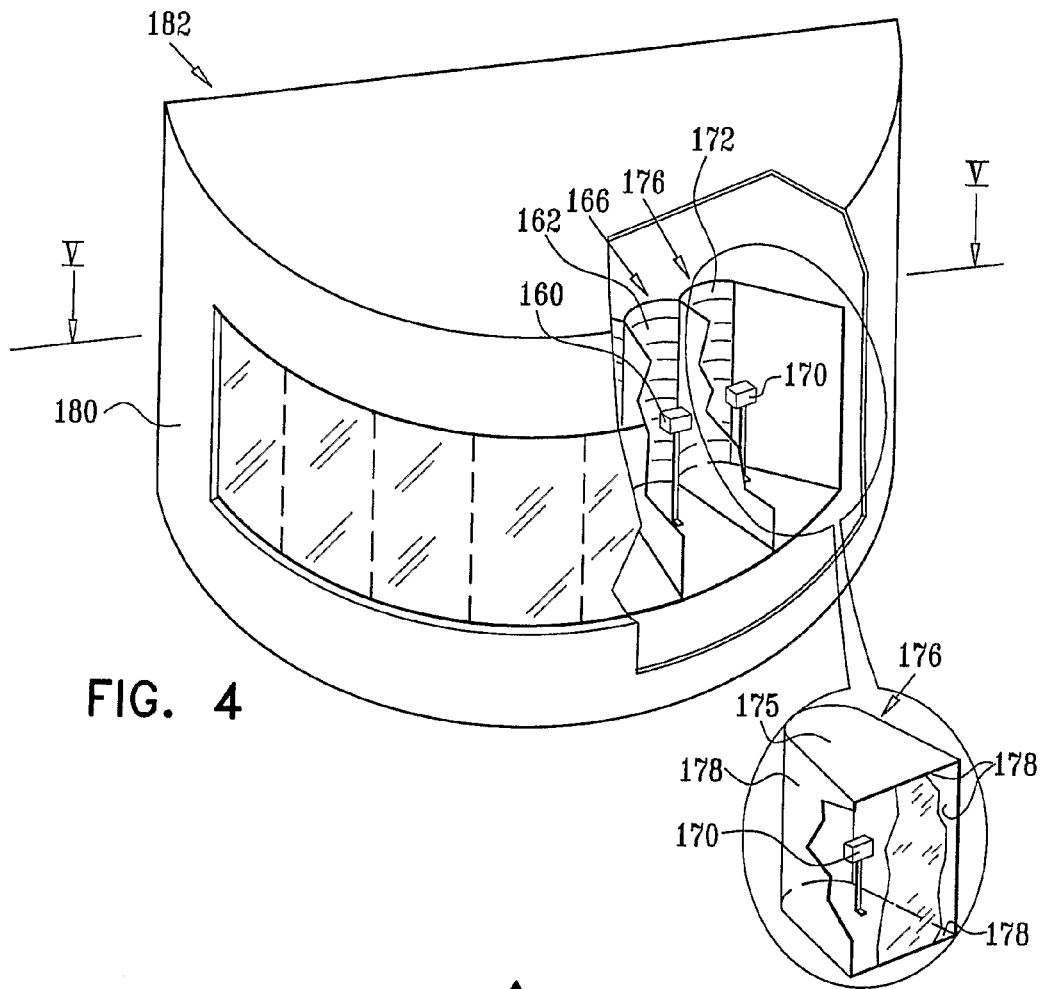
FIG. 4 is a simplified pictorial illustration of a detector, including mirrors instead of lenses, constructed and operative in accordance with another preferred embodiment of the present invention.
Figure 5:
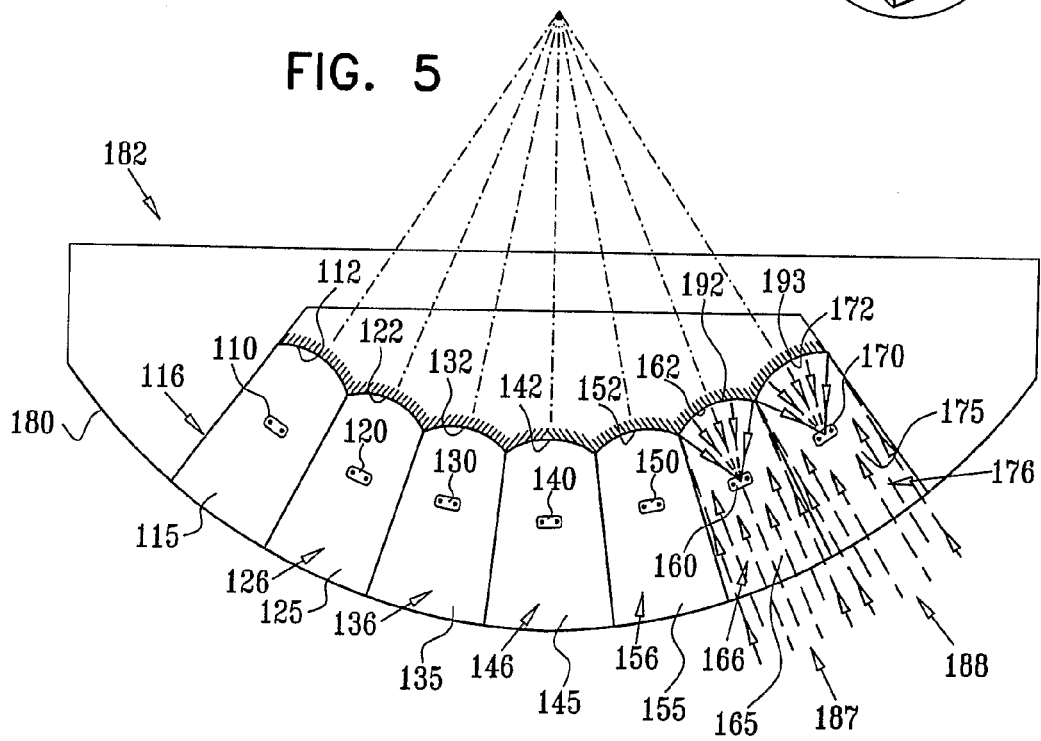
FIG. 5 is a simplified sectional illustration of the detector of FIG. 4, taken along section lines V-V in FIG. 4.

Reference is now made to FIGS. 4-6, which illustrate a detector constructed and operative in accordance with another preferred embodiment of the invention. The detector of FIGS. 4-6 is similar to that of FIGS. 1-3, with the lens segments in FIGS. 1-3 being replaced by mirror segments.

FIGS. 4, 5 and 6 illustrate a mirror-based outdoor detector constructed and operative in accordance with a preferred embodiment of the present invention. FIG. 4 is a general view of a detector comprising seven sub-detectors, each sub-detector including a pyroelectric sensor associated with one or more corresponding mirror elements, defining a corresponding sub field-of-view. The seven sub fields-of-view are preferably, but not necessarily, not overlapping.

Preferably, the sub fields-of-view, corresponding to each of the sub-detectors, are substantially non-overlapping and are angled with respect to each other, such that adjacent sub fields-of-view are separated by no more than 30 degrees or by no more than 3 meters at the effective far end of the corresponding sub fields-of-view, which is determined by the detector design. Such separation between adjacent sub fields-of-view provides detection coverage of the field-of-view as required by various international standards, such as European standard TS 50131-2-2 and IEC-639-2-6, which require the detector to detect an intruder traversing a distance of three meters at certain angles and directions. Each of the sub-detectors preferably views a portion of the entire field-of-view of the detector, such that the detector provides a wide coverage area, for example, having a field-of-view divergence angle of 60 degrees or more.

As seen in FIGS. 4 and 5, the sensors are arranged so that each sensor is exclusively associated with a single mirror segment. As seen particularly in FIG. 5, a sensor 110 is associated with a mirror segment 112, defining a sub-detector 116. In a similar manner, sensors 120, 130, 140, 150, 160 and 170 are associated with respective mirror segments 122, 132, 142, 152, 162 and 172, defining respective sub-detectors 126, 136, 146, 156, 166 and 176. As shown in FIGS. 4 and 5, sub-detectors 116, 126, 136, 146, 156, 166 and 176 are preferably arranged in a convex arrangement in a circular arc within a housing element 180, thereby together to define the detector, which is designated by reference numeral 182. Alternatively, the detector may include several sub-detectors associated with one or more common mirror segments.

As seen in FIGS. 4 and 5, each of sensors 110, 120, 130, 140, 150, 160 and 170 of respective sub-detectors 116, 126, 136, 146, 156, 166 and 176 is preferably located within a corresponding sub-detector compartment. The sub-detector compartments are designated respectively by reference numerals 115, 125, 135, 145, 155, 165 and 175. Each sub-detector compartment is defined by walls, such as walls 178 of compartment 175 seen clearly in the enlarged portion of FIG. 4, preferably having wall surfaces which are generally non-reflective to both IR and visible light. Suitable walls may be made of black plastic which is preferably conditioned to minimize reflection thereby. This arrangement allows each sensor to receive only radiation emanating from its corresponding sub field-of-view, as defined by the mirror segment associated therewith.

Alternatively, each sub-detector may be associated with several mirror segments, including multiple mirror segments lying in the same vertical plane and/or multiple mirror segments lying in the same horizontal row. In such a case, each sub field-of-view includes plural mutually azimuthally separated detection zones and plural mutually vertically separated detection zones. For instance, a single sub-detector may be associated with mirror segments 122 and 132. This embodiment may be beneficial for instance in cases where the number or density of the mirror segments within a horizontal row is relatively high and the horizontal angle between the zones defined by the mirror segments is relatively small. In such cases it may be possible to reduce the cost of the detector by reducing the number of the sub-detectors, especially when the detector is designed for indoor environments having a moderate level of undesired signals.

Preferably, each sub-detector compartment is a sealed compartment that prevents entry of air drafts and insects. At the front of each sub-detector compartment there is provided a window, preferably made of IR transparent material such as thin HDPE. The rear of each sub-detector compartment 115, 125, 135, 145, 155, 165 and 175 includes a curved mirror element, which defines one of mirror segments 112, 122, 132, 142, 152, 162 and 172 respectively.

It is a particular feature of an embodiment of the present invention that signal processing circuitry which receives output signals from at least two of sub-detectors 116, 126, 136, 146, 156, 166 and 176, notes multiple detections by one of the sub-detectors within a predetermined first time period and the absence of detections by another of the sub-detectors and is operative to ignore future detections by the sub-detector that had multiple detections for at least a predetermined second time period.

Preferably, the signal processing circuitry may ignore the future detections only in a case where the initial multiple detections fulfill predetermined pre-alarm criteria, and are likely to lead to a false alarm. Additionally or alternatively, the signal processing circuitry may ignore the future detections only in a case where the multiple detections fulfill predetermined alarm criteria.

The signal processing circuitry may extend the time duration during which the future detections are ignored in response to additional detections by the sub-detector during the predetermined second time period.

Additionally or alternatively, the signal processing circuitry may note a sequence of receipt of the output signals from sub-detectors 116, 126, 136, 146, 156, 166 and 176 and may provide motion path output information based on this sequence.

In accordance with a preferred embodiment of the present invention and as seen with particularity in FIG. 6, sensors 110, 120, 130, 140, 150, 160 and 170 each comprise dual element pyroelectric sensors such as Perkin-Elmer LHi-968 sensors, each having first and second sensing elements 184 and 186, separated by a distance D.

FIG. 6 shows the detection fingers of each of sensing elements 184 and 186 for two adjacent sub-detectors such as sub-detectors 166 and 176 of detector 182. In the illustrated embodiment of FIG. 6, each sub-detector has a sub field-of-view, respectively indicated by reference numerals 187 and 188, each sub field-of-view having a central axis designated by reference numeral 189. FIGS. 5 and 6 show adjacent sub fields-of-view 187 and 188, defined by adjacent mirror segments, respectively designated by reference numerals 192 and 193. The detection fingers in each of sub fields-of-view 187 and 188 are designated by reference numerals 194 and 196 in FIG. 6.

As seen in FIG. 6, each of the fingers 194 and 196 of each of the sub fields-of-view 187 and 188 is centered on a central axis indicated by reference numeral 198.

Several different angles may be seen in FIG. 6. Angle A separates the central axes 189 of adjacent sub fields-of-view 187 and 188. Angle B separates each of the central axes 198 of the fingers and the adjacent central axis 189 for each corresponding sub field-of-view. Accordingly, the angle between central axes 198 of adjacent fingers 194 and 196 in each sub field-of-view is 2B. Each of the fingers 194 and 196 diverges by a divergence angle C.

Considering FIGS. 3 and 6 it is appreciated that the sub fields-of-view of adjacent sub-detectors, such as sub-detectors 66 and 76 in FIG. 3 and sub-detectors 166 and 176 in FIG. 6, are not overlapping if the following angular relationship exists:

$$2B+C<A$$

As noted above and as is known in the art, the angle B is a function of the distance D between adjacent sensing elements, such as sensing elements 84 and 86 in FIG. 3 or sensing elements 184 and 186 in FIG. 6, and/or a function of the focal length of the corresponding optical element, such as lens segments 62 or 72 in FIGS. 1 and 2 and mirror segments 162 or 172 in FIGS. 4 and 5.

As is known in the art, the angle C is a function of the width of each sensing element, such as sensing elements 84 and 86 in FIG. 3 or sensing elements 184 and 186 in FIG. 6, and/or a function of the focal length of the corresponding optical element, such as lens segments 62 or 72 in FIGS. 1 and 2 and mirror segments 162 or 172 in FIGS. 4 and 5.

As is known in the art, the angle A is a design parameter, which is determined based on performance requirements.

It is a particular feature of the present invention that the sub fields-of-view of each of the sub-detectors are not entirely overlapping. Most preferably, sub fields-of-view of different sub-detectors do not overlap at all.

Reference is made to FIG. 7A, which illustrates intruder responsive outputs of dual element sensors of two adjacent respective sub-detectors, such as sub-detectors 66 and 76 of the embodiment of FIGS. 1-3, whose sub fields-of-view do not overlap. It is seen that the signals do not overlap in time.

FIG. 7B illustrates intruder responsive outputs of dual element sensors of two adjacent respective sub-detectors, such as sub detectors 66 and 76 of the embodiment of FIGS. 1-3, whose sub fields-of-view partially overlap. It is seen that the signals partially overlap in time, but their peaks occur at different times.

It is a particular feature of the present invention that the structure described hereinabove with reference to FIGS. 1-6 enables enhanced signal processing which analyses and distinguishes more clearly between signals produced by movement of a person across the field-of-view of the detector and signals resulting from various types of interference.

For example, it may be assumed that motion of a person past the detector will be detected sequentially by at least two adjacent sub-detectors within a certain time duration corresponding to the speed of motion of the person. Should the signal produced by several sub-detectors not fit into a pre-defined pattern, which may be defined by an algorithm, it may be considered to be a false signal. For example, should the signal be received by only one sub-detector, or by two sub-detectors, which are not adjacent to one another, or should the signal have timing which is not in conformance with the expected speed of motion of a person, the signal may be regarded as a false signal and ignored.

Similarly, signals output by several sub-detectors at approximately the same time, which cannot result from motion of a person therepast, may be ignored. Such signals, especially when they have generally similar characteristics, such as amplitude, frequency or shape, are most probably a result of interference that affects several sub-detectors in a similar way.

FIGS. 8A-8G illustrate examples of signals produced by a detector of a multiple sub-detector embodiment such as detector 82 of FIGS. 1-3, having non-overlapping sub fields-of-view. Shown in FIGS. 8A-8G are several examples of signals produced by sensors 50, 60 and 70 of detector 82. In FIGS. 8A-9G, $t_1$ and $t_2$ represent time intervals between detection of motion from one sensor to an adjacent sensor, and $T_1$, $T_2$ and $T_3$ represent the duration of signals received by each sensor.

Figure 8A:
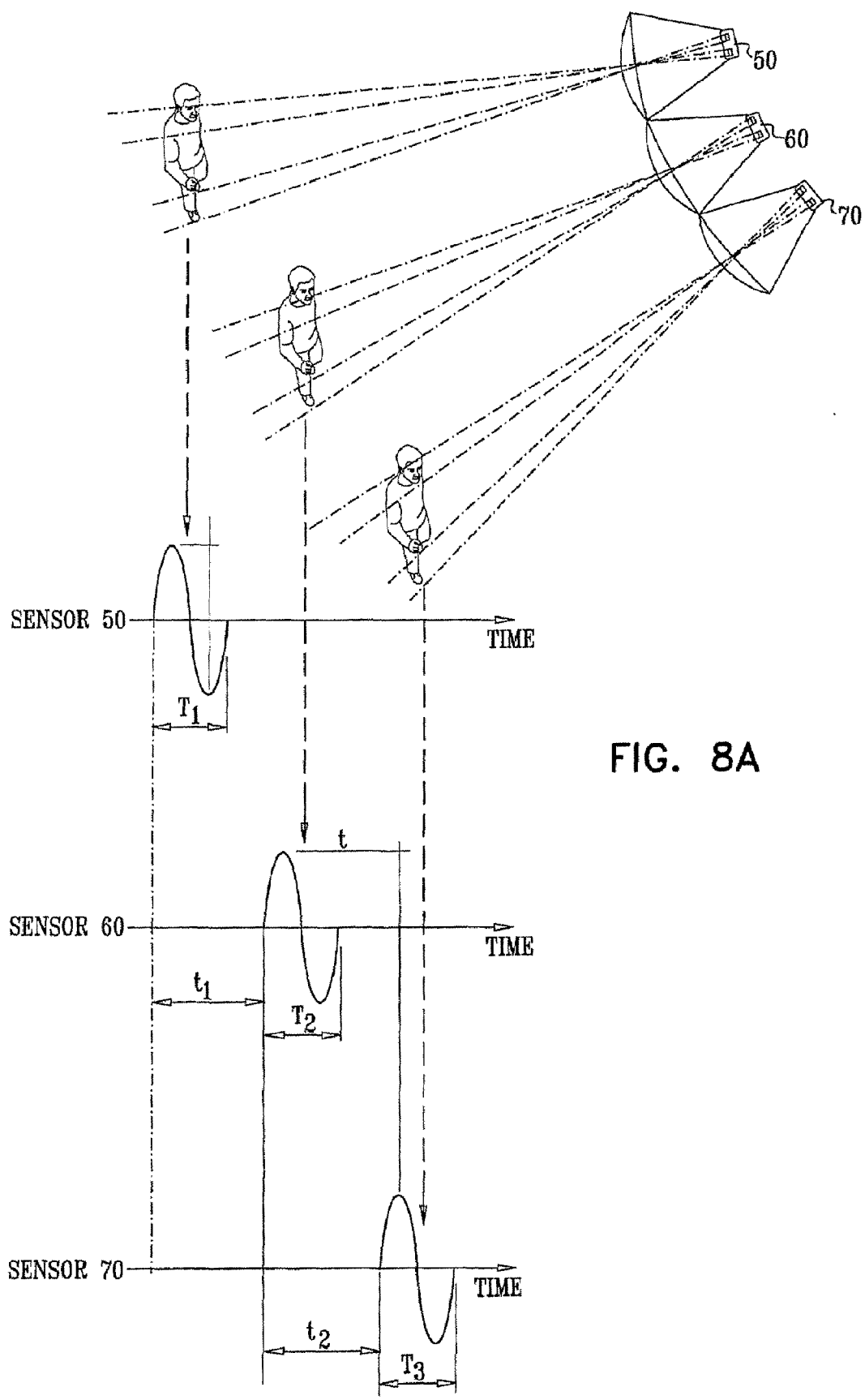
FIG. 8A is a simplified illustration of a signal indicative of a typical human intrusion sensed by a detector of the type shown in FIGS. 1-3 which has sub-detectors whose fields-of-view do not overlap.

FIG. 8A shows a typical example of signals produced by a person crossing adjacent sub fields-of-view of the sensors 50, 60 and 70. The motion of the person is initially detected by sensor 50 and thereafter, after a time interval $t_1$, the motion of the person is detected by sensor 60. After an additional time interval $t_2$, the motion of the person is detected by sensor 70. As can be seen, the signals of the three sensors 50, 60 and 70 are received in succession with generally uniform timing ($t_1$ generally equals $t_2$) and each signal has generally the same duration ($T_1 \approx T_2 \approx T_3$), which is characteristic of movement of a person in front of the detector at a uniform speed and at approximately the same distance from the detector.

Signal durations $T_1$, $T_2$ and $T_3$ may vary as a function of the angle 2B+C of the sub field-of-view of their corresponding sub-detectors 50, 60 and 70, as described hereinabove with reference to FIGS. 3 and 6, and of the angular speed of the moving person. Time intervals $t_1$ and $t_2$ are a function of the angle A between two adjacent sub-detectors 50 and 60 or 60 and 70, as illustrated in FIGS. 3 and 6, and the angular speed of the moving person. Because the specific design of the detector determines angles A, B and C, the respective ratios between the durations $T_1$, $T_2$ and $T_3$ and the time intervals $t_1$ and $t_2$ follow a characteristic pattern specific to the detector and can therefore be analyzed to determine whether a signal is due to human motion or interference.

If a person moves through the sub fields-of-view of sub-detectors 50, 60 and 70 at a generally constant angular speed (i.e. at a uniform speed and at approximately the same distance from the detector), the ratios $T_1/t_1$, $T_2/t_1$, $T_2/t_2$ and $T_3/t_2$ are generally the same.

In some designs it may be preferable to determine the duration, T, by measuring the time interval between adjacent positive and negative peaks of the sub-detector output signals and to determine the time interval, t, by measuring the time interval between adjacent positive peaks or negative peaks of two adjacent sub-detector signals.

The signals may differ in amplitude and shape due to variations in the background temperature and/or the type of motion. There may also be some variation in the time intervals (t), durations (T), or the ratios T/t, due to the person changing his speed of motion or distance from the detector during movement. However, as long as these variations are within certain limits, the signal may still be recognized as motion of a person.

Signal processing methods useful in the analysis of signals obtained from the detectors of the embodiments of FIGS. 1-6, as shown in FIGS. 8A-8G, are described in detail hereinbelow with reference to FIGS. 18 and 19.

Figure 8B:
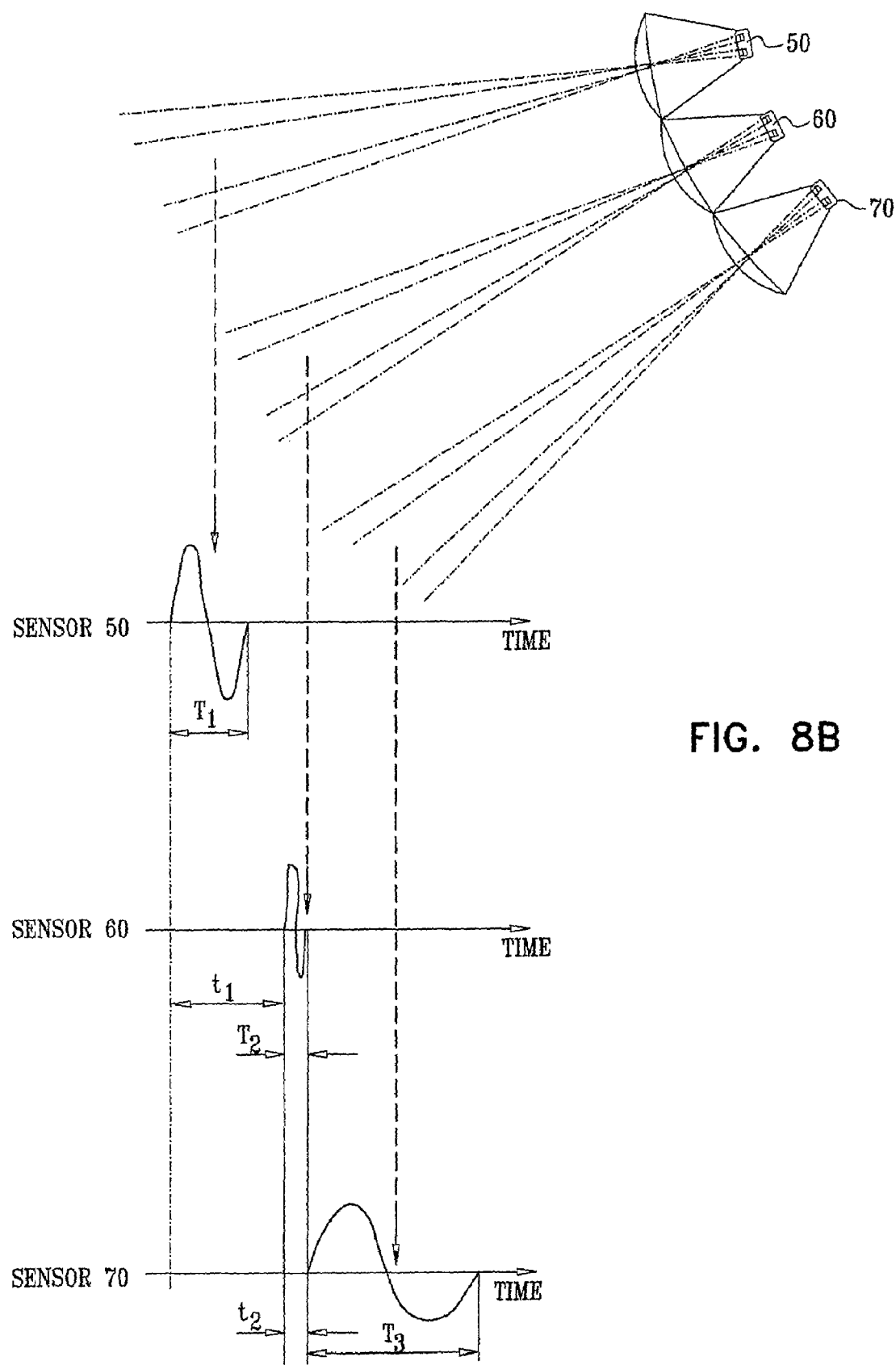

FIG. 8B shows signals from three different sub-detectors having different time durations. Although the signals occur in succession, it is unlikely that the speed of motion of a person varies to an extent sufficient to produce the differences in duration $T_1$, $T_2$ and $T_3$ and time intervals $t_1$ and $t_2$ as shown in FIG. 8B. It is also unlikely that signals resulting from human movement could create the significant variation in the ratios $T_2/t_1$, $T_2/t_2$, and $T_3/t_2$. Additionally, it is unlikely that there is no time gap between the signals of sensor 60 and sensor 70 when their respective sub fields-of-view do not overlap as in this embodiment. Therefore the signals of FIG. 8B can be recognized as resulting from interference and not from motion of a person.

FIG. 8C illustrates a case wherein signals are received from sensors 50 and 70 but not from sensor 60 which is located therebetween. This is unlikely to be a result of a motion of a person because such motion would be expected to produce a signal from sensor 60. It is more likely that this is a result of moving trees or bushes located in the sub fields-of-view of sensors 50 and 70 and not in the sub field-of-view of sensor 60.

Figure 8D:
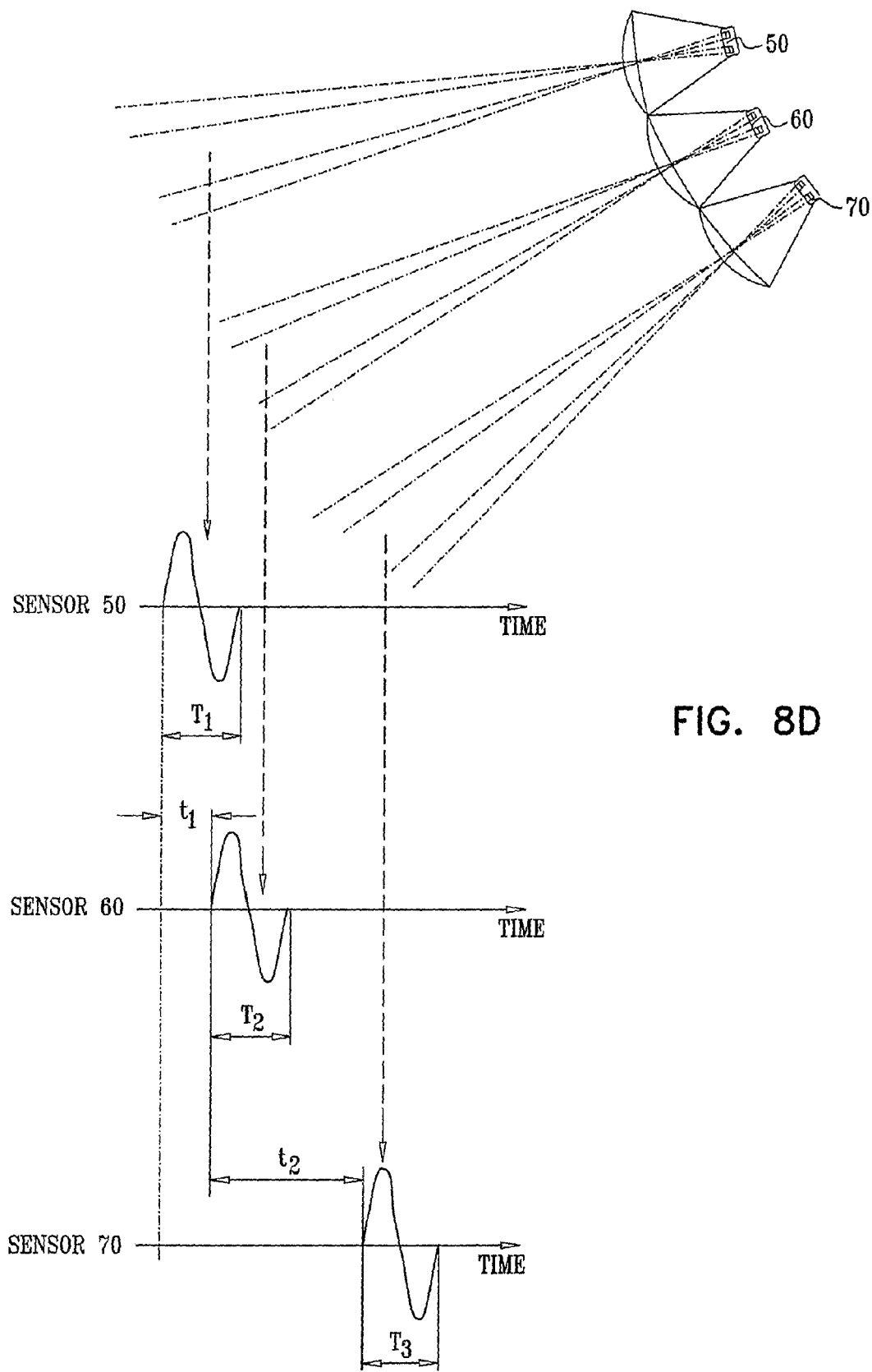

FIG. 8D shows signals having the same durations $T_1$, $T_2$ and $T_3$ produced by three different sub-detectors and having uniform shapes but non-uniform time separations $t_1$ and $t_2$ therebetween. Although the signals occur in succession, it is unlikely that the speed of motion of a person varies to an extent sufficient to produce the differences in timing $t_1$ and $t_2$ as shown in FIG. 8D. Also it is unlikely that there is overlap between the signals of sensor 50 and sensor 60 when their respective sub fields-of-view do not overlap as in this embodiment. Therefore the signals of FIG. 8D can be recognized as resulting from interference and not from motion of a person.

Figure 8E:
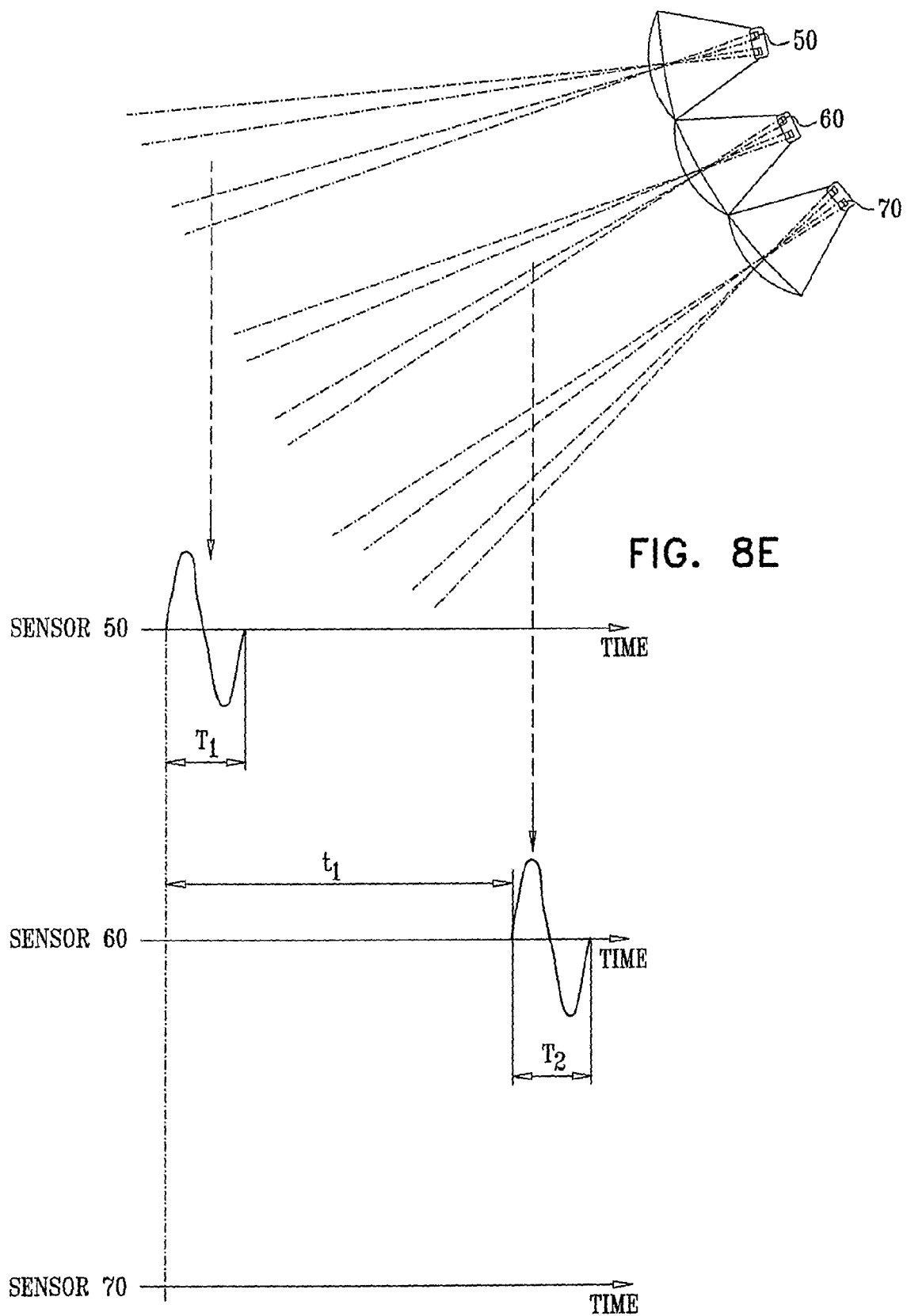

FIG. 8E illustrates a case wherein signals are received from sensors 50 and 60 with a large time difference $t_1$ therebetween. This is unlikely to be a result of a motion of a person because such motion would be expected to produce signal separated by a time interval which is substantially shorter than $t_1$.

Figure 8F:
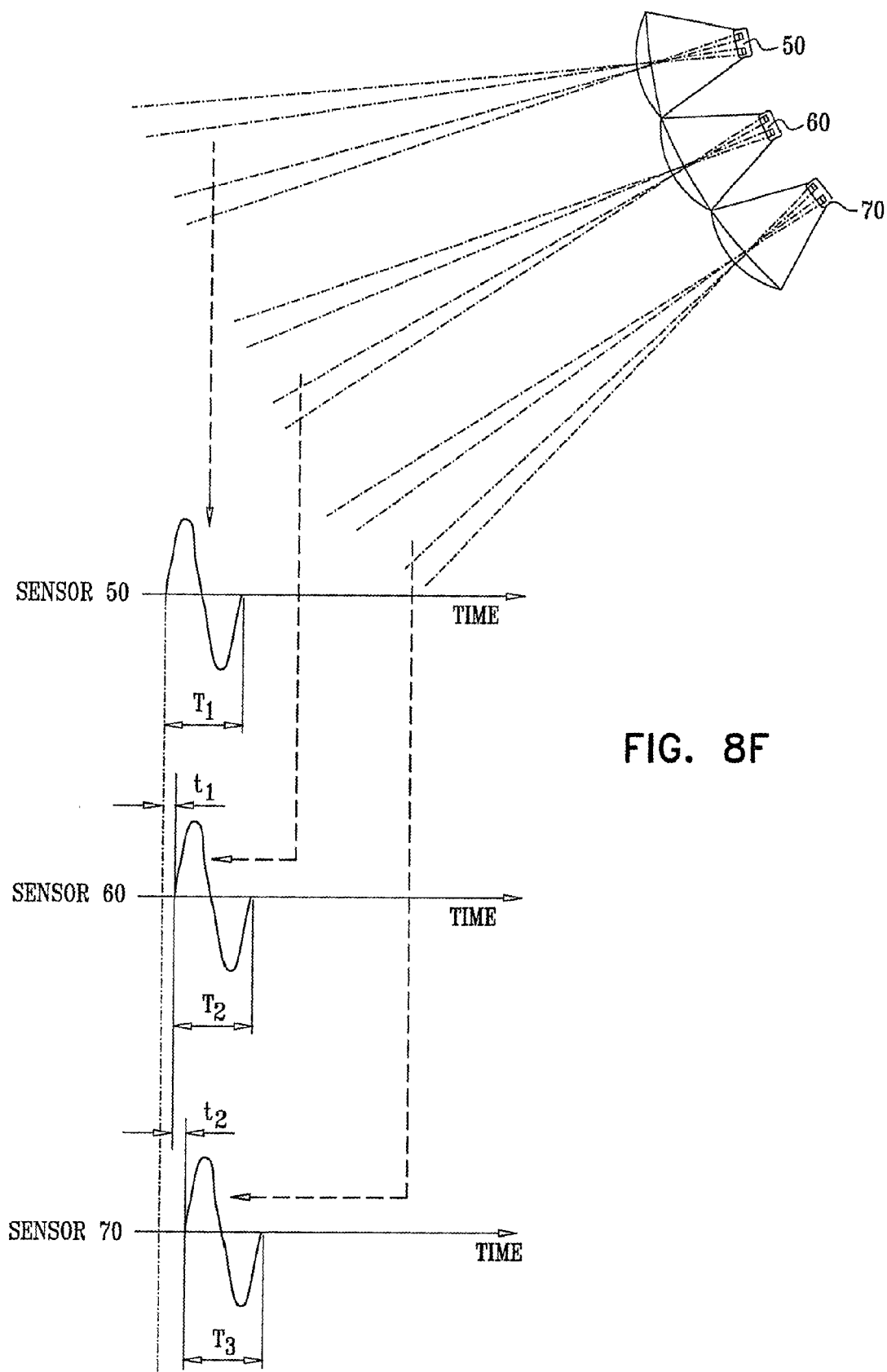

FIG. 8F shows three signals occurring at approximately the same time. The fact that the signals from sensors 50, 60 and 70 occur simultaneously and have a similar shape, suggests that these signals are due to interference that affects all three sensors simultaneously and is not due to motion of a person.

Figure 8G:
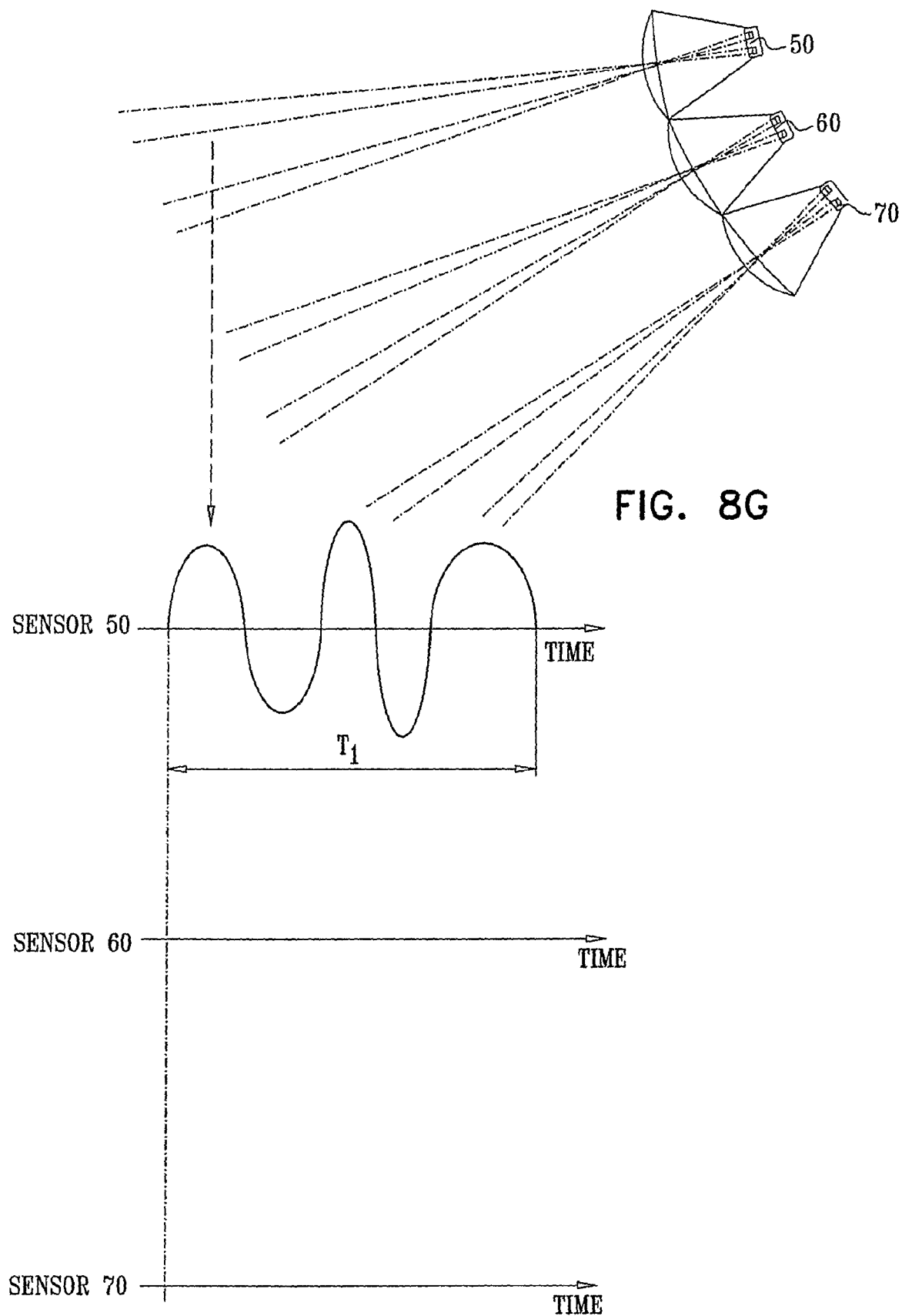

FIG. 8G shows a case wherein only one sensor, sensor 50, provides a signal. As can be seen the signal is non-uniform over time. No signal is produced by sensors 60 or 70. This may be the result of interference such as a tree or other object moving in the sub field-of-view of only one sub-detector.

It is appreciated that FIGS. 8B-8G are merely illustrations of some examples of spurious signals which can be readily distinguished from intrusion signals by the detector of the present invention.

FIGS. 9A-9G illustrate examples of signals produced by a detector of a multiple sub-detector embodiment, such as detector 182 of FIGS. 4-6, having partially overlapping sub fields-of-view. Shown in FIGS. 9A-9G are several examples of signals produced by sensors 150, 160 and 170 of detector 182.

Figure 9A:
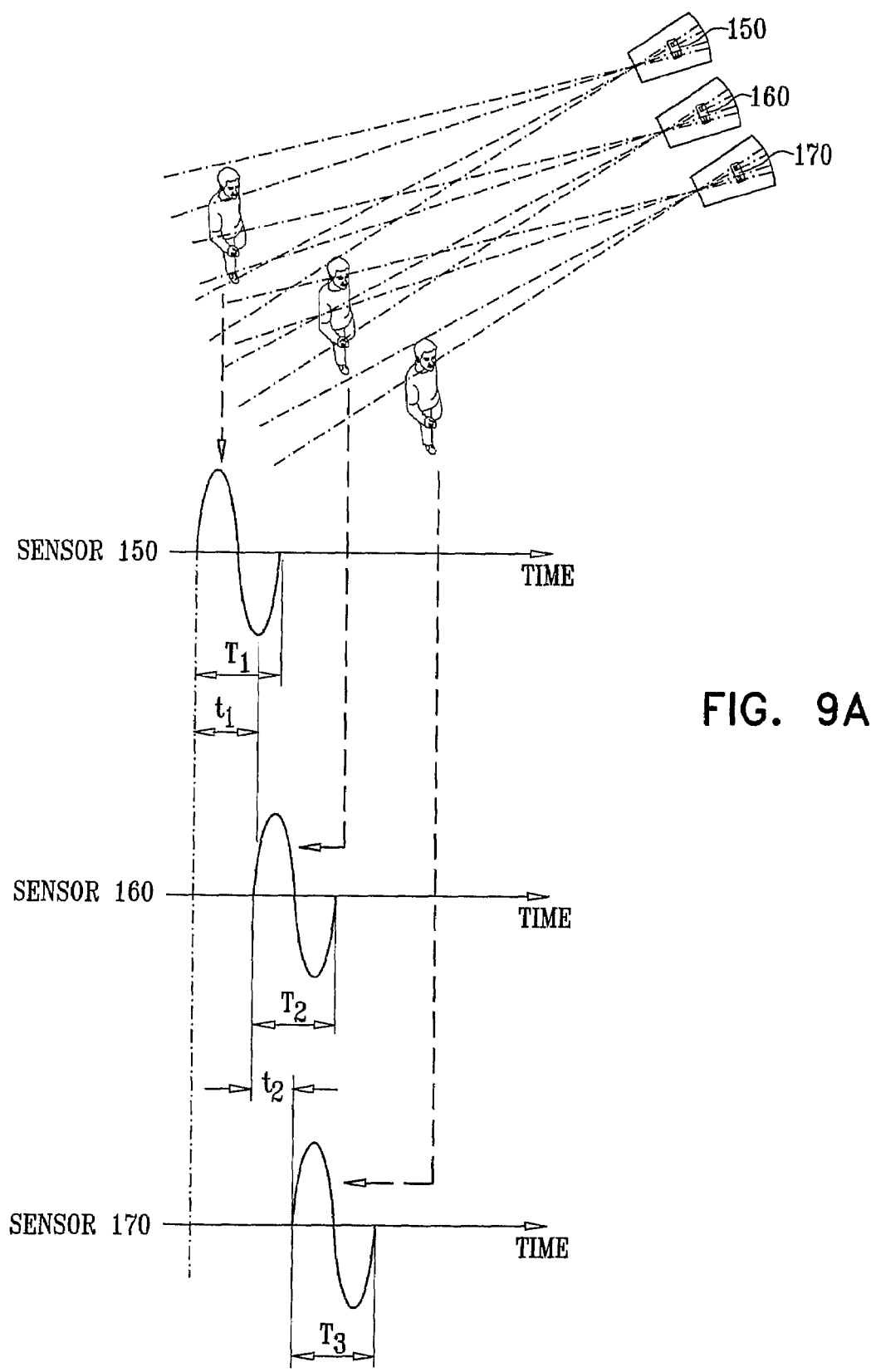
FIG. 9A is a simplified illustration of a signal indicative of a typical human intrusion sensed by a detector of the type shown in FIGS. 4-6 which has sub-detectors whose fields-of-view overlap.

FIG. 9A shows a typical example of signals produced by a person crossing adjacent sub fields-of-view of the sensors. The motion of the person is initially detected by sensor 150 and thereafter, after a time interval $t_1$, the motion of the person is detected by sensor 160. After an additional time interval $t_2$ the motion of the person is detected by sensor 170. As can be seen, the signals of the three sensors 150, 160 and 170 are received in succession with generally uniform timing ($t_1$ generally equals $t_2$) and each signal has generally the same duration ($T_1 \approx T_2 \approx T_3$), which is characteristic of movement of a person in front of the detector at a uniform speed and at approximately the same distance from the detector. The signals partially overlap in time to a generally uniform extent.

As described hereinabove with respect to FIG. 8A, the ratios $T_1/t_1$, $T_2/t_1$, $T_2/t_2$ and $T_3/t_2$ are generally the same when a person moves through the sub fields-of-view of sub-detectors 150, 160 and 170 at a generally constant angular speed (i.e. at a uniform speed and at approximately the same distance from the detector).

The signals may differ in amplitude and shape due to variations in the background temperature and/or the type of motion. There may also be some variation in the time intervals (t), durations (T) or the ratio T/t, due to the person changing his speed of motion or distance from the detector during movement. However, as long as these variations are within certain limits, the signal can be still recognized as motion of a person.

Figure 9B:
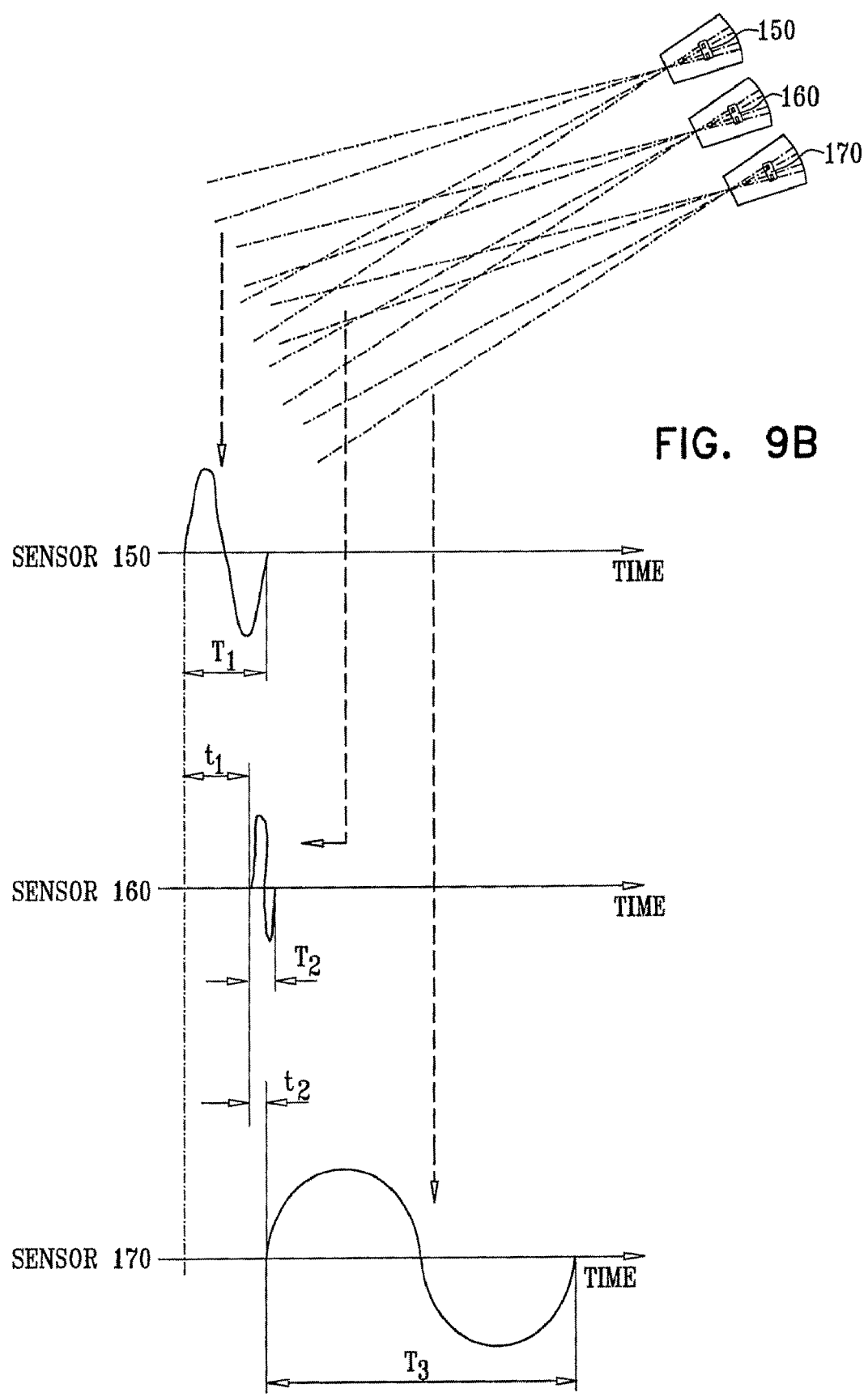
FIGS. 9B-9G are each a simplified illustration of a different signal which is not typical of a human intrusion sensed by a detector of the type shown in FIGS. 4-6 which has sub-detectors whose fields-of-view overlap.

FIG. 9B shows partially overlapping signals from three different sub-detectors having non-uniform durations $T_1$, $T_2$ and $T_3$ and non-uniform time separations $t_1$ and $t_2$. Additionally, there is a significant difference in the ratios $T_2/t_1$, $T_2/t_2$ and $T_3/t_2$. Although the signals occur in succession, it is unlikely that the speed of motion of a person varies to an extent sufficient to produce the differences in time intervals $t_1$ and $t_2$ as shown in FIG. 9B. Therefore the signals of FIG. 9B can be recognized as resulting from interference and not from motion of a person.

Signal processing methods useful in the analysis of signals obtained from the detectors of the embodiments of FIGS. 1-6, as shown in FIGS. 9A-9G, are described in detail hereinbelow with reference to FIGS. 18 and 19.

Figure 9C:
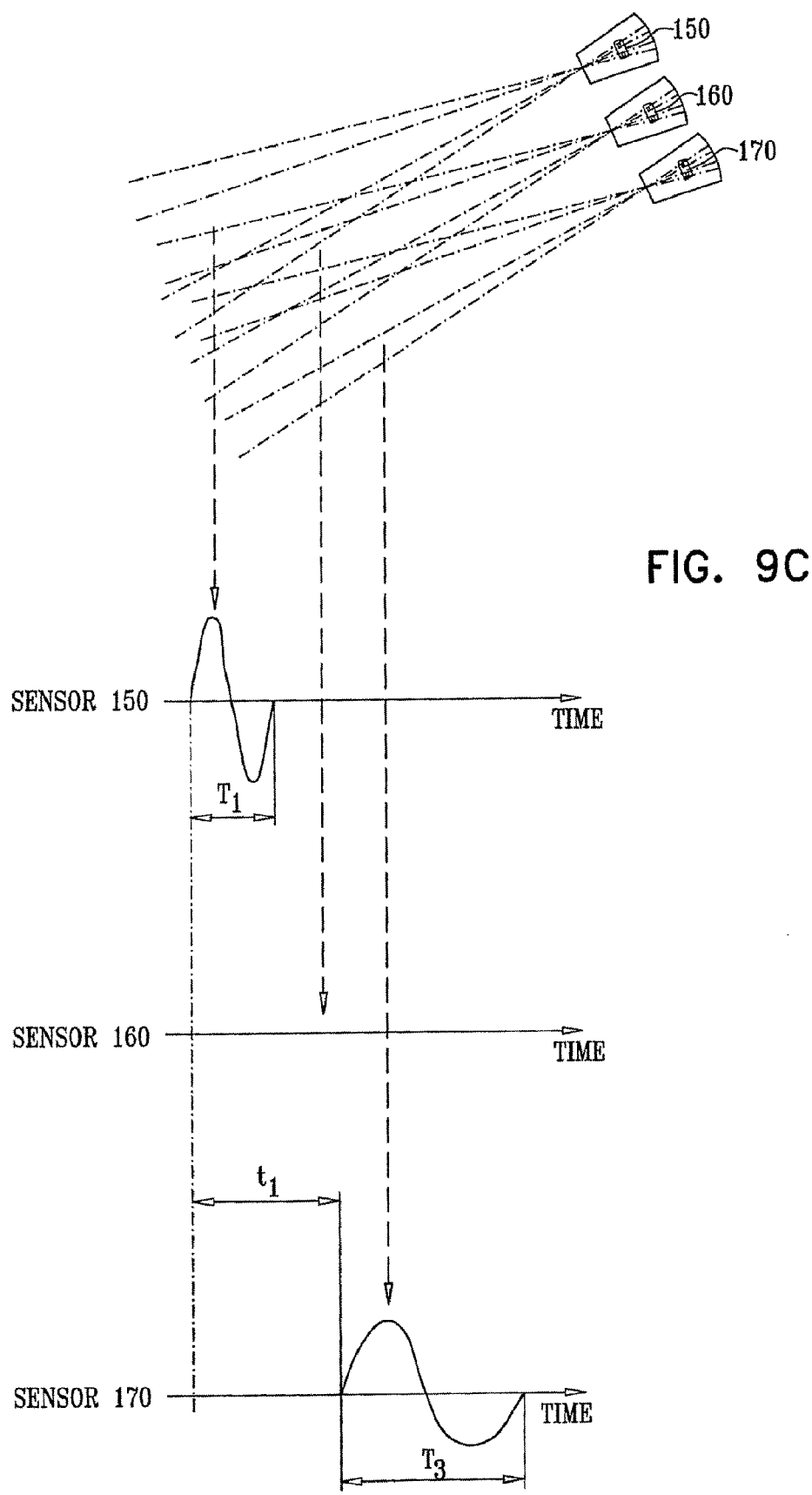

FIG. 9C illustrates a case wherein signals of differing durations are received from sensors 150 and 170 but not from sensor 160 which is located therebetween. This is unlikely to be a result of a motion of a person because such motion would be expected to produce a signal from sensor 160. It is more likely that this is a result of moving trees or bushes located in the sub fields-of-view of sensors 150 and 170 and not in the sub field-of-view of sensor 160.

Figure 9D:
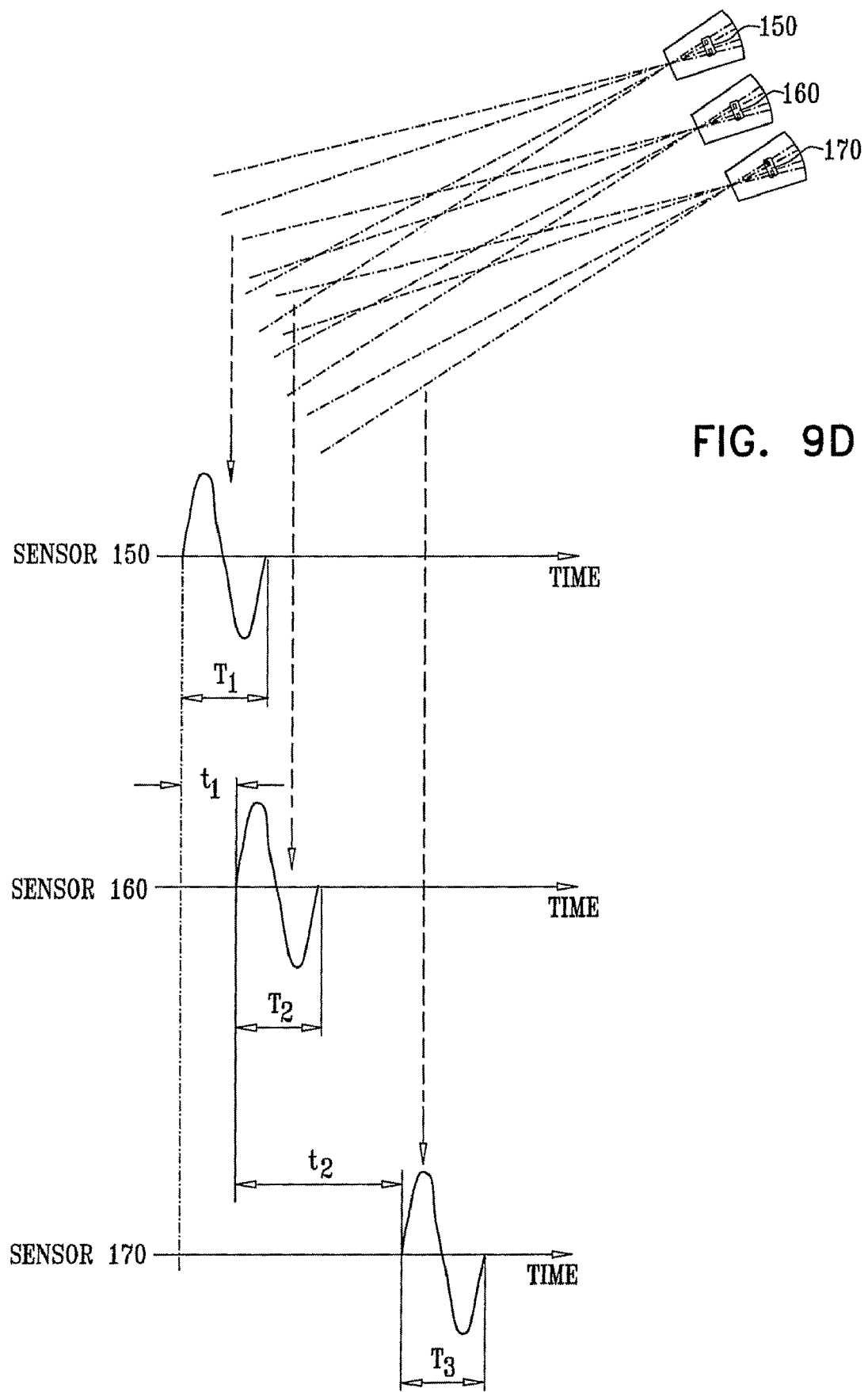

FIG. 9D shows signals having the same durations $T_1$, $T_2$ and $T_3$ produced by three different sub-detectors and having uniform shapes but non-uniform time separations $t_1$ and $t_2$ therebetween. Although the signals occur in succession, it is unlikely that the speed of motion of a person varies to an extent sufficient to produce the differences in timing $t_1$ and $t_2$ as shown in FIG. 9D. Also it is unlikely that there is no overlap between the signals of sensor 160 and sensor 170 when their respective sub fields-of-view do overlap as in this embodiment. Therefore the signals of FIG. 9D can be recognized as resulting from interference and not from motion of a person.

Figure 9E:
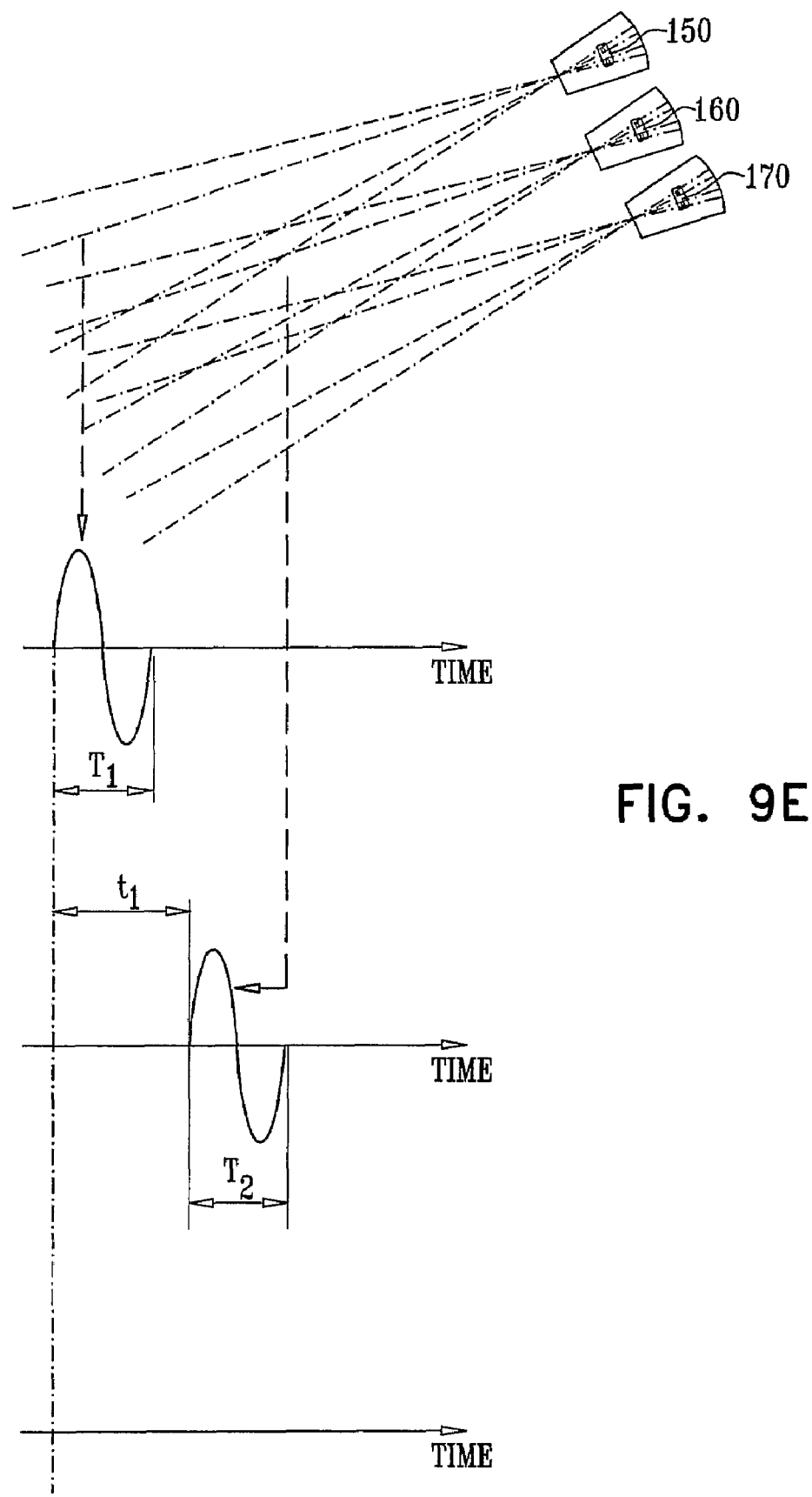

FIG. 9E shows signals from two adjacent sub-detectors having no overlap, but rather a time interval therebetween. Although the signals occur in succession, the lack of overlap indicates that the signals of FIG. 9E can be recognized as resulting from interference and not from motion of a person.

Figure 9F:
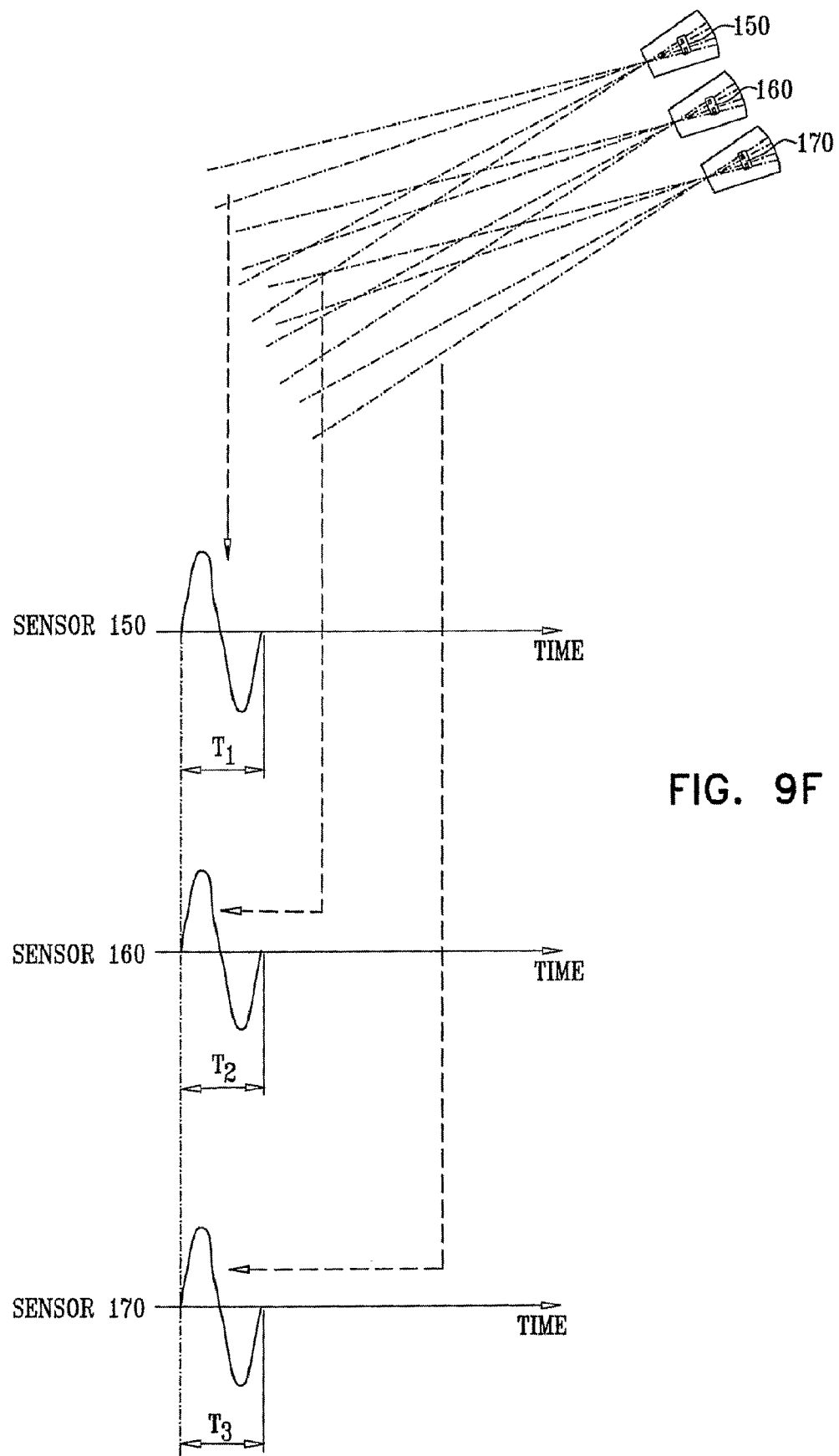

FIG. 9F shows three signals occurring at approximately the same time. The fact that the signals from sensors 150, 160 and 170 occur simultaneously and have a similar shape, suggests that these signals are due to interference that affects all three sensors simultaneously and is not due to motion of a person.

Figure 9G:
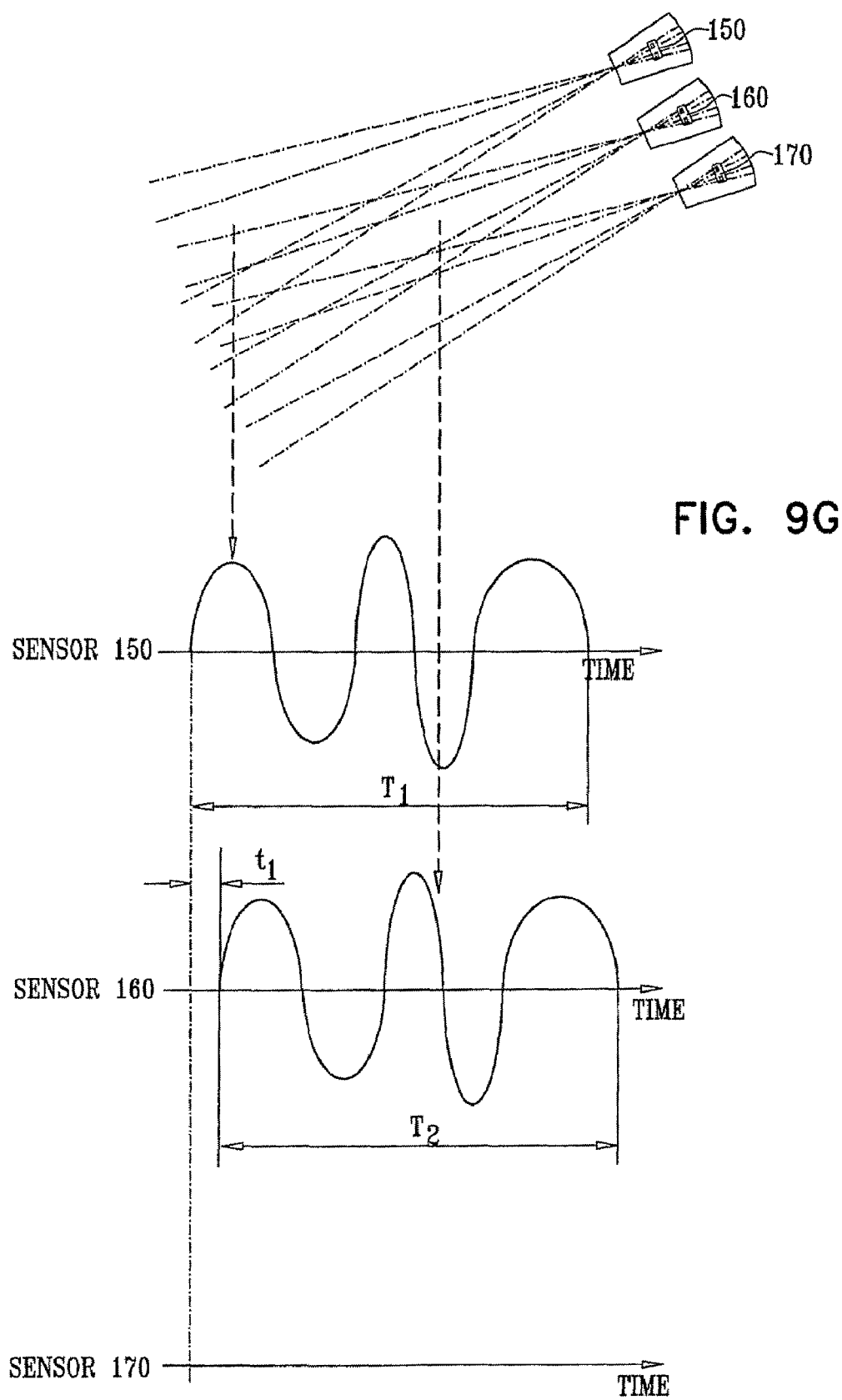

FIG. 9G shows a case wherein sensors 150 and 160 provide different signals, which are non-uniform over time. This may be the result of interference such as a tree or other object moving in the fields-of-view of only two sub-detectors.

It is appreciated that FIGS. 9B-9G are merely illustrations of some examples of spurious signals which can be readily distinguished from intrusion signals by the detector of the present invention.

Figure 10:
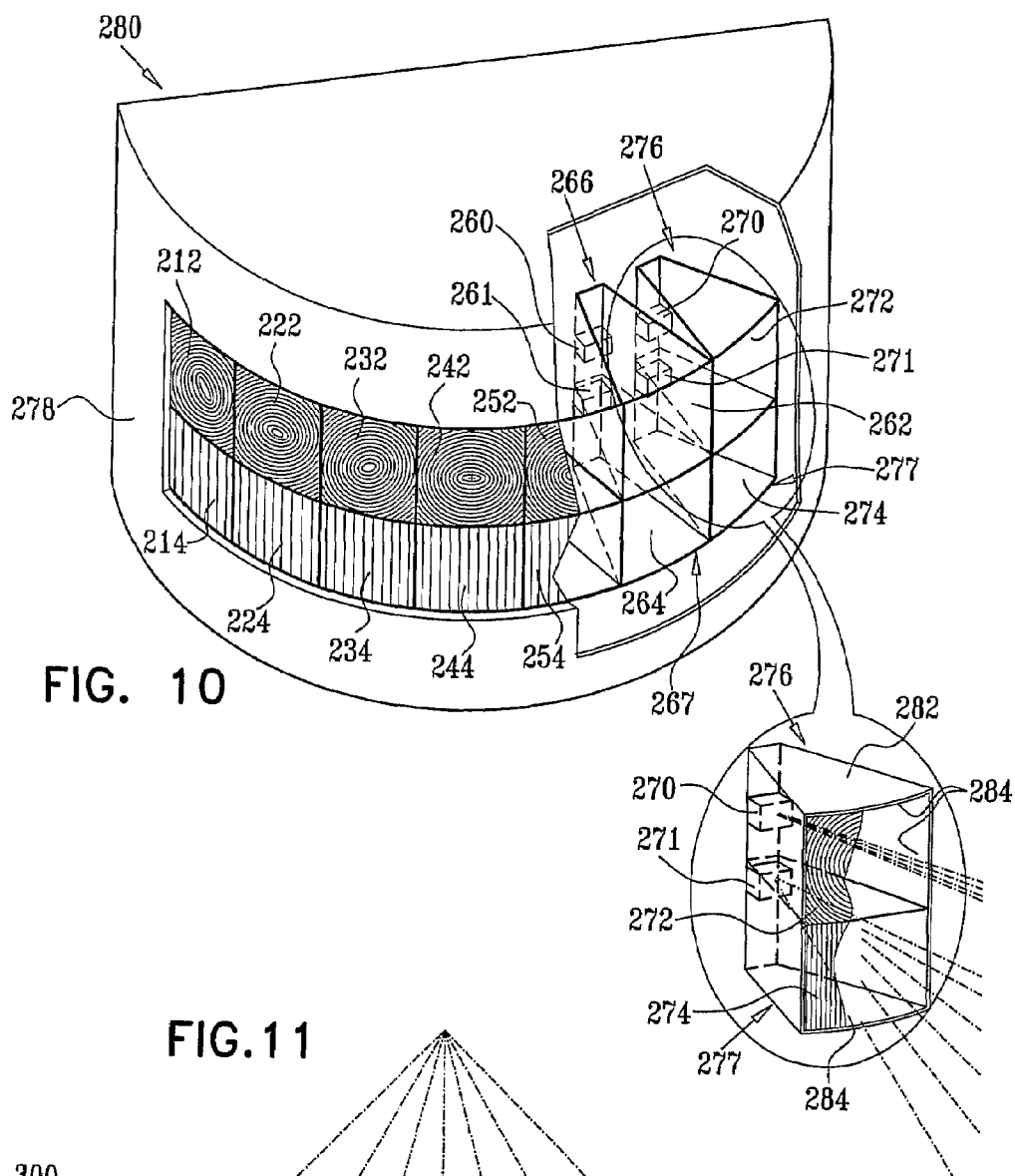
FIG. 10 is a simplified pictorial illustration of a detector, including lenses, constructed and operative in accordance with yet another preferred embodiment of the present invention.

Reference is now made to FIG. 10, which illustrates a lens-based outdoor detector constructed and operative in accordance with another preferred embodiment of the present invention. The embodiment of FIG. 10 is similar to that of FIG. 1 except that the detector includes two rows of sub-detectors rather than one.

FIG. 10 is a general view of a detector comprising fourteen sub-detectors, each sub-detector including a pyroelectric sensor associated with one or more corresponding lens segments, defining a corresponding sub field-of-view. Preferably, but not necessarily, the fourteen sub fields-of-view are not overlapping. As shown in FIG. 10, each of the seven sub fields-of-view includes two mutually vertically separated zones.

Preferably, the sub fields-of-view corresponding to each of the sub-detectors are substantially non-overlapping and are angled with respect to each other, such that adjacent sub fields-of-view are separated by no more than 30 degrees or by no more than 3 meters at the effective far end of the corresponding sub fields-of-view, which is determined by the detector design. Such separation between adjacent sub fields-of-view provides detection coverage of the field-of-view as required by various international standards, such as European standard TS 50131-2-2 and IEC-639-2-6, which require the detector to detect an intruder traversing a distance of three meters at certain angles and directions. Each of the sub-detectors preferably views a portion of the entire field-of-view of the detector, such that the detector provides a wide coverage area, for example, having a field-of-view divergence angle of 60 degrees or more.

The sensors in FIG. 10 are arranged so that each sensor is exclusively associated with a corresponding one of lens segments 212, 214, 222, 224, 232, 234, 242, 244, 252, 254, 262, 264, 272, and 274. In the illustrated embodiment, a sensor 260 is associated with lens segment 262 defining a sub-detector 266, a sensor 261 is associated with lens segment 264, defining a sub-detector 267, a sensor 270 is associated with lens segment 272 defining a sub-detector 276, and a sensor 271 is associated with lens segment 274, defining a sub-detector 277. Similarly, associated with lens segments 212, 214, 222, 224, 232, 234, 242, 244, 252 and 254 are corresponding sensors, which are not shown in FIG. 10.

It is appreciated that the fourteen sub-detectors of the embodiment of FIG. 10 are preferably arranged in upper and lower rows, preferably disposed in respective circular arcs within a housing element 278, thereby together to define the detector, which is designated by reference numeral 280.

The lens segments 212, 222, 232, 242, 252, 262 and 272, are preferably Fresnel lenses, while the lens segments 214, 224, 234, 244, 254, 264, and 274 are preferably cylindrical type lenses. Any other suitable type of lens elements, such as, for example, diffractive lenses, and any suitable arrangement thereof, may be employed.

As seen in the enlarged portion of FIG. 10, each of the pairs of respective sub-detectors, such as sub-detectors 276 and 277, is preferably located within a corresponding sub-detector compartment, designated by reference numeral 282. Preferably, a similar structure is found in all of the corresponding sub-detectors of FIG. 10. Each sub-detector compartment is defined by walls, such as walls 284 of compartment 282, preferably having wall surfaces which are generally non-reflective to both IR and visible light. Suitable walls may be made of black plastic, which is preferably conditioned to minimize reflection thereby. This arrangement allows each sensor to receive only radiation emanating from its corresponding sub field-of-view, as defined by the lens segment associated therewith.

Preferably, each sub-detector compartment is a sealed compartment that prevents entry of air drafts and insects.

In accordance with a preferred embodiment of the present invention, the fourteen sensors, including sensors 260, 261, 270 and 271 shown in FIG. 10, each comprise dual element pyroelectric sensors, such as LHi-968 sensors, which are commercially available from Perkin-Elmer of Freemont, Calif., USA.

Figure 11:
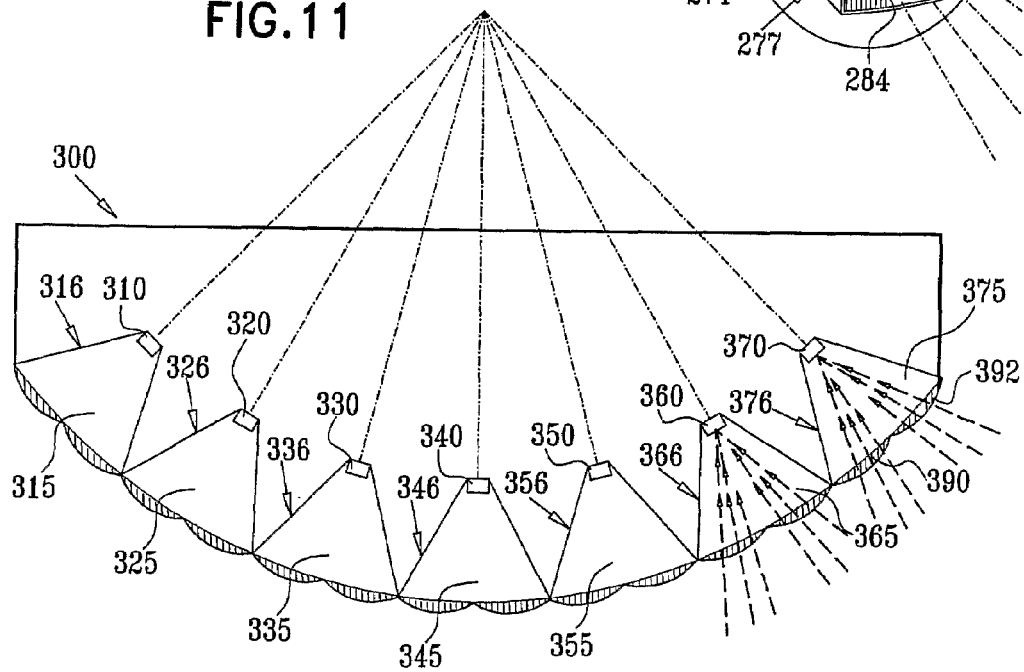
FIG. 11 is a simplified sectional illustration of a detector employing lenses constructed and operative in accordance with still another preferred embodiment of the present invention.

Reference is now made to FIG. 11, which is a simplified sectional illustration of a detector 300 constructed and operative in accordance with yet another preferred embodiment of the present invention. The embodiment of FIG. 11 may be identical to that of either of FIGS. 1-3 and FIG. 10, wherein each Fresnel lens is replaced by a pair of horizontally side-by-side Fresnel lens segments. As shown in FIG. 11, each of the seven sub fields-of-view includes a pair of azimuthally separated detection zones.

As shown in FIG. 11, sensors 310, 320, 330, 340, 350, 360 and 370 each comprise dual element pyroelectric sensors, such as LHi-968 sensors, which are commercially available from Perkin-Elmer of Freemont, Calif., USA. Each sensor is located in a corresponding sub-detector compartment. The sub-detector compartments are designated respectively by reference numerals 315, 325, 335, 345, 355, 365 and 375. Respective sub-detector compartments and corresponding sensors comprise sub-detectors which are designated by reference numerals 316, 326, 336, 346, 356, 366 and 376.

Each sub-detector compartment is defined by walls, similar to walls 284 in FIG. 10, which preferably have wall surfaces which are generally non-reflective to both IR and visible light. Suitable walls may be made of black plastic, which is preferably conditioned to minimize reflection thereby. This arrangement of the sensors within individual sub-detector compartments allows each sensor to receive only radiation emanating from its corresponding sub field-of-view, as defined by the lens segments associated therewith.

At the front of each sub-detector compartment there is located a pair of horizontally side-by-side Fresnel lens segments, such as lens segments 390 and 392 of compartment 375. The lens segments preferably together form an IR transparent window through which radiation enters each of the sub-detectors.

It is appreciated that it is not necessary that all sub-detectors of a given detector include an identical number of lens segments or the same arrangement of the segments. Accordingly it is possible to have, for instance, a combination of sub-detectors with four lens segments, as explained hereinabove, together with sub-detectors comprising only one or two lens segments placed one above or alongside the other, or any other combination suitable for a given application.

It is also appreciated that a given detector may incorporate multiple element pyroelectric sensors, rather than a common dual element sensor. As an example, a four element pyroelectric sensor, commonly referred to as a "quad sensor", such as REP05B, commercially available from Nippon Ceramics Co. of Japan, may be employed in place of a dual element sensor. This may apply in principle to any of the detectors described herein which employ multiple element sensors.

Reference is now made to FIG. 12, which is a simplified pictorial illustration of a detector constructed and operative in accordance with still another preferred embodiment of the present invention and to FIG. 13, which is a simplified sectional illustration of the detector of FIG. 12, taken along section lines XIII-XIII in FIG. 12.

The embodiment of FIGS. 12 and 13 incorporates a particularly advantageous spatially limited common slit window configuration. As seen particularly in FIG. 13, the sub fields-of-view of the various sub-detectors intersect generally at one location. A relatively narrow slit-type aperture, having a window formed therein, is preferably provided surrounding the location at which the sub fields-of-view intersect. The slit-type aperture limits interference and is mechanically robust.

FIG. 12 is a general view of a detector comprising seven sub-detectors, each sub-detector including a pyroelectric sensor associated with one or more corresponding lens segments, defining a corresponding sub field-of-view. Preferably, but not necessarily, the seven sub fields-of-view are not overlapping.

Preferably, the sub fields-of-view, corresponding to each of the sub-detectors, are substantially non-overlapping and are angled with respect to each other, such that adjacent sub fields-of-view are separated by no more than 30 degrees or by no more than 3 meters at the effective far end of the corresponding sub fields-of-view, which is determined by the detector design. Such separation between adjacent sub fields-of-view provides detection coverage of the field-of-view as required by various international standards, such as European standard TS 50131-2-2 and IEC-639-2-6, which require the detector to detect an intruder traversing a distance of three meters at certain angles and directions. Each of the sub-detectors preferably views a portion of the entire field-of-view of the detector, such that the detector provides a wide coverage area, for example, having a field-of-view divergence angle of 60 degrees or more.

As seen in FIGS. 12 and 13, the sub-detectors are arranged in a mutually concave arrangement, so that each sensor is exclusively associated with certain lens segments. In the illustrated embodiment, a sensor 410 is associated with lens segment 415, defining a sub-detector 416. In a similar manner, sensors 420, 430, 440, 450, 460 and 470 are associated with respective lens segments 425, 435, 445, 455, 465 and 475, defining respective sub-detectors 426, 436, 446, 456, 466 and 476.

As shown in FIGS. 12 and 13, sub-detectors 416, 426, 436, 446, 456, 466 and 476 are preferably arranged in a concave arrangement in a circular arc within a housing element 480, thereby together to define the detector, which is designated by reference numeral 482.

The housing element defines a relatively narrow slit aperture 483 adjacent which is preferably located a common window 484, preferably having a circular cross-section with its center generally at a location 485 at the center of the aperture 483. Window 484 preferably is made of a thin material which is transparent to IR radiation, such as HDPE, Silicon, Germanium or any other suitable material. Alternatively, other appropriate window shapes, such as a rectangular window, may be used.

A substantial advantage of the use of a window 484 having a circular cross section is that such a window provides generally the same radiation attenuation at side zones and at a center zone. In contrast, were a flat window to be placed at the aperture, it would provide greater attenuation at side zones than at a center zone.

The lens segments 415, 425, 435, 445, 455, 465 and 475 may be Fresnel lenses, or cylindrical type lenses. Any other suitable type of lens elements, such as, for example, diffractive lenses and any suitable arrangement thereof, may be employed.

Alternatively, in other embodiments of the present invention, each sub-detector may include multiple lens segments placed one above and/or alongside the other. This may be beneficial, for example, in achieving a denser coverage of the detection pattern, which enables a faster response of the detector.

In alternative embodiments of the present invention, each sub-detector may be associated with several lens segments, including lens segments lying in the same vertical plane as well as lens segments lying in the same horizontal row. For instance, a sub-detector could be associated with lens segments 415 and 425. This embodiment may be beneficial for instance in cases where the number or density of the lens segments within a horizontal row is relatively high and the horizontal angle between the sub fields-of-view of the lens segments is relatively small. In such cases it may be possible to reduce the cost of the detector by reducing the number of the sub-detectors, especially when the detector is designed for outdoor environments having a moderate level of "undesired signals".

As seen in FIGS. 12 and 13, each of sensors 410, 420, 430, 440, 450, 460 and 470 of respective sub-detectors 416, 426, 436, 446, 456, 466 and 476 is preferably located within a corresponding sub-detector compartment. The sub-detector compartments are designated respectively by reference numerals 418, 428, 438, 448, 458, 468 and 478. Each sub-detector compartment is defined by walls, which may be similar to walls 284 of FIG. 10, and which preferably have wall surfaces which are generally non-reflective to both IR and visible light. Suitable walls may be made of black plastic, which is preferably conditioned to minimize reflection thereby. This arrangement allows each sensor to receive only radiation emanating from its corresponding sub field-of-view, as defined by the lens segment associated therewith.

Preferably, each sub-detector compartment is a sealed compartment that prevents entry of air drafts and insects.

In accordance with a preferred embodiment of the present invention, sensors 410, 420, 430, 440, 450, 460 and 470 each comprise dual element pyroelectric sensors, such as LHi-968 sensors, commercially available from Perkin-Elmer of Freemont, Calif., USA.

It is a particular feature of the embodiment of FIGS. 12 and 13 that the narrow slit type aperture 483 is provided. It is appreciated that all of the sub fields-of-view of each of sub-detectors 416, 426, 436, 446, 456, 466 and 476 are positioned so that they intersect generally at one location centered at location 485. Preferably, aperture 483 is designed to frame location 485 as closely as possible without obstructing the sub fields-of-view. A relatively narrow area surrounds location 485, just large enough to ensure that the housing surrounding aperture 483 does not obscure the sub fields-of-view of the sub-detectors.

A significant advantage of this structure, which includes a narrow slit aperture of minimal size, is that it drastically limits the amount of sunlight and other visible light and thermal interference, which are known in the art as common sources of false alarms. Additionally, the small window 484 is less likely to be accidentally or deliberately damaged, as is common in some public areas, such as schools.

A peripheral guard element 499 may be formed surrounding window 484 to provide enhanced protection. The window 484 additionally may serve as a radiation filter, allowing only radiation of a certain wavelength range, such as IR radiation, to pass therethrough. The relatively narrow, small sized window reduces the cost of the filter. Furthermore, it is easier to apply anti-masking measures to protect a narrow window, than to protect a wide window.

Figure 14:
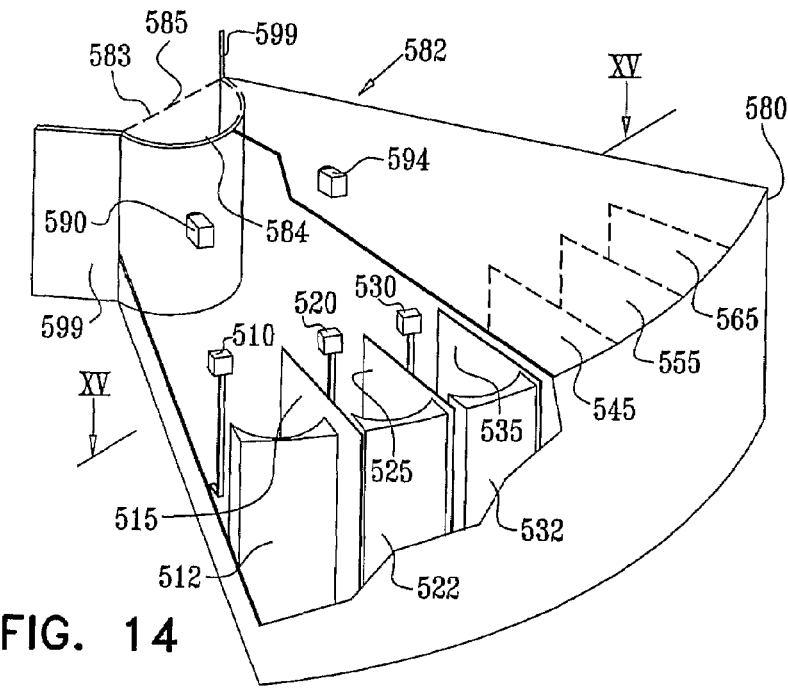
FIG. 14 is a simplified pictorial illustration of a detector constructed and operative in accordance with a yet further preferred embodiment of the present invention, employing mirrors instead of lenses.
Figure 15:
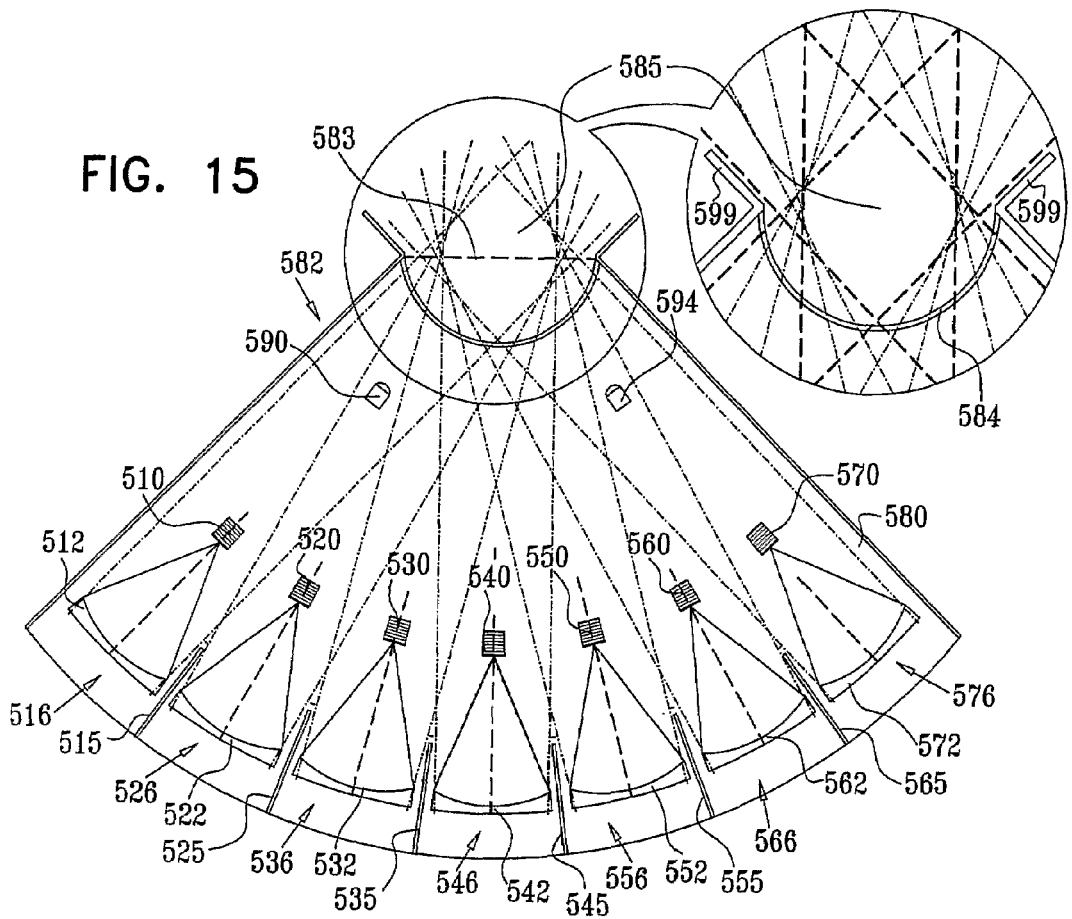
FIG. 15 is a simplified sectional illustration taken along the lines XV-XV in FIG. 14.

Reference is now made to FIG. 14, which is a simplified pictorial illustration of a detector constructed and operative in accordance with a further preferred embodiment of the present invention, similar to that of FIGS. 12 and 13 but employing mirrors instead of lenses, and to FIG. 15, which is a simplified sectional illustration taken along section lines XV-XV in FIG. 14.

FIGS. 14 and 15 illustrate a mirror-based outdoor detector constructed and operative in accordance with a further preferred embodiment of the present invention. FIG. 14 is a general view of a detector comprising seven sub-detectors, each sub-detector including a pyroelectric sensor associated with one or more corresponding mirror elements, defining a corresponding sub field-of-view. Preferably, but not necessarily, the seven sub fields-of-view are not overlapping.

Preferably, the sub fields-of-view, corresponding to each of the sub-detectors, are substantially non-overlapping and are angled with respect to each other, such that adjacent sub fields-of-view are separated by no more than 30 degrees or by no more than 3 meters at the effective far end of the corresponding sub fields-of-view, which is determined by the detector design. Such separation between adjacent sub fields-of-view provides detection coverage of the field-of-view as required by various international standards, such as European standard TS 50131-2-2 and IEC-639-2-6, which require the detector to detect an intruder traversing a distance of three meters at certain angles and directions. Each of the sub-detectors preferably views a portion of the entire field-of-view of the detector, such that the detector provides a wide coverage area, for example, having a field-of-view divergence angle of 60 degrees or more.

As seen in FIGS. 14 and 15, the sub-detectors are arranged in a mutually concave arrangement, so that each sensor is exclusively associated with a single mirror segment.

As seen in the illustrated embodiment, a sensor 510 is associated with a mirror segment 512, defining a sub-detector 516. In a similar manner, sensors 520, 530, 540, 550, 560 and 570 are associated with respective mirror segments 522, 532, 542, 552, 562 and 572 defining respective sub-detectors 526, 536, 546, 556, 566 and 576.

As shown in FIGS. 14 and 15, sub-detectors 516, 526, 536, 546, 556, 566 and 576 are arranged in a concave arrangement in a circular arc within a housing element 580, thereby together to define the detector, which is designated by reference numeral 582.

The housing element defines a relatively narrow slit-type aperture 583 adjacent which is preferably located a common window 584, preferably having a circular cross-section with its center generally at a location 585 at the center of aperture 583. Window 584 preferably is made of a thin material transparent to IR radiation, such as HDPE, Silicon, Germanium or any other suitable material. Alternatively, other appropriate window shapes, such as a rectangular slit, may be used.

A substantial advantage of the use of a window 584 having a circular cross section is that such a window provides generally the same radiation attenuation at side zones and at a center zone. In contrast, were a flat window to be placed at the aperture, it would provide greater attenuation at side zones than at a center zone.

As seen in FIGS. 14 and 15, each of sensors 510, 520, 530, 540, 550, 560 and 570 of respective sub-detectors 516, 526, 536, 546, 556, 566 and 576 is preferably located within a corresponding sub-detector compartment. The sub-detector compartments may be defined by optional partial dividers which are designated respectively by reference numerals 515, 525, 535, 545, 555 and 565. The partial dividers preferably have surfaces which are generally non-reflective to both IR and visible light. Suitable dividers may be made of black plastic, which is preferably conditioned to minimize reflection thereby. The optional dividers provide some isolation between the sub fields-of-view of the sub-detectors, specifically from such interferences such as internal reflections from the internal walls of the detector and air drafts from the outside. The dividers must be of suitable length to provide the above protection but limited in length so as not to interfere with the sub field-of-view of the neighboring sub-detector.

In accordance with a preferred embodiment of the present invention, sensors 510, 520, 530, 540, 550, 560 and 570 each comprise dual element pyroelectric sensors such as LHi-968 sensors, commercially available from Perkin-Elmer of Freemont, Calif., USA.

It is a particular feature of the embodiment of FIGS. 14 and 15 that narrow, slit type common aperture 583 is provided. It is appreciated that all of the sub fields-of-view of each of sub-detectors 516, 526, 536, 546, 556, 566 and 576 are positioned so that they intersect generally at one location centered at location 585. Preferably, aperture 583 is designed to frame location 585 as closely as possible without obstructing the sub fields-of-view. A relatively narrow area surrounds location 585, just large enough to ensure that the housing surrounding aperture 583 does not obscure the sub fields-of-view of the sub-detectors.

One advantage of this structure, which includes a narrow slit-type aperture of minimal size, is that it drastically limits the amount of sunlight and other visible light and thermal interference, which are known in the art as common sources of false alarms. Additionally, the narrow window 584 is less likely to be accidentally or deliberately damaged, as is common in some public areas, such as schools.

Another advantage of the structure of the detector 582, is that due to the small size of the window, one may apply anti-masking measures thereto in a particularly effective manner. As seen in FIGS. 14 and 15, an emitter 590, such as an infrared LED, may be mounted within the detector 582, to emit IR radiation in front of detector 582. An IR receiver 594, such as a photo sensor, is preferably mounted within the detector 582 facing window 584, such that it may receive the IR radiation emitted by emitter 590, reflected from just outside the detector through window 584.

Typically, after suitable calibration over a predetermined calibration time duration, an object placed in front of window 584 or material sprayed onto window 584 causing a change in the level of the reflected IR radiation received by receiver 594, may be interpreted as a masking attempt and may trigger an alarm. Anti-masking functionality of this type is known, inter alia, from European Patents EP 0499177 and EP 0481934, the disclosures of which are incorporated herein by reference. It is generally appreciated that this type of anti-masking functionality does not always work well on relatively large detector windows. Accordingly, the provision of a relatively small window 584, as shown in FIGS. 14 and 15, enhances the effectiveness of this type of anti-masking functionality.

It is a particular feature of this embodiment of the present invention, in which substantially all zones intersect at a relatively narrow window 584, that any attempt to mask part of the window will not completely mask any given zone, as compared with the prior art, wherein it is possible to completely mask a given zone by partial masking of a window.

A peripheral guard element 599 may be formed surrounding window 584 to provide enhanced protection. The narrow window 584 may additionally serve as a radiation filter, allowing only radiation of a certain wavelength range, such as IR radiation, to pass therethrough. The relatively narrow, small sized aperture window 584 reduces the cost of the filter.

Figure 16:
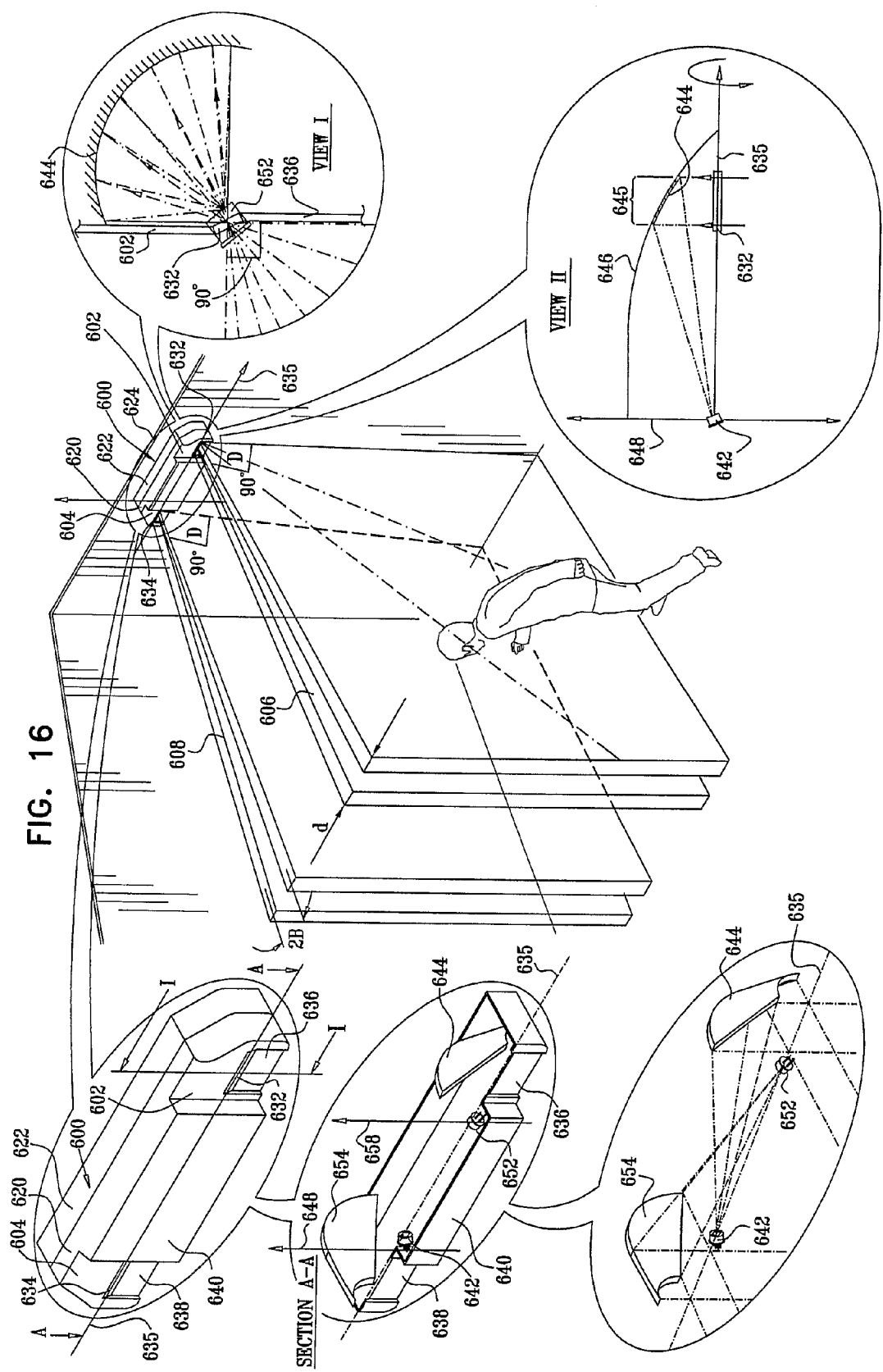
FIG. 16 is a simplified illustration of a detector constructed and operative in accordance with a still further preferred embodiment of the present invention.

Reference is now made to FIG. 16, which is a simplified illustration of a detector 600 constructed and operative in accordance with a still further preferred embodiment of the present invention.

Detector 600 preferably comprises two sub-detectors, designated by reference numerals 602 and 604, having curtain-like sub fields-of-view, respectively designated by reference numerals 606 and 608. The curtain-like sub fields-of-view preferably generally extend through 90 degrees from the vertical to the horizontal as shown. In this embodiment, each of the sub fields-of-view 606 and 608 includes a single zone. The sub-detectors 602 and 604 have a substantial horizontal separation therebetween, which is preferably substantially larger than the focal lengths of optical elements associated with each of the sub-detectors 602 and 604. Optionally, detector 600 may include more than two sub-detectors having a substantial horizontal separation therebetween.

Detector 600 is operative to indicate when an intruder passes through either one or both sub fields-of-view 606 and 608 according to predetermined criteria established by logic which is described hereinbelow. Preferably, the two sub fields-of-view are arranged in a generally parallel spaced mutual orientation. Alternatively, the two sub fields-of-view are arranged in a non-parallel spaced mutual orientation. A certain amount of overlap may be provided between sub fields-of-view 606 and 608.

Detector 600 preferably includes a housing 620 and a base 622 arranged to be mounted on a vertical mounting wall 624 such that the base 622 is flush with the mounting wall 624. Housing 620 is preferably formed with a pair of generally downwardly inclined apertures, respectively designated by reference numerals 632 and 634, which are arranged to extend generally horizontally along an aperture axis 635 in the orientation shown in FIG. 16. The housing 620 preferably includes recessed housing panels 636 and 638 respectively disposed below windows 632 and 634 so as not to interfere with passage of radiation into the windows 632 and 634 in a generally vertical upward direction. Housing 620 is preferably formed with a protruding central panel 640 disposed intermediate apertures 632 and 634 and corresponding panels 636 and 638.

Sub-detector 602 preferably comprises a pyroelectric sensor 642, disposed along the aperture axis 635, which receives radiation from sub field-of-view 606 via aperture 632 and via a reflecting surface 644 which focuses the radiation onto sensor 642.

Reflecting surface 644 is preferably defined at least partially by rotation about aperture axis 635 of an off-axis portion, indicated by reference numeral 645, of a parabola, indicated by reference numeral 646 in enlarged view II in FIG. 16, having an axis of symmetry, here designated by reference numeral 648, extending perpendicularly to the aperture axis 635 and having a focal point at the intersection of axes 635 and 648. The pyroelectric sensor 642 is located generally at the focal point. The parabola is rotated through an angle D which may be selected within a range of 0-180 degrees. Angle D corresponds to the desired angular extent of the curtain-like sub field-of-view 606, preferably 90 degrees from the vertical to the horizontal as shown. Alternatively, smaller or larger angular extents of the curtain-like sub field-of-view 606 may possibly be defined by further rotation of the parabola.

The extent of portion 645 may remain constant as the parabola is rotated through angle D or it may be varied. The variation may or may not be linear with rotation of the parabola.

By varying the extent of portion 645, the area of the reflecting surface 644 which views certain portions of the sub field-of-view may be varied, thus correspondingly varying the sensitivity of the corresponding sub-detector 602 for those portions of the sub field-of-view. This variation may be useful in various applications, such as for providing pet immunity by reducing sensitivity in regions close to the floor or for ensuring uniformity of sensitivity along the extent of the curtain notwithstanding distance from the sensor.

It is appreciated that variation of the area of the reflecting surface 644 may additionally or alternatively be effected by masking selected portions of the reflecting surface 644. The masking may be provided by an add-on device that can be fitted by the user in the field. Different masks having different sensitivity profiles may be provided, as appropriate for different applications of the detector.

Similarly, sub-detector 604 preferably comprises a pyroelectric sensor 652, which receives radiation from sub field-of-view 608 via aperture 634 and via a reflecting surface 654 which focuses the radiation onto sensor 652.

Reflecting surface 654 is preferably defined at least partially by rotation about aperture axis 635 of an off-axis portion of a parabola (not shown), having an axis of symmetry, here designated by reference numeral 658, extending perpendicularly to the aperture axis 635 and having a focal point at the intersection of axes 635 and 658. The pyroelectric sensor 652 is located generally at the focal point. The parabola is rotated through an angle D which may be selected within a range of 0-180 degrees. Angle D corresponds to the desired angular extent of the curtain-like sub field-of-view 608, preferably 90 degrees from the vertical to the horizontal as shown. Alternatively, smaller or larger angular extents of the curtain-like sub field-of-view 608 may possibly be defined by further rotation of the parabola.

The extent of the portion of the parabola may remain constant as the parabola is rotated through angle D or it may be varied. The variation may or may not be linear with rotation of the parabola.

By varying the extent of the portion of the parabola, the area of the reflecting surface 654 which views certain portions of the sub field-of-view may be varied, thus correspondingly varying the sensitivity of the corresponding sub-detector 604 for those portions of the sub field-of-view. This variation may be useful in various applications, such as for providing pet immunity by reducing sensitivity in regions close to the floor or for ensuring uniformity of sensitivity along the extent of the curtain notwithstanding distance from the sensor.

It is appreciated that variation of the area of the reflecting surface 654 may additionally or alternatively be effected by masking selected portions of the reflecting surface 654. The masking may be provided by an add-on device that can be fitted by the user in the field. Different masks having different sensitivity profiles may be provided, as appropriate for different applications of the detector.

Each of the sub fields-of-view 606 and 608 diverges by an angle 2B which depends on the size of the pyroelectric sensing elements of sensors 642 and 652 and the focal length of the reflecting surfaces 644 and 654, as explained hereinbelow.

Overlapping between sub fields-of-view 606 and 608 can be eliminated or reduced by increasing the axial separation between the sub-detectors 602 and 604 and/or by reducing the divergence angle 2B. Reducing the angle 2B can be achieved by using reflecting surfaces 644 and 654 having increased focal lengths.

It is appreciated that the definition of reflecting surfaces 644 and 654 by rotation of an off-axis portion of a parabola about aperture axis 635 as described hereinabove obviates an increase in the depth of housing 620, which would otherwise be required in order to accommodate an increase in the focal lengths of the reflecting surfaces. Additionally, detector 600 requires only very narrow apertures, due to the use of reflecting surfaces 644 and 654 defined as described above, and therefore limits interference and is mechanically robust.

Preferably, in order to further minimize the length of the detector housing 620, the two sub-detectors 602 and 604 are configured such that reflecting surfaces 644 and 654 reflect radiation from respective sub fields-of-view 606 and 608 in mutually opposite directions along partially intersecting optical paths.

In a preferred embodiment of the invention, such as that shown in FIG. 16, pyroelectric sensors 642 and 652 each comprise a dual element pyroelectric sensor, such as an LHi-968, which is commercially available from Perkin-Elmer of Freemont, Calif., USA.

In an alternative embodiment, one of the two sensing elements in each of pyroelectric sensors 642 and 652 is covered. In this arrangement, each of pyroelectric sensors 642 and 652 employs a single pyroelectric sensing element and may employ the covered sensing element for thermal compensation as is known in the art. In this embodiment only half of each of sub fields-of-view 606 and 608 is provided.

As a further alternative, not shown, instead of using a dual element pyroelectric sensor and covering one element, a single element pyroelectric sensor may be used, such as SSAC10-11, commercially available from Nippon Ceramics Co. of Japan. Such single element arrangements may perform better with longer focal lengths than dual-element arrangements in which the two fingers of each sub field-of-view are very close to each other, due to the longer focal length which may result in a reduced sensitivity of the dual element sensors.

In the illustrated embodiment shown in FIG. 16, a curtain width d, typically 10 cm, may be achieved at a distance of 10 meters from the detector 600.

According to an alternative embodiment of the present invention, a non-overlapping configuration may be employed to prevent false alarms from sources of interference that influence only one sub field-of-view or alternatively influence both sub fields-of-view simultaneously as explained hereinabove with respect to multi sub-detector designs.

Adjustability of the azimuthal directions of one or both of the sub fields-of-view may be achieved by corresponding azimuthal rotation of the reflecting surfaces 644 and 654. Alternatively, such adjustability may be achieved by displacing the pyroelectric sensors 642 and 652 towards or away from the base 622.

Figure 17:
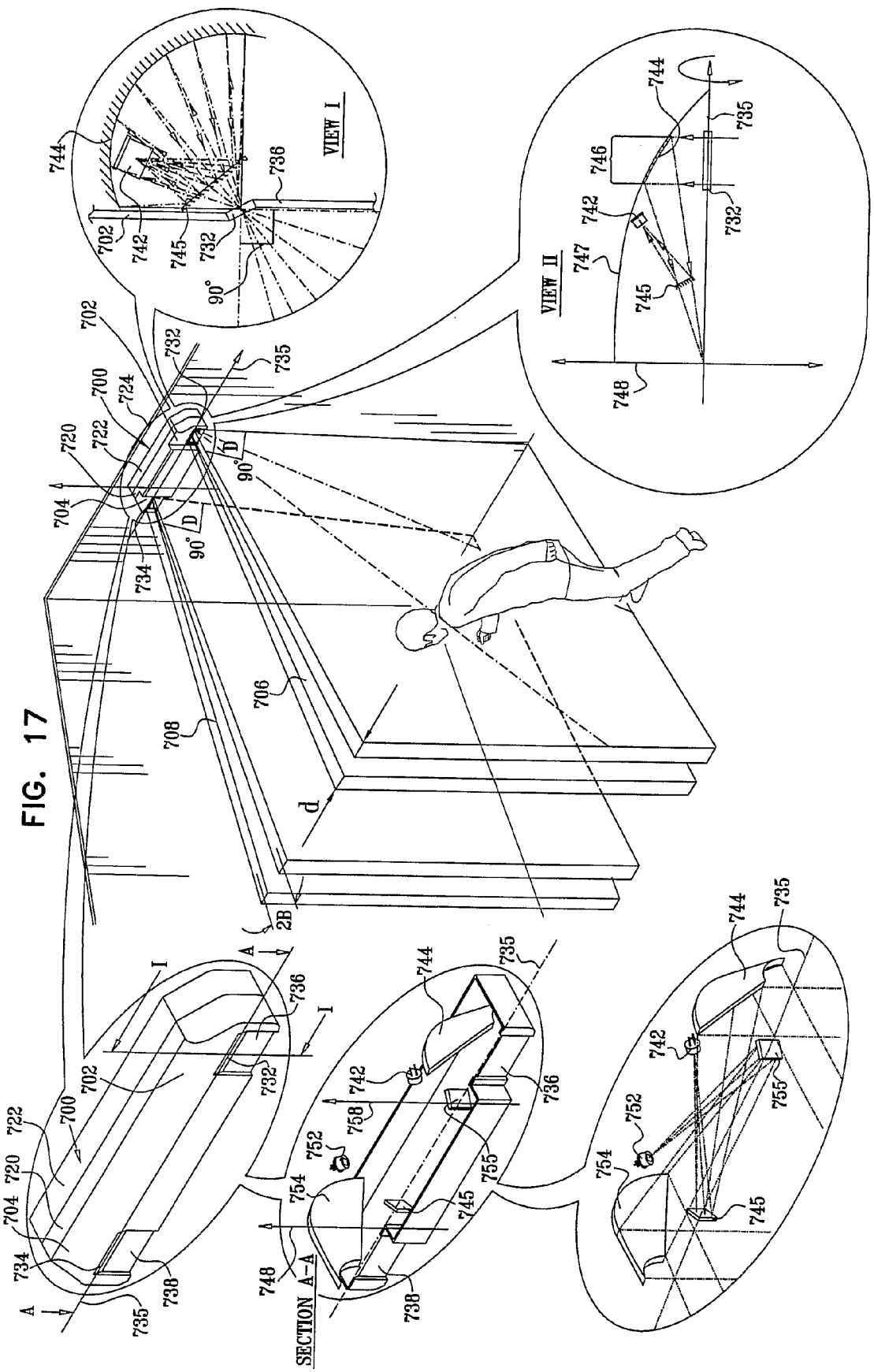
FIG. 17 is a simplified illustration of a detector constructed and operative in accordance with an additional preferred embodiment of the present invention.

Reference is now made to FIG. 17, which is a simplified illustration of a detector 700 constructed and operative in accordance with yet another preferred embodiment of the present invention.

Detector 700 preferably comprises two sub-detectors, designated by reference numerals 702 and 704, having curtain-like sub fields-of-view, respectively designated by reference numerals 706 and 708. The curtain-like sub fields-of-view preferably generally extend through 90 degrees from the vertical to the horizontal as shown. In this embodiment, each of the sub fields-of-view 706 and 708 includes a single zone. The sub-detectors 702 and 704 have a substantial horizontal separation therebetween, which is preferably substantially larger than the focal lengths of optical elements associated with each of the sub-detectors 702 and 704. Optionally, detector 700 may include more than two sub-detectors having a substantial horizontal separation therebetween.

Detector 700 is operative to indicate when an intruder passes through either one or both sub fields-of-view 706 and 708 according to predetermined criteria established by logic which is described hereinbelow. Preferably, the two sub fields-of-view are arranged in a generally parallel spaced mutual orientation. Alternatively, the two sub fields-of-view are arranged in a non-parallel spaced mutual orientation. A certain amount of overlap may be provided between sub fields-of-view 706 and 708.

Detector 700 preferably includes a housing 720 and a base 722 arranged to be mounted on a vertical mounting wall 724 such that the base 722 is flush with the mounting wall 724. Housing 720 is preferably formed with a pair of generally downwardly inclined slit-like apertures, respectively designated by reference numerals 732 and 734, which are arranged to extend generally horizontally along an aperture axis 735 in the orientation shown in FIG. 17. The housing 720 preferably includes recessed housing panels 736 and 738 respectively disposed below apertures 732 and 734 so as not to interfere with passage of radiation into the apertures 732 and 734 in a generally vertical upward direction.

Sub-detector 702 preferably comprises a pyroelectric sensor 742, which receives radiation from sub field-of-view 706 via aperture 732 and via a reflecting surface 744 which focuses the radiation onto sensor 742 via at least one intermediate reflecting surface 745, which may or may not have optical power.

Reflecting surface 744 is preferably defined at least partially by rotation about aperture axis 735 of an off-axis portion, indicated by reference numeral 746, of a parabola, indicated by reference numeral 747 in enlarged view II in FIG. 17. Parabola 747 has an axis of symmetry, here designated by reference numeral 748, which extends perpendicularly to the aperture axis 735, and having a focal point at the intersection of axes 735 and 748. The pyroelectric sensor 742 may be located at any suitable location within housing 720 and the at least one intermediate reflecting surface 745, here shown as a single intermediate reflecting surface, is located along the optical path defined by reflecting surface 744 at a location suitable for redirecting radiation from reflecting surface 744 to pyroelectric sensor 742.

The parabola 747 is rotated through an angle D which may be selected within a range of 0-180 degrees. Angle D corresponds to the desired angular extent of the curtain-like sub field-of-view 706, preferably 90 degrees from the vertical to the horizontal as shown. Alternatively, smaller or larger angular extents of the curtain-like sub field-of-view 706 may possibly be defined by further rotation of the parabola 747.

The extent of portion 746 may remain constant as the parabola 747 is rotated through angle D or it may be varied. The variation may or may not be linear with rotation of the parabola 747.

By varying the extent of portion 746, the area of the reflecting surface 744 which views certain portions of the sub field-of-view may be varied, thus correspondingly varying the sensitivity of the corresponding sub-detector 702 for those portions of the sub field-of-view. This variation may be useful in various applications, such as for providing pet immunity by reducing sensitivity in regions close to the floor or for ensuring uniformity of sensitivity along the extent of the curtain notwithstanding distance from the sensor.

It is appreciated that variation of the area of the reflecting surface 744 may additionally or alternatively be effected by masking selected portions of the reflecting surface 744. The masking may be provided by an add-on device that can be fitted by the user in the field. Different masks having different sensitivity profiles may be provided, as appropriate for different applications of the detector.

Similarly, sub-detector 704 preferably comprises a pyroelectric sensor 752, which receives radiation from sub field-of-view 708 via aperture 734 and via a reflecting surface 754 which focuses the radiation onto sensor 752 via at least one intermediate reflecting surface 755, which may or may not have optical power.

Reflecting surface 754 is preferably defined at least partially by rotation about aperture axis 735 of an off-axis portion of a parabola (not shown), having an axis of symmetry, here designated by reference numeral 758, extending perpendicularly to the aperture axis 735, and a focal point at the intersection of axes 735 and 758. The pyroelectric sensor 752 may be located at any suitable location within housing 720 and the at least one intermediate reflecting surface 755, here shown as a single intermediate reflecting surface is located along the optical path defined by reflecting surface 754 at a location suitable for redirecting radiation from reflecting surface 754 to pyroelectric sensor 752.

The parabola is rotated through an angle D which may be selected within a range of 0-180 degrees. Angle D corresponds to the desired angular extent of the curtain-like sub field-of-view 708, preferably 90 degrees from the vertical to the horizontal as shown. Alternatively, smaller or larger angular extents of the curtain-like sub field-of-view 708 may possibly be defined by further rotation of the parabola.

The extent of the portion of the parabola may remain constant as the parabola is rotated through angle D or it may be varied. The variation may or may not be linear with rotation of the parabola.

By varying the extent of the portion of the parabola, the area of the reflecting surface 754 which views certain portions of the field-of-view may be varied, thus correspondingly varying the sensitivity of the corresponding sub-detector 702 for those portions of the field-of-view. This variation may be useful in various applications, such as for providing pet immunity by reducing sensitivity in regions close to the floor or for ensuring uniformity of sensitivity along the extent of the curtain notwithstanding distance from the sensor.

It is appreciated that variation of the area of the reflecting surface 754 may additionally or alternatively be effected by masking selected portions of the reflecting surface 754. The masking may be provided by an add-on device that can be fitted by the user in the field. Different masks having different sensitivity profiles may be provided, as appropriate for different applications of the detector.

Each of the sub fields-of-view 706 and 708 diverges by an angle 2B which depends on the size of the pyroelectric sensing elements of sensors 742 and 752 and the focal length of the reflecting surfaces 744 and 754, as explained hereinbelow.

Overlapping between sub fields-of-view 706 and 708 can be eliminated or reduced by increasing the axial separation between the sub-detectors 702 and 704 and/or by reducing the divergence angle 2B. Reducing the angle 2B can be achieved by using reflecting surfaces 744 and 754 having increased focal lengths.

It is appreciated that the definition of reflecting surfaces 744 and 754 by rotation of an off-axis portion of a parabola about aperture axis 735 as described hereinabove, obviates an increase in the depth of housing 720, which would otherwise be required in order to accommodate an increase in the focal lengths of the reflecting surfaces. Additionally, detector 700 requires only very narrow apertures due to the use of reflecting surfaces 744 and 754 defined as described above, and therefore limits interference and is mechanically robust.

Preferably, in order to further minimize the length of the detector housing 720, the two sub-detectors 702 and 704 are configured such that reflecting surfaces 744 and 754 reflect radiation from respective sub fields-of-view 706 and 708 in mutually opposite directions along partially intersecting optical paths.

In a preferred embodiment of the invention, such as that shown in FIG. 17, pyroelectric sensors 742 and 752 each comprise a dual element pyroelectric sensor, such as an LHi-968, which is commercially available from Perkin-Elmer of Freemont, Calif., USA.

In an alternative embodiment, one of the two sensing elements in each of pyroelectric sensors 742 and 752 is covered. In this arrangement, each of pyroelectric sensors 742 and 752 employs a single pyroelectric sensing element and may employ the covered sensing element for thermal compensation as is known in the art. In this embodiment only half of each of sub fields-of-view 706 and 708 is provided.

As a further alternative, not shown, instead of using a dual element pyroelectric sensor and covering one element, a single element pyroelectric sensor may be used, such as SSAC10-11, commercially available from Nippon Ceramics Co. of Japan. Such single element arrangements may perform better with longer focal lengths than dual-element arrangements in which the two fingers of each sub field-of-view are very close to each other due to the longer focal length which may result in a reduced sensitivity of the dual element sensors.

In the illustrated embodiment shown in FIG. 17, a curtain width d, typically 10 cm, may be achieved at a distance of 10 meters from the detector 700.

According to an alternative embodiment of the present invention, a non-overlapping configuration may be employed to prevent false alarms from sources of interference that influence only one sub field-of-view or alternatively influence both sub fields-of-view simultaneously as explained hereinabove with respect to multi sub-detector designs.

Adjustability of the azimuthal directions of one or both of the sub fields-of-view may be achieved by corresponding azimuthal rotation of the reflecting surfaces 744 and 754. Alternatively, such adjustability may be achieved by displacing the pyroelectric sensors 742 and 752 towards or away from the base 722.

Figure 18:
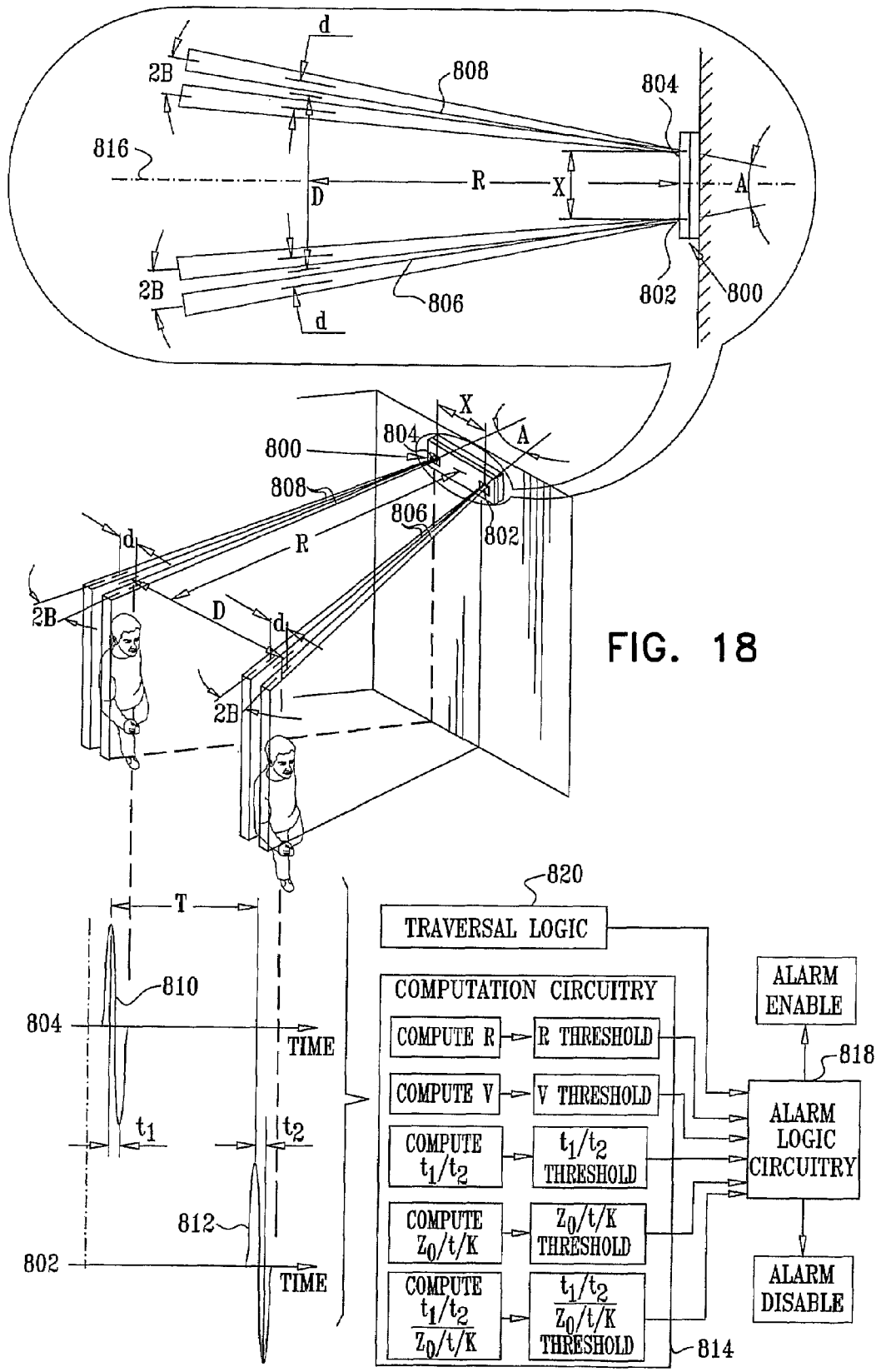
FIG. 18 is a simplified illustration of processing of a signal indicative of a typical human intrusion sensed by a detector of the type of the detectors of FIGS. 16 and 17.

Reference is now made to FIG. 18, which is a simplified illustration of processing of a signal indicative of a typical human intrusion sensed by a detector 800, of the type described hereinabove with respect to FIGS. 16 and 17, comprising two dual-element sub-detectors, designated by reference numerals 802 and 804, having respective curtain-like sub fields-of-view 806 and 808, each including a single zone.

The passage of a person sequentially through respective curtain-like sub fields-of-view 808 and 806, generally as shown in FIG. 18, produces a pair of bi-polar signals, respectively designated by reference numerals 810 and 812, which are separated in time. In signals 810 and 812, the positive and negative peaks correspond to the crossing of the centers of the fingers of the sub fields-of-view.

The designation "T" denotes the time separation between respective positive peaks of signals 810 and 812. The designation "$t_n$" denotes the time separation between respective positive and negative peaks of each of signals 810 and 812 which corresponds to the time it takes a person to traverse the distance d, the time separation between respective positive and negative peaks of signal 810 being designated $t_1$ and the time separation between respective positive and negative peaks of signal 812 being designated as $t_2$. The designation "t" is used to denote a function, such as a mean or average of $t_n$, of various signals.

Signals 810 and 812 are supplied to computation circuitry 814 of the detector 800, which is programmed with the following structural parameters. As will be described hereinbelow, the following parameters are preferably used in signal processing logic of the detector 800.

X—the distance between the centers of sub fields-of-view 806 and 808 at the detector 800;

A—the angle between the centers of adjacent sub fields-of-view 806 and 808;

2B—the angle between the centers of fingers in each of sub fields-of-view 806 and 808.

As described hereinbelow, computation circuitry 814 is operative to calculate a parameter $Z_0/t$, which is a metric of intruder speed, based on the above structural parameters X, A and 2B and on the movement of a person. If it is assumed that the person traverses the sub fields-of-view 808 and 806 at a fixed speed and at a fixed distance from the detector 800, $Z_0/t$ becomes a constant K, for given structural parameters of the detector and independent of the speed of movement of the person, and is expressed as follows:

$$K = \tan(A/2)/\tan(B) \tag{1}$$

The derivation of equation (1) is shown hereinbelow with reference to equation (11).

Computation circuitry 814 is operative to calculate the following parameters based on the signals 810 and 812 and the above structural parameters X, A and 2B:

R, the distance of the person from detector 800 along a centerline 816 between sub fields-of-view 806 and 808;

V, the speed of the person as he traverses the sub fields-of-view 806 and 808;

$t_1/t_2$, the quotient of the time separations between respective positive and negative peaks of respective signals 810 and 812.

$Z_0$, the period of time at which the person traverses the distance between the sub fields-of-view 808 and 806 at distance R from detector 800, less X, the distance between the centers of sub fields-of-view 806 and 808 at the detector 800.

$Z_0/t$, the quotient of $Z_0$ divided by t.

In order to do so, the computation circuitry 814 employs the following calculated parameters:

D, the distance between the centers of the sub fields-of-view 806 and 808 at distance R from detector 800; and d, the distance between the centers of the respective fingers of each sub-field-of-view, corresponding to angle 2B, at distance R from detector 800.

Under the assumption that a person traverses the sub fields-of-view at a fixed speed and at a fixed distance from the detector 800, the computation circuitry 814 preferably employs the following equations:

$$d = 2 \cdot R \cdot \tan(B) \tag{2}$$

$$t = 0.5 \cdot t_1 + 0.5 \cdot t_2 = d/V = [2 \cdot R \cdot \tan(B)]/V \tag{3}$$

$$D = X + 2 \cdot R \cdot \tan(A/2) \tag{4}$$

$$T = D/V = [X + 2 \cdot R \cdot \tan(A/2)]/V \tag{5}$$

Division of equation (3) by equation (5) yields:

$$t/T = [2 \cdot \tan(B)]/[X/R + 2 \cdot \tan(A/2)] \tag{6}$$

Inasmuch as R is the only unknown in equation (6), and assuming that the distance R is constant, one can rewrite equation (6) as follows:

$$R = X \cdot t/\{2 \cdot [T \cdot \tan(B) - t \cdot \tan(A/2)]\} \tag{7}$$

Under the assumption that R and V are constant, V can be derived from R by rewriting equation (5) as follows:

$$V = [X + 2 \cdot R \cdot \tan(A/2)]/T \tag{8}$$

$t_1/t_2$, the quotient of the time separations between respective positive and negative peaks of respective signals 810 and 812, which represents the ratio of the speeds V of the person traversing sub fields-of-view 806 and 808 assuming that the range R is constant, is calculated based on measured values of $t_1$ and $t_2$.

$Z_0$ can be derived from R and V by rewriting equation (4) as follows:

$$Z_0 = [D - X]/V = [2 \cdot R \cdot \tan(A/2)]/V \tag{9}$$

The quotient $Z_0/t$ is derived from equation 9, as follows:

$$Z_0/t = [2 \cdot R \cdot \tan(A/2)]/V \cdot (0.5 \cdot t_1 + 0.5 \cdot t_2) \tag{10}$$

Assuming the person traverses the sub fields-of-view 806 and 808 at a fixed speed V and at a fixed distance R from the detector, the parameter t, derived in equation (3), may be used to derive the parameter K as shown hereinabove in equation (1), as follows:

$$Z_0/t = \{[2 \cdot R \cdot \tan(A/2)]/V\}/\{[2 \cdot R \cdot \tan(B)]/V\} = \tan(A/2)/\tan(B) = K \tag{11}$$

It is desired to employ the computed parameters R, V, $t_1/t_2$ and $Z_0/t$ in order to eliminate or reduce false alarms. Accordingly, following calculation of parameters R, V, $t_1/t_2$ and $Z_0/t$, suitable thresholds are applied to each of the parameters and/or to combinations thereof in order to distinguish signals characteristic of intruders from spurious signals.

For example, considering the parameter V, any object moving faster then an upper speed threshold, such as 3 meters per second, or slower than a lower speed threshold, such as 0.1 meters per second, will not be considered an intruder. Other speed thresholds may be selected as appropriate, for example, according to standards or as otherwise known in the art.

It is also possible to define a specific range for the parameter R, such as a range of 2 to 30 meters. Any object moving in a region lying outside these limits may be considered not to be an intruder.

If a person traverses the sub fields-of-view 806 and 808 at the same speed, the ratio $t_1/t_2$ will equal 1. It may be assumed that an intruder may change the speed of his motion between the two sub fields-of-view to a certain degree, for instance $0.5 < t_1/t_2 < 2.0$. Accordingly, any value for $t_1/t_2$ lying outside of this range may be considered not to represent an intruder. Any other suitable range for $t_1/t_2$ may be selected in accordance with the specific design and application of the detector.

If a person traverses the sub fields-of-view 806 and 808 and the distance therebetween at a fixed speed and at a fixed distance from detector 800, the ratio $(Z_0/t)/K$ equals 1. The quotient $(Z_0/t)/K$ may be used as an indication of the extent that an intruder changes his speed of motion during the traversal of the distance D.

It may be assumed that a person may change the speed of his motion between the two sub fields-of-view to a certain extent, for instance $0.7 < (Z_0/t)/K < 1.5$. Accordingly any value for $Z_0/t/K$ lying outside of this range may be considered not to represent an intruder. Any other suitable range for $(Z_0/t)/K$ may be selected in accordance with the specific design and application of the detector.

Additionally, if a person traverses the sub fields-of-view 806 and 808 and the distance therebetween at a fixed speed and at a fixed distance from detector 800, the ratio $[t_1/t_2]/[(Z_0/t)/K]$ also equals 1. The ratio $[t_1/t_2]/[(Z_0/t)/K]$ may be used as another indication of the extent that an intruder changes his speed of motion during the traversal of the distance D.

It may be assumed that a person may change the speed of his motion between the two sub fields-of-view to a certain extent, for instance $0.8 < [t_1/t_2]/[(Z_0/t)/K] < 1.3$. Accordingly any value for $[t_1/t_2]/[(Z_0/t)/K]$ lying outside of this range may be considered not to represent an intruder. Any other suitable range for $[t_1/t_2]/[(Z_0/t)/K]$ may be selected in accordance with the specific design and application of the detector.

Application of the above thresholds to respective parameters R, V, $t_1/t_2$, $Z_0/t/K$ and $[t_1/t_2]/[(Z_0/t)/K]$ preferably provides outputs to alarm logic circuitry 818. Alarm logic circuitry also receives inputs from traversal logic circuitry 820 which indicates the direction of motion through sub fields-of-view 806 and 808, i.e. which of the sub fields-of-view 806 and 808 is traversed initially. Logic circuitry 818 makes a false-alarm determination when the inputs thereto are not characteristic of an intruder. The output of logic circuitry 818 is an alarm enable or disable signal.

The foregoing description of FIG. 18 is also applicable to a situation where the two fields-of-view are parallel. In such a case:

$$D = X \quad (12)$$

$$d = 2 \cdot R \cdot \tan(B) \quad (13)$$

$$t = d/V = [2 \cdot R \cdot \tan(B)]/V \quad (14)$$

$$T = D/V = X/V \quad (15)$$

Division of formula (14) by formula (15) gives:

$$t/T = [2 \cdot R \cdot \tan(B)]/X \quad (16)$$

As can be seen, in the parallel embodiment it is also possible to determine the range R from formula (16) and the speed V from formula (15).

$$R = [t \cdot x]/[2 \cdot T \cdot \tan(B)] \quad (17)$$

$$V = X/T \quad (18)$$

The computed parameters R, V, $t_1/t_2$, $Z_0/t/K$ and $[t_1/t_2]/[(Z_0/t)/K]$ and the thresholds described hereinabove are also applicable to an embodiment wherein the sub fields-of-view are parallel.

The description of FIG. 18 for cases where A does not equal zero is also applicable to adjacent sub fields-of-view of detectors having multiple sub fields-of-view embodiments, such as those described hereinabove with reference to FIGS. 1-6 and 10-15. For example, in the detectors of FIGS. 3 and 6 the azimuthal diverging angle A between the respective sub fields-of-view 87 and 88 (FIG. 3) and 187 and 188 (FIG. 6), respectively, is equivalent to the angle A in FIG. 18. Similarly the horizontal diverging angle 2B between the centers 98 (FIG. 3) and 198 (FIG. 6) of the two fingers of each dual element sub field-of-view 87 and 88 (FIG. 3) and 187 and 188 (FIG. 6) in the detectors of respective FIGS. 3 and 6 is equivalent to the angle 2B in FIG. 18.

It is appreciated that the distance between the two sensors 60 and 70 in detector 82 of FIGS. 1-3 is very small relative to the distances R and D in FIG. 18 and therefore can be considered as being equal to zero. Therefore, the above formulas 1 to 5 may be employed, setting X=0, to analyze the signals of each two adjacent sub detectors, such as detectors 10, 20, 30, 40, 50, 60 and 70 of FIGS. 1-3 or detectors 110, 120, 130, 140, 150, 160 and 170 of FIGS. 4-6, and accordingly to decide whether the detected signals correspond to a moving intruder or to interference, thereby further improving the false alarm immunity of the detector.

Figure 19:
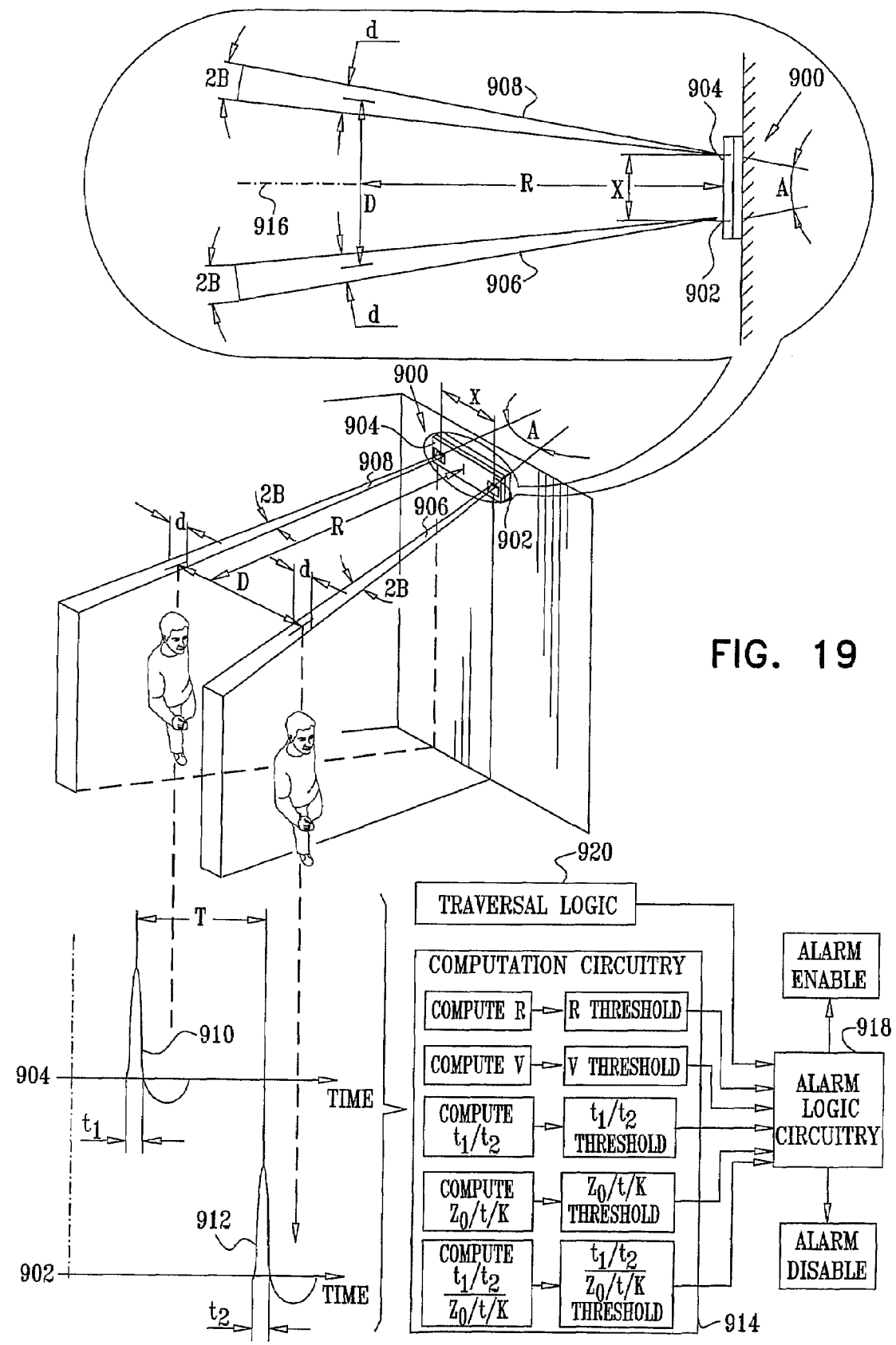
FIG. 19 is a simplified illustration of processing of a signal indicative of a typical human intrusion sensed by a detector of the type of the detectors of FIGS. 16 and 17 implementing single element sensors.

Reference is now made to FIG. 19, which is a simplified illustration of processing of a signal indicative of a typical human intrusion sensed by a detector 900, of the type described hereinabove with respect to FIGS. 16 and 17, having two single-element sub-detectors, designated by reference numerals 902 and 904, having respective curtain-like sub fields-of-view 906 and 908, each including a single zone.

The passage of a person sequentially through respective curtain-like sub fields-of-view 906 and 908, generally as shown in FIG. 19, produces a pair of signals, respectively designated by reference numerals 910 and 912, which are separated in time.

The designation "T" denotes the time separation between respective positive peaks of signals 910 and 912. The designation "$t_n$" denotes the time separation between respective approximated zero crossings of each of signals 910 and 912 which corresponds to the time it takes a person to traverse the distance d, the time separation between respective approximated zero crossings of signal 910 being designated $t_1$ and the time separation between respective approximated zero crossings of signal 912 being designated as $t_2$. The designation "t" is used to denote a function, such as a mean or average of $t_n$, of various signals.

Signals 910 and 912 are supplied to computation circuitry 914 of the detector 900, which is programmed with the following structural parameters. As will be described hereinbelow, the following parameters are used in signal processing logic of the detector 900.

X—the distance between the centers of sub fields-of-view 906 and 908 at the detector 900;

A—the angle between the centers of adjacent sub fields-of-view 906 and 908;

2B—the angle between the edges of each of sub fields-of-view 906 and 908.

As described hereinbelow, computation circuitry 914 is operative to calculate a parameter $Z_0/t$, which is a metric of intruder speed, based on the above structural parameters X, A and 2B and on the movement of a person. If it is assumed that the person traverses the sub fields-of-view 906 and 908 at a fixed speed and at a fixed distance from the detector 900, $Z_0/t$ becomes a constant K, for given structural parameters of the detector and independent of the speed of movement of the person, and is expressed as follows:

$$K=\tan(A/2)/\tan(B) \qquad (19)$$

The derivation of equation (19) is shown hereinbelow with reference to equation (29).

Computation circuitry 914 is operative to calculate the following parameters based on the signals 910 and 912 and the above structural parameters X, A and 2B:

R, the distance of the person from detector 900 along a centerline 916 between sub fields-of-view 906 and 908;

V, the speed of the person as he traverses the sub fields-of-view 906 and 908;

$t_1/t_2$, the quotient of the time separations between respective approximated zero crossings of respective signals 910 and 912.

$Z_0$, the period of time at which the person traverses the distance between the sub fields-of-view 906 and 908 at distance R from detector 900, less X, the distance between the centers of sub fields-of-view 906 and 908 at the detector 900.

$Z_0/t$, the quotient of $Z_0$ divided by t.

In order to do so, the computation circuitry 914 employs the following calculated parameters:

D, the distance between the centers of the sub fields-of-view 906 and 908 at distance R from detector 900; and d, the distance between the edges of each sub field-of-view, corresponding to angle 2B, at distance R from detector 900.

Under the assumption that a person traverses the sub fields-of-view at a fixed speed and at a fixed distance from the detector 900, the computation circuitry 914 preferably employs the following equations:

$$d=2 \cdot R \cdot \tan(B) \qquad (20)$$

$$t=0.5 \cdot t_1 + 0.5 \cdot t_2 = d/V = [2 \cdot R \cdot \tan(B)]/V \qquad (21)$$

$$D=X+2 \cdot R \cdot \tan(A/2) \qquad (22)$$

$$T=D/V=[X+2 \cdot R \cdot \tan(A/2)]/V \qquad (23)$$

Division of equation (21) by equation (23) yields:

$$t/T=[2 \cdot \tan(B)]/[X/R+2 \cdot \tan(A/2)] \qquad (24)$$

Inasmuch as R is the only unknown in equation (24), and assuming that the distance R is constant, one can rewrite equation (24) as follows:

$$R=X \cdot t/\{2 \cdot [T \cdot \tan(B) - t \cdot \tan(A/2)]\} \qquad (25)$$

Under the assumption that R and V are constant, V can be derived from R by rewriting equation (23) as follows:

$$V=[X+2 \cdot R \cdot \tan(A/2)]/T \qquad (26)$$

$t_1/t_2$, the quotient of the time separations between respective approximated zero crossings of respective signals 910 and 912, which represents the ratio of the speeds V of the person traversing sub fields-of-view 906 and 908 assuming that the range R is constant, is calculated based on measured values of $t_1$ and $t_2$.

$Z_0$ can be derived from R and V by rewriting equation (22) as follows:

$$Z_0=[D-X]/V=[2 \cdot R \cdot \tan(A/2)]/V \qquad (27)$$

The quotient $Z_0/t$ is derived from equation 27, as follows:

$$Z_0/t=[2 \cdot R \cdot \tan(A/2)]/V \cdot (0.5 \cdot t_1 + 0.5 \cdot t_2) \qquad (28)$$

Assuming the person traverses the sub fields-of-view 906 and 908 at a fixed speed V and at a fixed distance R from the detector, the parameter t, derived in equation (21), may be used to derive the parameter K shown above in equation (19), as follows:

$$Z_0/t=\{[2 \cdot R \cdot \tan(A/2)]/V\}/\{[2 \cdot R \cdot \tan(B)]/V\}=\tan(A/2)/\tan(B)=K \qquad (29)$$

It is desired to employ the computed parameters R, V, $t_1/t_2$ and $Z_0/t$ in order to eliminate or reduce false alarms. Accordingly, following calculation of parameters R, V, $t_1/t_2$ and $Z_0/t$, suitable thresholds are applied to each of the parameters and/or to combinations thereof in order to distinguish signals characteristic of intruders from spurious signals.

For example. considering the parameter V, any object moving faster then an upper speed threshold, such as 3 meters per second, or slower than a lower speed threshold, such as 0.1 meters per second, will not be considered an intruder. Other speed thresholds may be selected as appropriate, for example, according to standards or as otherwise known in the art.

It is also possible to define a specific range for the parameter R, such as a range of 2 to 30 meters. Any object moving in a region lying outside these limits may be considered not to be an intruder.

If a person traverses the sub fields-of-view 906 and 908 at the same speed, the ratio $t_1/t_2$ will equal 1. It may be assumed that an intruder may change the speed of his motion between the two sub fields-of-view to a certain degree, for instance $0.5 < t_1/t_2 < 2.0$. Accordingly, any value for $t_1/t_2$ lying outside of this range may be considered not to represent an intruder. Any other suitable range for $t_1/t_2$ may be selected in accordance with the specific design and application of the detector.

If a person traverses the sub fields-of-view 906 and 908 and the distance therebetween at a fixed speed and at a fixed distance from detector 900, the ratio $(Z_0/t)/K$ equals 1. The quotient $(Z_0/t)/K$ may be used as an indication of the extent that an intruder changes his speed of motion during the traversal of the distance D.

It may be assumed that a person may change the speed of his motion between the two sub fields-of-view to a certain extent, for instance $0.7 < (Z_0/t)/K < 1.5$. Accordingly any value for $Z_0/t/K$ lying outside of this range may be considered not to represent an intruder. Any other suitable range for $(Z_0/t)/K$ may be selected in accordance with the specific design and application of the detector.

Additionally, if a person traverses the sub fields-of-view 906 and 908 and the distance therebetween at a fixed speed and at a fixed distance from detector 900, the ratio $[t_1/t_2]/[(Z_0/t)/K]$ also equals 1. The ratio $[t_1/t_2]/[(Z_0/t)/K]$ may be used as another indication of the extent that an intruder changes his speed of motion during the traversal of the distance D.

It may be assumed that a person may change the speed of his motion between the two sub fields-of-view to a certain extent, for instance $0.8 < [t_1/t_2]/[(Z_0/t)/K] < 1.3$. Accordingly any value for $[t_1/t_2]/[(Z_0/t)/K]$ lying outside of this range may be considered not to represent an intruder. Any other suitable range for $[t_1/t_2]/[(Z_0/t)/K]$ may be selected in accordance with the specific design and application of the detector.

Application of the above thresholds to respective parameters R, V, $t_1/t_2$, $Z_0/t/K$ and $[t_1/t_2]/[(Z_0/t)/K]$ preferably provides outputs to alarm logic circuitry 918. Alarm logic circuitry 918 also receives inputs from traversal logic circuitry 920 which indicates the direction of motion through sub fields-of-view 906 and 908, i.e. which of the sub fields-of-view 906 and 908 is traversed initially. Alarm logic circuitry 918 makes a false-alarm determination when the inputs thereto are not characteristic of an intruder. The output of alarm logic circuitry 918 is an alarm enable or disable signal.

The foregoing description of FIG. 19 is applicable to a situation where the two fields-of-view are parallel. In such a case:

$$D=X \qquad (30)$$

$$d=2 \cdot R \cdot \tan(B) \qquad (31)$$

$$t = d/V = [2 \cdot R \cdot \tan(B)]/V \tag{32}$$

$$T = D/V = X/V \tag{33}$$

Division of formula (32) by formula (33) gives:

$$t/T = [2 \cdot R \cdot \tan(B)]/X \tag{34}$$

As can be seen, in the parallel embodiment it is also possible to determine the range R from formula (34) and the speed V from formula (33).

$$R = [t \cdot x]/[2 \cdot T \cdot \tan(B)] \tag{35}$$

$$V = X/T \tag{36}$$

The computed parameters R, V, $t_1/t_2$, $Z_0/t/K$ and $[t_1/t_2]/[(Z_0/t)/K]$ and the thresholds described hereinabove are also applicable to an embodiment wherein the sub fields-of-view are parallel.

The description of FIG. 19 for cases where A does not equal zero is also applicable to adjacent sub fields-of-view of single element detectors having multiple sub fields-of-view.

Figure 20:
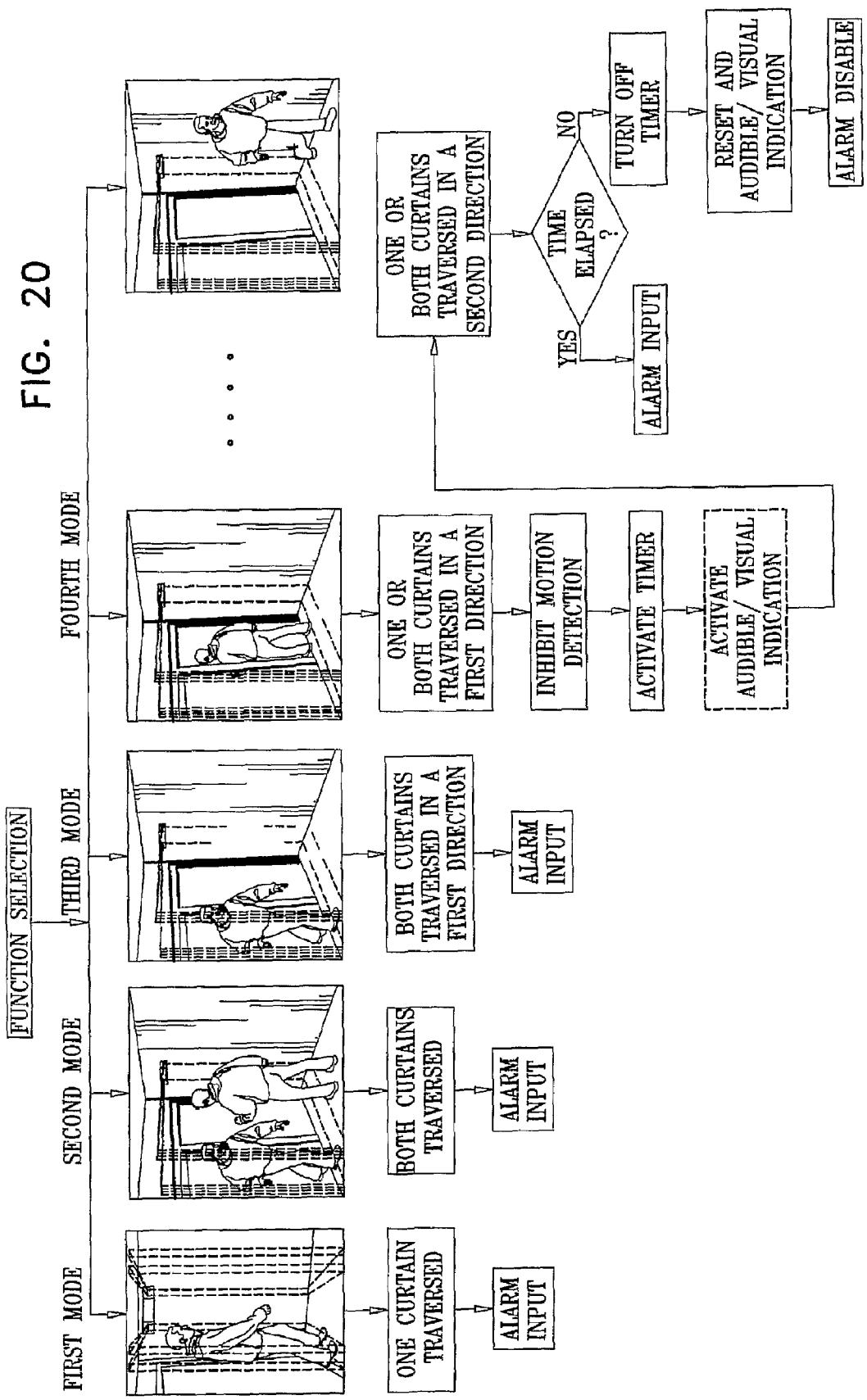
FIG. 20 is a simplified flow chart illustrating a preferred embodiment of directional logic particularly useful in the embodiments of FIGS. 16-19.

Reference is now made to FIG. 20, which is a flow chart illustrating a preferred embodiment of directional logic particularly useful in the embodiments of FIGS. 16-19. This directional logic may be incorporated, for example, as part of the computation circuitry in the embodiments of FIGS. 18 and 19 or may be added to the apparatus shown in FIGS. 16 and 17. The directional logic preferably employs inputs from traversal logic such as traversal logic 820 (FIG. 18) which indicates the order in which two or more fields-of-view, such as sub fields-of-view 806 and 808 (FIG. 18), are traversed.

As seen in FIG. 20, a function selector may be provided for enabling a user to select from one or more operational modes of a detector, such as detector 600 shown in FIG. 16 or detector 700 shown in FIG. 17.

In a first operational mode, an alarm may be enabled once one of the two sub fields-of-view, here termed "curtains", is traversed in either direction.

In a second operational mode, an alarm is enabled only once both fields-of-view are traversed in either direction.

In a third operational mode, an alarm may be enabled once both sub fields-of-view are traversed in a first direction, such as when entering a room. The alarm is not enabled when one or both sub fields-of-view are traversed in the opposite direction, for example when exiting the room.

In a fourth operational mode, when a person traverses both sub fields-of-view in a first direction, such as exiting a room, the alarm is not activated. However, such traversal activates a timer, which defines a predetermined time duration during which the sub fields-of-view may be traversed in the opposite direction, such as re-entering the room, without activating the alarm. Optionally, an audible and/or visual indication may be provided during the predetermined time duration.

When a person traverses both sub fields-of-view in a second direction, which is opposite to the first direction, such as when entering a room, the detector determines whether the predetermined time duration has elapsed. If the time duration has not elapsed, the timer is turned off and an alarm is disabled. If the time duration has elapsed, an alarm is enabled.

It is appreciated that the predetermined time duration may be selected or adjusted by the user, preferably according to the requirements of the environment in which the detector is installed.

Figure 21:
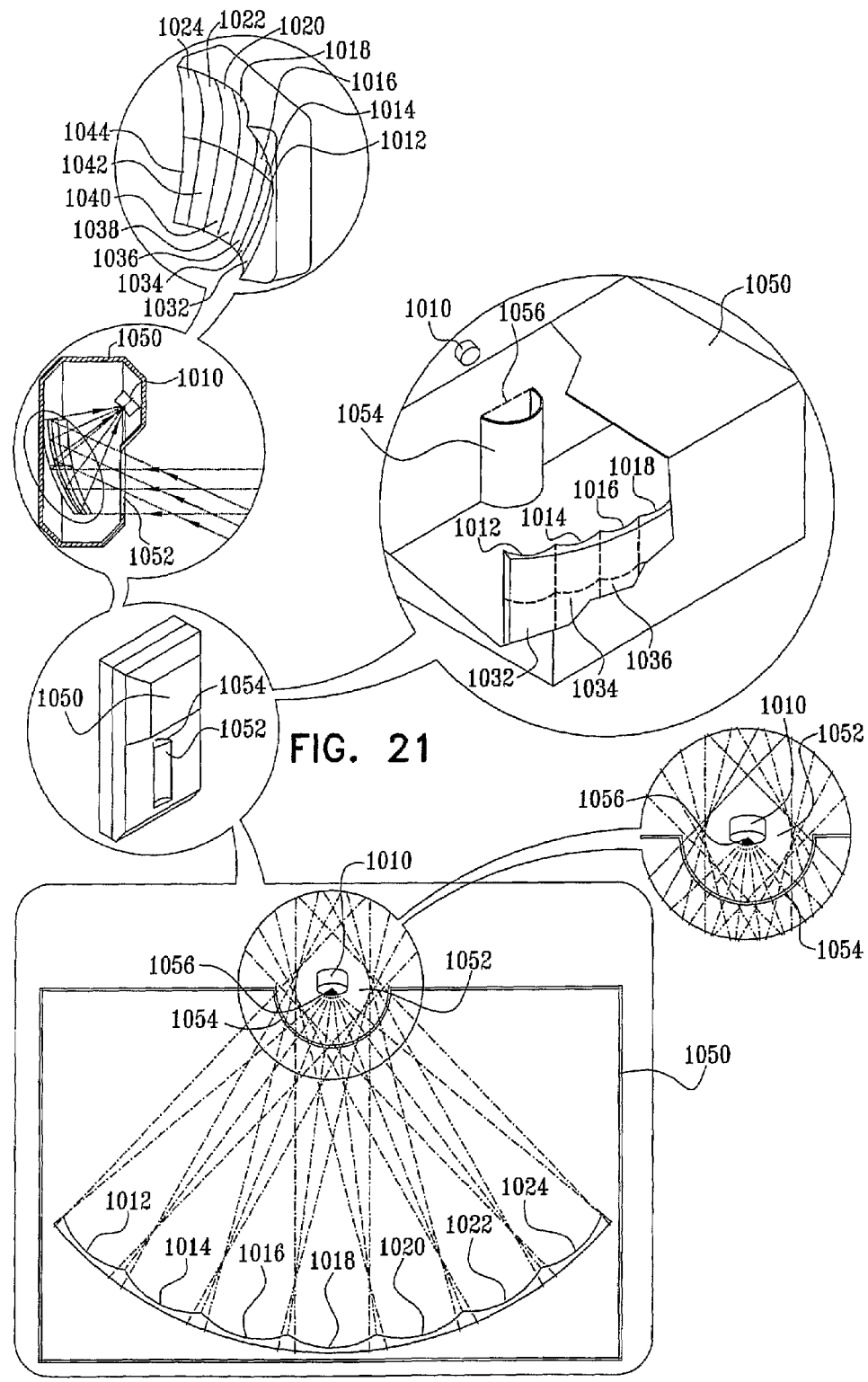
FIG. 21 is a simplified illustration of a detector constructed and operative in accordance with a further preferred embodiment of the present invention.

Reference is now made to FIG. 21, which is a simplified pictorial illustration of a mirror-based detector constructed and operative in accordance with a further preferred embodiment of the present invention. As seen in FIG. 21, the detector typically includes a mirror having fourteen mirror segments, each defining a corresponding zone. The mirror segments are arranged in a mutually concave arrangement in two rows.

As seen in the illustrated embodiment, a sensor 1010 is associated with mirror segments 1012, 1014, 1016, 1018, 1020, 1022 and 1024 in a top row and with mirror segments 1032, 1034, 1036, 1038, 1040, 1042 and 1044 in a bottom row. Each of the mirror segments is operative to focus radiation from its corresponding zone onto the sensor 1010. The mirror segments 1012, 1014, 1016, 1018, 1020, 1022 and 1024 preferably are arranged in a concave arrangement in a circular arc within a housing element 1050. Similarly, mirror segments 1032, 1034, 1036, 1038, 1040, 1042 and 1044 preferably are arranged in a concave arrangement in a circular arc within housing element 1050.

The housing element 1050 defines a relatively narrow slit aperture 1052 adjacent which is preferably located a common window 1054, preferably having a circular cross-section with its center generally at a location 1056 at the center of aperture 1052. Window 1054 preferably is made of a thin material transparent to IR radiation, such as HDPE, Silicon, Germanium or any other suitable material. Alternatively, other appropriate window shapes may be used.

A substantial advantage of the use of a window 1054 having a circular cross section is that such a window provides generally the same radiation attenuation at side zones and at a center zone. In contrast, were a flat window to be placed at the aperture, it would provide greater attenuation at side zones than at a center zone.

Sensor 1010 preferably comprises a dual element pyroelectric sensor, such as a LHi-968 sensor, commercially available from Perkin-Elmer of Freemont, Calif., USA.

It is a particular feature of the embodiment of FIG. 21 that narrow, slit type common aperture 1052 is provided. It is appreciated that all of the zones defined by each single horizontal layer of mirror segments are positioned so that they intersect generally at one location centered at location 1056. Preferably, aperture 1052 is designed to frame location 1056 as closely as possible without obstructing the zones. A relatively narrow area surrounds location 1056 just large enough to ensure that the housing surrounding aperture 1052 does not obscure the zones.

The advantages of the use of a narrow aperture housing structure are described hereinabove with reference to the embodiments shown in FIGS. 12-17.

Figure 22:
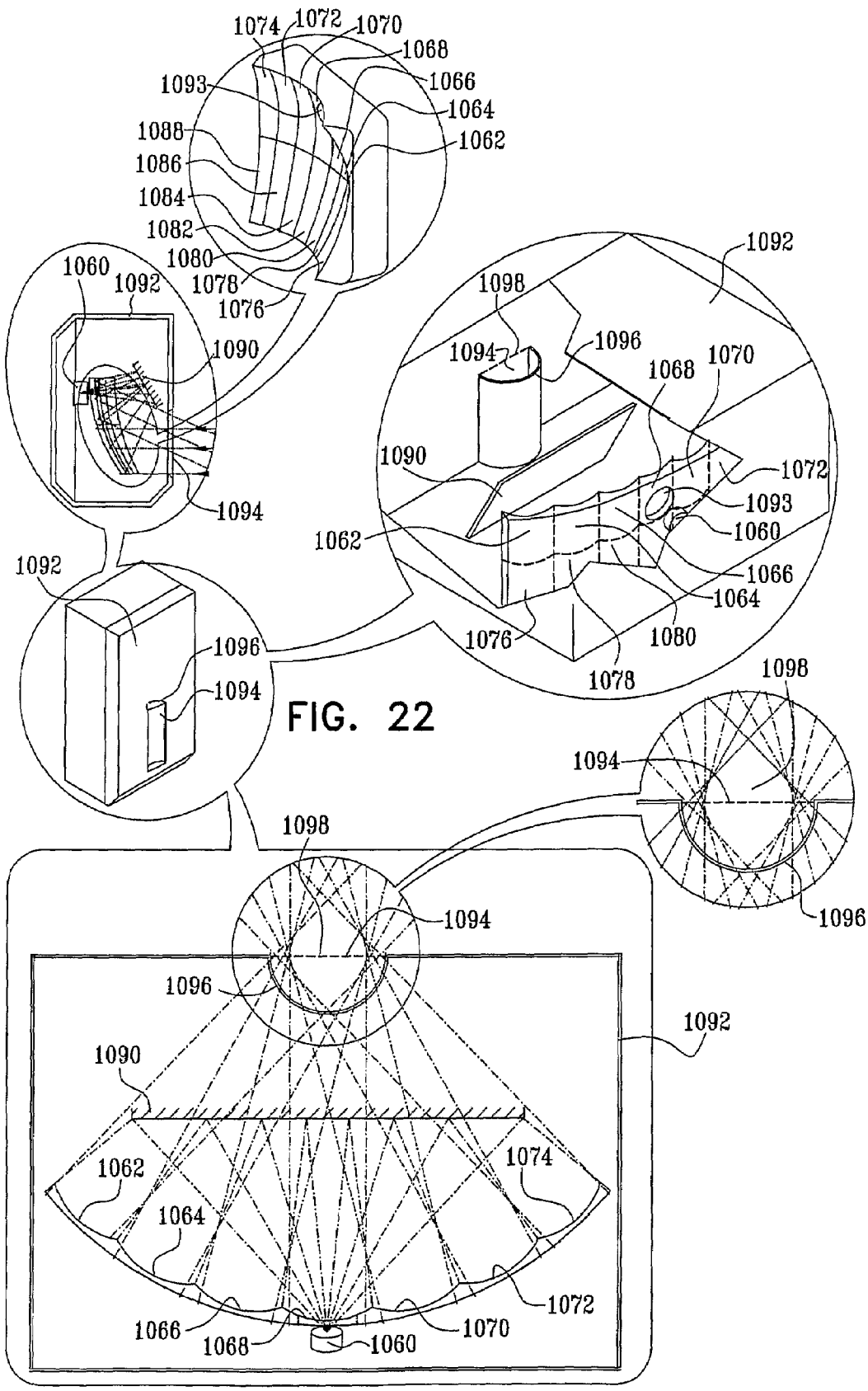
FIG. 22 is a simplified illustration of a detector constructed and operative in accordance with another further preferred embodiment of the present invention.

Reference is now made to FIG. 22, which is a simplified pictorial illustration of a mirror-based detector constructed and operative in accordance with a further preferred embodiment of the present invention. As seen in FIG. 22, the detector typically includes a mirror having fourteen mirror segments, each defining a corresponding zone. The mirror segments are arranged in a mutually concave arrangement in two rows.

As seen in the illustrated embodiment, a sensor 1060 is associated with mirror segments 1062, 1064, 1066, 1068, 1070, 1072 and 1074 in a top row and with mirror segments 1076, 1078, 1080, 1082, 1084, 1086 and 1088 in a bottom row. Each of the mirror segments is operative to focus radiation from its corresponding zone onto the sensor 1060 via at least one intermediate reflecting surface 1090. The mirror segments 1062, 1064, 1066, 1068, 1070, 1072 and 1074 preferably are arranged in a concave arrangement in a circular arc within a housing element 1092. Similarly, mirror segments 1076, 1078, 1080, 1082, 1084, 1086 and 1088 preferably are arranged in a concave arrangement in a circular arc within housing element 1092.

The sensor 1060 may be located at any suitable location within the housing 1092. The at least one intermediate reflecting surface 1090, here shown as a single intermediate reflecting surface, is located along optical paths defined by mirror segments 1062, 1064, 1066, 1068, 1070, 1072, 1074, 1076, 1078, 1080, 1082, 1084, 1086 and 1088 at a location suitable for redirecting radiation from the mirror segments to pyroelectric sensor 1060.

In the illustrated embodiment of FIG. 22, the sensor 1060 is shown mounted at an aperture 1093 in mirror segment 1068. It is appreciated that alternatively, the sensor 1060 may be located rearwardly of the aperture, and in such a case may be mounted on a circuit board (not shown) which also mounts the mirror segments. In such a case, intermediate reflecting surface 1090 may require some optical power.

The housing element 1092 defines a relatively narrow slit aperture 1094 adjacent which is preferably located a common window 1096, preferably having a circular cross-section with its center generally at a location 1098 at the center of aperture 1094. Window 1096 preferably is made of a thin material transparent to IR radiation, such as HDPE, Silicon, Germanium or any other suitable material. Alternatively, other appropriate window shapes, such as a flat window, may be used.

A substantial advantage of the use of a window 1096 having a circular cross section is that such a window provides generally the same radiation attenuation at side zones and at a center zone. In contrast, were a flat window to be placed at the aperture, it would provide greater attenuation at side zones than at a center zone.

Sensor 1060 preferably comprises a dual element pyroelectric sensor, such as a LHi-968 sensor, commercially available from Perkin-Elmer of Freemont, Calif., USA.

It is a particular feature of the embodiment of FIG. 22 that narrow, slit type common aperture 1094 is provided. It is appreciated that all of the zones defined by each single horizontal layer of mirror segments are positioned so that they intersect generally at one location centered at location 1098. Preferably, aperture 1094 is designed to frame location 1098 as closely as possible without obstructing the zones. A relatively narrow area surrounds location 1098, just large enough to ensure that the housing surrounding aperture 1094 does not obscure the zones.

The advantages of the use of a narrow aperture housing structure are described hereinabove with reference to the embodiments shown in FIGS. 12-17.

Figure 23:
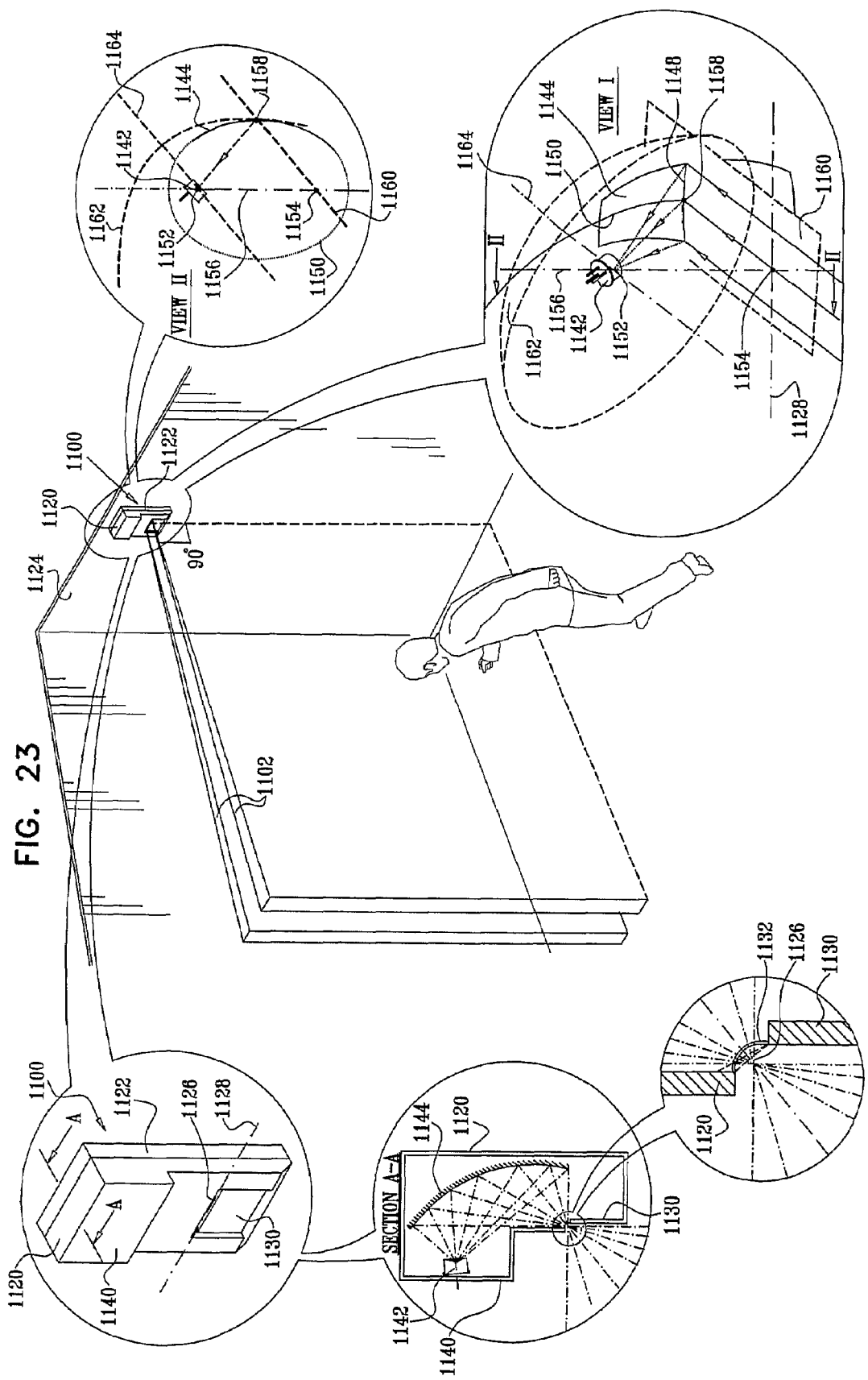
FIG. 23 is a simplified illustration of a detector constructed and operative in accordance with another yet further preferred embodiment of the present invention.

Reference is now made to FIG. 23, which is a simplified illustration of a detector 1100 constructed and operative in accordance with a yet a further preferred embodiment of the present invention.

Detector 1100 preferably provides a curtain-like field-of-view, designated by reference numerals 1102. The curtain-like field-of-view preferably generally extends through 90 degrees from the vertical to the horizontal as shown.

Detector 1100 preferably includes a housing 1120 and a base 1122 arranged to be mounted on a vertical mounting wall 1124 such that the base 1122 is flush with the mounting wall 1124. Housing 1120 is preferably formed with a generally downwardly inclined slit-like aperture, designated by reference numeral 1126, which is arranged to extend generally horizontally along a slit axis 1128 in the orientation shown in FIG. 23. The housing 1120 preferably includes a recessed housing panel 1130 disposed below a window 1132 located at aperture 1126. The recess is provided so as not to interfere with passage of radiation into aperture 1126 in a generally vertical upward direction. Housing 1120 is preferably formed with a protruding top panel 1140 disposed above window 1132.

Window 1132 preferably is made of a thin material transparent to IR radiation, such as HDPE, Silicon, Germanium or any other suitable material, and preferably has a circular cross-section with its center generally at the center of aperture 1126.

A substantial advantage of the use of a window 1132 having a circular cross section is that such a window provides generally the same radiation attenuation at side zones and at a center zone. In contrast, were a flat window to be placed at the aperture, it would provide greater attenuation at side zones than at a center zone.

As an alternative, forming window 1132 as a flat window with varying attenuation as a function of the vertical angle of the curtain enables control of the sensitivity of the detector, thereby providing pet immunity. Such varying attenuation may be provided by varying the thickness of the window material, such that radiation entering from different angles will traverse a corresponding different thickness of the window and will be attenuated to a correspondingly different extent.

Detector 1100 preferably comprises a pyroelectric sensor 1142, disposed within housing 1120 adjacent top panel 1140, which receives radiation from field-of-view 1102 via aperture 1126 and via a reflecting surface 1144 which focuses the radiation onto sensor 1142.

For enhanced clarity, FIG. 23 includes an enlarged view I, which illustrates the structure described hereinabove and an enlarged view II, which is a sectional view taken in the plane identified as II-II in view I.

Reflecting surface 1144 is preferably defined at least partially by a collection of curves 1148 disposed along an ellipse 1150, the ellipse having a first focus 1152 and a second focus 1154 along a principal axis thereof, designated by reference numeral 1156. Slit axis 1128 passes through the second focus 1154. Each of the curves 1148 is defined by the intersection at a point 1158 on the ellipse 1150, of an imaginary slit axis plane 1160 which includes the slit axis 1128 and an imaginary focusing surface 1162, such as a paraboloid or spherical surface. The focus of imaginary focusing surface 1162 is at the first focus 1152. The imaginary focusing surface 1162 has an axis of symmetry 1164 which is parallel to the slit axis plane 1160. The sensor 1142 is located at the first focus 1152.

Due to this design of the reflecting surface 1144, radiation entering the aperture, which is located at the second focus 1154 of ellipse 1150, and traveling along the imaginary slit axis plane 1160 parallel to the axis of symmetry 1164 of the imaginary focusing surface 1162, is focused by a curve 1148 onto the sensor 1142 located at the first focus 1152 of ellipse 1150, which is also the focus of the imaginary focusing surface 1162.

By varying the lengths of curves 1148, the area of the reflecting surface 1144 which views certain portions of the field-of-view may be varied, thus correspondingly varying the sensitivity of sensor 1142 for those portions of the field-of-view. This variation may be useful in various applications, such as for providing pet immunity by reducing sensitivity in regions close to the floor or for ensuring uniformity of sensitivity along the extent of the curtain notwithstanding distance from the sensor.

It is appreciated that variation of the area of the reflecting surface 1144 may additionally or alternatively be effected by masking selected portions of the reflecting surface 1144.

In a preferred embodiment of the invention, such as that shown in FIG. 23, pyroelectric sensor 1142 comprises a dual element pyroelectric sensor, such as an LHi-968, which is commercially available from Perkin-Elmer of Freemont, Calif., USA.

The above described structure of detector 1100 enables the use of a very narrow slit aperture, approximately 2-3 mm wide when using an LHi-968 sensor, due to the use of reflecting surface 1144 defined as described above, and therefore limits interference and is mechanically robust.

It is appreciated that a reflecting surface defined as described above with reference to reflecting surface 1144 may be utilized as an optical element or as a segment forming part of an optical element in any suitable type of detector, such as the detectors of the embodiments of FIGS. 4, 14, 15, 21 and 22.

Figure 24:
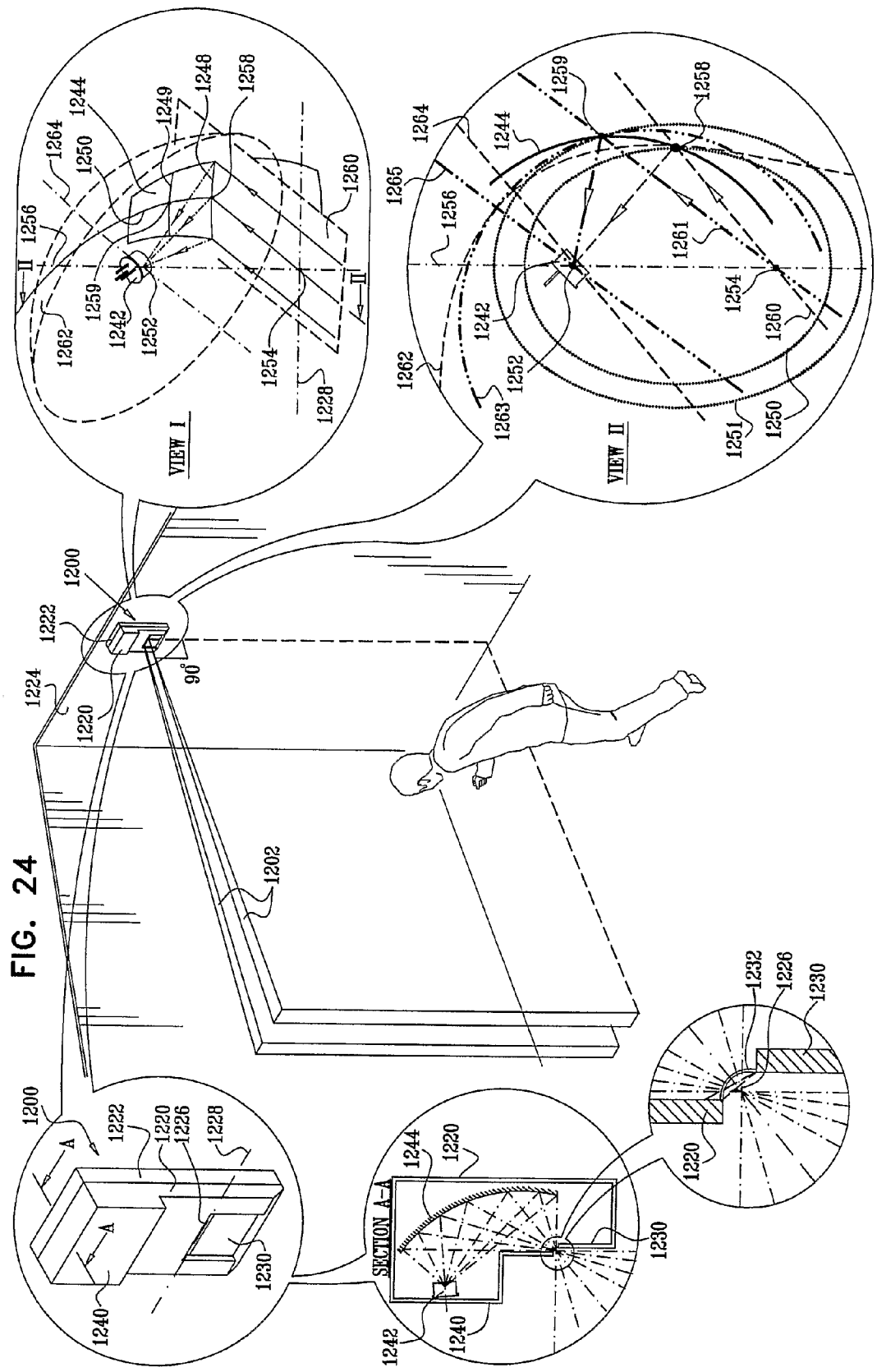
FIG. 24 is a simplified illustration of a detector constructed and operative in accordance with another still further preferred embodiment of the present invention.

Reference is now made to FIG. 24, which is a simplified illustration of a detector 1200 constructed and operative in accordance with a still a further preferred embodiment of the present invention.

Detector 1200 preferably provides a curtain-like field-of-view, designated by reference numerals 1202. The curtain-like field-of-view preferably generally extends through 90 degrees from the vertical to the horizontal as shown.

Detector 1200 preferably includes a housing 1220 and a base 1222 arranged to be mounted on a vertical mounting wall 1224 such that the base 1222 is flush with the mounting wall 1224. Housing 1220 is preferably formed with a generally downwardly inclined slit-like aperture, designated by reference numeral 1226, which is arranged to extend generally horizontally along a slit axis 1228 in the orientation shown in FIG. 24. The housing 1220 preferably includes a recessed housing panel 1230 disposed below a window 1232 located at aperture 1226. The recess is provided so as not to interfere with passage of radiation into aperture 1226 in a generally vertical upward direction. Housing 1220 is preferably formed with a protruding top panel 1240 disposed above window 1232.

Window 1232 preferably is made of a thin material transparent to IR radiation, such as HDPE, Silicon, Germanium or any other suitable material, and preferably has a circular cross-section with its center generally at the center of aperture 1226.

A substantial advantage of the use of a window 1232 having a circular cross section is that such a window provides generally the same radiation attenuation at side zones and at a center zone. In contrast, were a flat window to be placed at the aperture, it would provide greater attenuation at side zones than at a center zone.

As an alternative, forming window 1232 as a flat window with varying attenuation as a function of the vertical angle of the curtain enables control of the sensitivity of the detector, thereby providing pet immunity. Such varying attenuation may be provided by varying the thickness of the window material, such that radiation entering from different angles will traverse a corresponding different thickness of the window and will be attenuated to a correspondingly different extent.

Detector 1200 preferably comprises a pyroelectric sensor 1242, disposed within housing 1220 adjacent top panel 1240, which receives radiation from field-of-view 1202 via aperture 1226 and via a reflecting surface 1244 which focuses the radiation onto sensor 1242.

For enhanced clarity, FIG. 24 includes an enlarged view I, which illustrates the structure described hereinabove and an enlarged view II, which is a sectional view taken in the plane identified as II-II in view I.

Reflecting surface 1244 is preferably defined at least partially by a collection of curves, two of which are shown and respectively designated by reference numerals 1248 and 1249. The curves are disposed along a plurality of different ellipses, two of which are shown and respectively indicated by reference numerals 1250 and 1251, all having a common first focus 1252 and a common second focus 1254 along a common principal axis 1256 and all lying in the same plane. Slit axis 1228 passes through the second focus 1254.

Each of the curves 1248 and 1249 is defined by the intersection at a point, here shown as points 1258 and 1259 on respective ellipses 1250 and 1251 associated therewith of respective imaginary slit axis plane, here designated by reference numerals 1260 and 1261, both of which includes the slit axis 1228 and respective imaginary focusing surfaces, here designated by reference numerals 1262 and 1263, such as a paraboloid or spherical surface. The focus of both imaginary focusing surfaces 1262 and 1263 is at the first common focus 1252. Each of imaginary focusing surfaces 1262 and 1263 has an axis of symmetry, here indicated by reference numerals 1264 and 1265, which is parallel to a respective one of slit axis planes 1260 and 1261. The sensor 1242 is located at the first common focus 1252. Due to this design of the reflecting surface 1244, radiation entering the aperture 1226, which is located at the second focus 1254 of the ellipses 1250 and 1251, and traveling along the imaginary slit axis planes 1260 and 1261 parallel to the axes of symmetry 1264 and 1265 of the imaginary focusing surfaces 1262 and 1263, is focused by curves 1248 and 1249 onto the sensor 1242, located at the first focus 1252 of the ellipses 1250 and 1251, which is also the focus of the imaginary focusing surfaces 1262 and 1263.

By varying the lengths of curves 1248 and 1249, the area of the reflecting surface 1244, which views certain portions of the field-of-view, may be varied, thus correspondingly varying the sensitivity of sensor 1242 for those portions of the field-of-view. This variation may be useful in various applications, such as for providing pet immunity by reducing sensitivity in regions close to the floor or for ensuring uniformity of sensitivity along the extent of the curtain notwithstanding distance from the sensor.

It is appreciated that variation of the area of the reflecting surface 1244 may additionally or alternatively be effected by masking selected portions of the reflecting surface 1244.

In a preferred embodiment of the invention, such as that shown in FIG. 24, pyroelectric sensor 1242 comprises a dual element pyroelectric sensor, such as an LHi-968, which is commercially available from Perkin-Elmer of Freemont, Calif., USA.

The above described structure of detector 1200 enables the use of a very narrow slit aperture, approximately 2-3 mm wide when using an LHi-968 sensor, due to the use of reflecting surface 1244 defined as described above, and therefore limits interference and is mechanically robust. Preferably, the length of the slit aperture 1226 is somewhat larger than the length of the longest curve defining the reflecting surface.

It is appreciated that a reflecting surface defined as described above with reference to reflecting surface 1244 may be utilized as an optical element or as a segment forming part of an optical element in any suitable type of detector, such as the detectors of the embodiments shown in FIGS. 4, 14, 15, 21 and 22.

Figure 25:
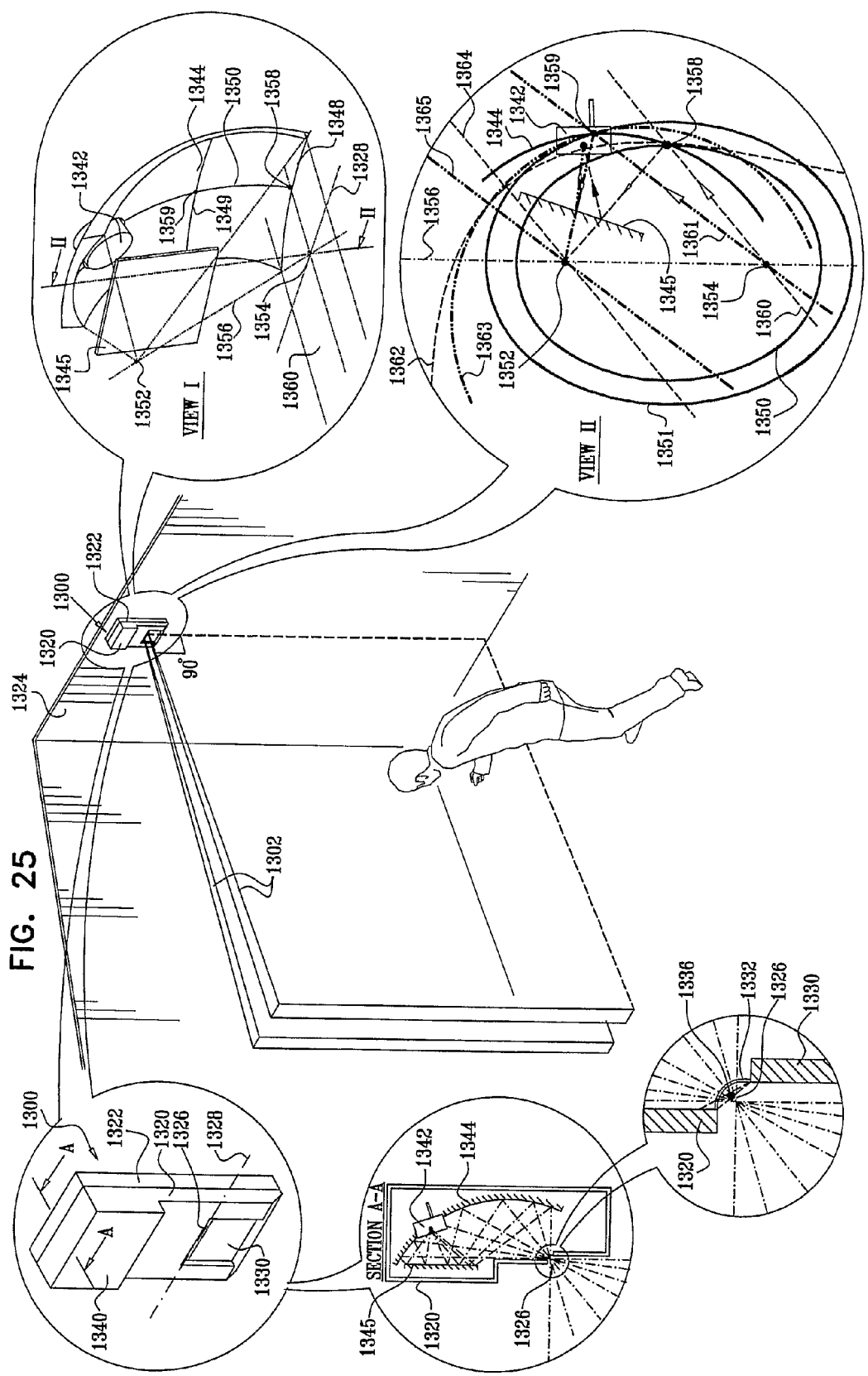
FIG. 25 is a simplified illustration of a detector constructed and operative in accordance with a yet additional preferred embodiment of the present invention.

Reference is now made to FIG. 25, which is a simplified illustration of a detector 1300 constructed and operative in accordance with yet an additional preferred embodiment of the present invention.

Detector 1300 preferably provides a curtain-like field-of-view, designated by reference numeral 1302. The curtain-like field-of-view preferably generally extends through 90 degrees from the vertical to the horizontal as shown.

Detector 1300 preferably includes a housing 1320 and a base 1322 arranged to be mounted on a vertical mounting wall 1324 such that the base 1322 is flush with the mounting wall 1324. Housing 1320 is preferably formed with a generally downwardly inclined slit-like aperture, designated by reference numeral 1326, which is arranged to extend generally horizontally along an aperture axis 1328 in the orientation shown in FIG. 25. The housing 1320 preferably includes a recessed housing panel 1330 disposed below a window 1332 located at aperture 1326. The recess is provided so as not to interfere with passage of radiation into aperture 1326 in a generally vertical upward direction. Housing 1320 is preferably formed with a protruding top panel 1340 disposed above window 1332.

Window 1332 preferably is made of a thin material transparent to IR radiation, such as HDPE, Silicon, Germanium or any other suitable material, and preferably has a circular cross-section with its center generally at location 1336 at the center of aperture 1326.

Window 1332 may be formed with varying attenuation as a function of the vertical angle of the curtain, thus enabling control of the sensitivity of the detector, thereby providing pet immunity. Such varying attenuation may be provided by varying the thickness of the window material, such that radiation entering from different angles will traverse a corresponding different thickness of the window and will be attenuated to a correspondingly different extent.

Detector 1300 preferably comprises a pyroelectric sensor 1342, disposed within housing 1320, which receives radiation from field-of-view 1302 via aperture 1326 and via a reflecting surface 1344 which focuses the radiation onto sensor 1342 via at least one intermediate reflecting surface 1345.

For enhanced clarity, FIG. 25 includes an enlarged view I, which illustrates the structure described hereinabove and an enlarged view II, which is a sectional view taken in the plane identified as II-II in view I.

Reflecting surface 1344 is preferably defined at least partially by a collection of curves, two of which are shown and respectively designated by reference numerals 1348 and 1349. The curves are disposed along a plurality of different ellipses, two of which are shown and respectively indicated by reference numerals 1350 and 1351, all having a common first focus 1352 and a common second focus 1354 along a common principal axis 1356 and all lying in the same plane. Aperture axis 1328 passes through the second focus 1354.

Each of the curves 1348 and 1349 is defined by the intersection at a point, here shown as points 1358 and 1359 on respective ellipses 1350 and 1351 associated therewith, of respective imaginary aperture axis planes, here designated by reference numerals 1360 and 1361, both of which include the aperture axis 1328, and respective imaginary focusing surfaces, here indicated by reference numerals 1362 and 1363, such as a paraboloid or spherical surface. The focus of both imaginary focusing surfaces 1362 and 1363 is at the first common focus 1352. Each of the imaginary focusing surfaces 1362 and 1363 has an axis of symmetry, here indicated by reference numerals 1364 and 1365, which is parallel to a respective one of aperture axis planes 1360 and 1361.

Due to this design of the reflecting surface 1344, radiation entering the aperture 1326, which is located at the second focus 1354 of the ellipses 1350 and 1351, and traveling along the imaginary slit axis planes 1360 and 1361 parallel to the axes of symmetry 1364 and 1365 of the imaginary focusing surfaces 1362 and 1363, is focused by curves 1348 and 1349 onto the sensor 1342, located at the first focus 1352 of the ellipses 1350 and 1351, which is also the focus of the imaginary focusing surfaces 1362 and 1363.

The sensor 1342 may be located at any suitable location within the housing 1320. The at least one intermediate reflecting surface 1345, here shown as a single intermediate reflecting surface, is located along an optical path defined by reflecting surface 1344 at a location suitable for redirecting radiation from reflecting surface 1344 to pyroelectric sensor 1342.

In the illustrated embodiment of FIG. 25, the sensor 1342 is shown mounted at an aperture in reflecting surface 1344. It is appreciated that alternatively, the sensor 1342 may be located rearwardly of an aperture in the reflecting surface 1344, and in such a case may be mounted on a circuit board (not shown) which also mounts reflecting surface 1344. In such a case, intermediate reflecting surface 1345 may require some optical power.

By varying the lengths of curves 1348 and 1349, the area of the reflecting surface 1344, which views certain portions of the field-of-view, may be varied, thus correspondingly varying the sensitivity of sensor 1342 for those portions of the field-of-view. This variation may be useful in various applications, such as for providing pet immunity by reducing sensitivity in regions close to the floor, for ensuring uniformity of sensitivity along the extent of the curtain notwithstanding distance from the sensor or for compensating for the aperture formed in reflecting surface 1344.

It is appreciated that variation of the area of the reflecting surface 1344 may additionally or alternatively be effected by masking selected portions of the reflecting surface 1344.

In a preferred embodiment of the invention, such as that shown in FIG. 25, pyroelectric sensor 1342 comprises a dual element pyroelectric sensor, such as an LHi-968, which is commercially available from Perkin-Elmer of Freemont, Calif., USA.

The above described structure of detector 1300 enables the use of a very narrow slit aperture, approximately 2-3 mm wide when using an LHi-968 sensor, due to the use of reflecting surface 1344 defined as described above, and therefore limits interference and is mechanically robust. Preferably, the length of the slit aperture 1326 is somewhat larger than the length of the longest curve defining the reflecting surface.

It is appreciated that a reflecting surface defined as described above with reference to reflecting surface 1344 may be utilized as an optical element or as a segment forming part of an optical element in any suitable type of detector, such as the detectors of the embodiments shown in FIGS. 4, 5, 14, 15, 21 and 22.

Figure 26:
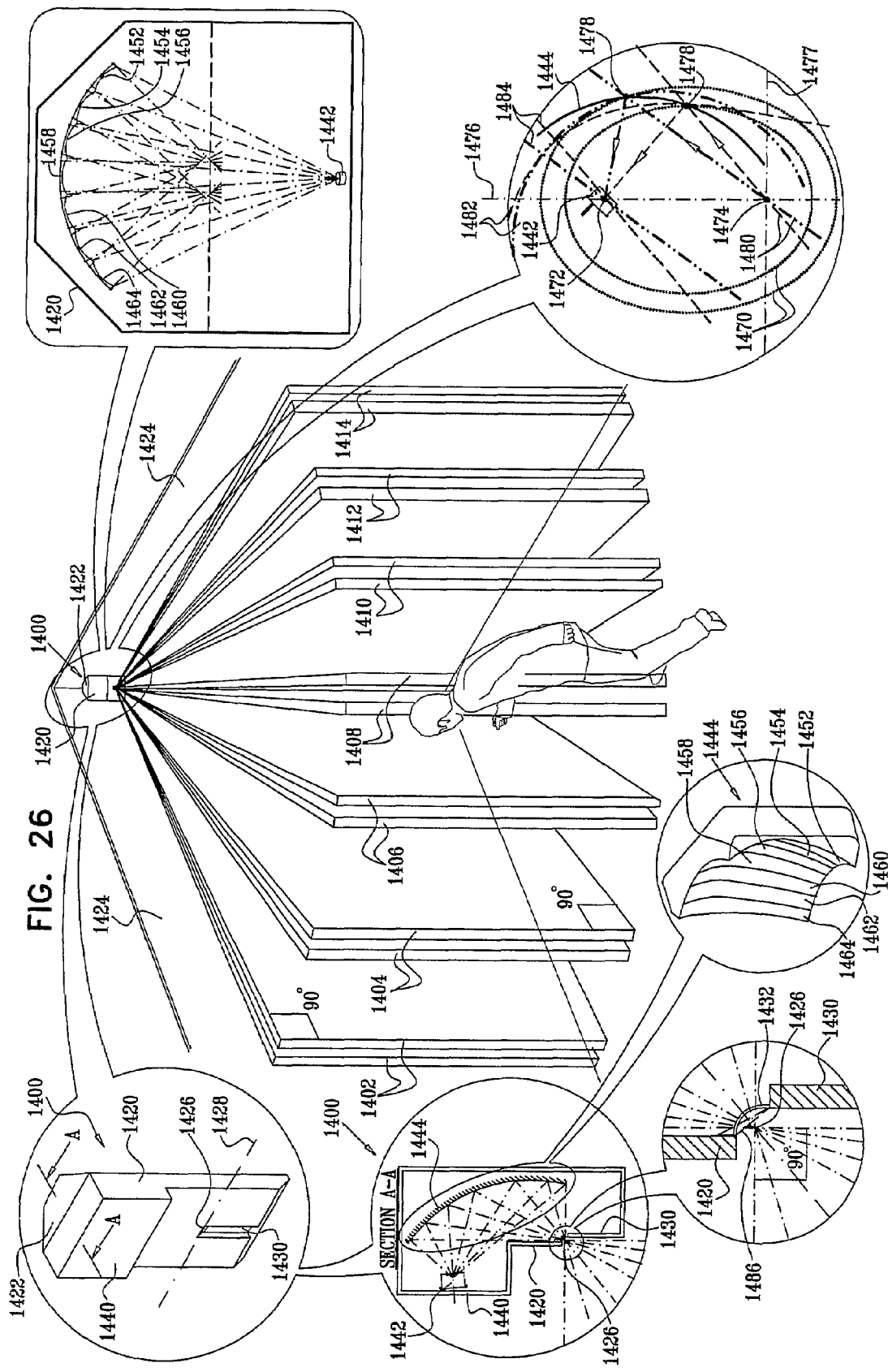
FIG. 26 is a simplified illustration of a detector constructed and operative in accordance with a still additional preferred embodiment of the present invention.

Reference is now made to FIG. 26, which is a simplified pictorial illustration of a mirror-based detector constructed and operative in accordance with a still additional preferred embodiment of the present invention. As seen in FIG. 26, the detector typically includes a mirror having seven mirror segments, each defining a corresponding zone. The mirror segments are arranged in a mutually concave arrangement.

Detector 1400 preferably provides a plurality of curtain-like zones, designated by reference numerals 1402, 1404, 1406, 1408, 1410, 1412 and 1414. The curtain-like zones preferably generally extend through 90 degrees from the vertical to the horizontal as shown, and are distributed azimuthally generally through 90 degrees as shown, thus providing coverage of the entire room in which the detector is installed, when mounted in the corner of the room.

Detector 1400 preferably includes a housing 1420 and a base 1422 arranged to be mounted at a corner of a pair of vertical walls 1424. Housing 1420 is preferably formed with an aperture 1426. The housing 1420 preferably includes a recessed housing panel 1430 disposed below a window 1432 located at aperture 1426. The recess is provided so as not to interfere with passage of radiation into aperture 1426 in a generally vertical upward direction. Housing 1420 is preferably formed with a protruding top panel 1440 disposed above window 1432.

Detector 1400 preferably comprises a pyroelectric sensor 1442, disposed within housing 1420 adjacent top panel 1440, which receives radiation from zones 1402-1414 via aperture 1426 and via a reflecting surface 1444 which focuses the radiation onto sensor 1442.

Reflecting surface 1444 typically comprises seven mirror segments 1452, 1454, 1456, 1458, 1460, 1462 and 1464, which are respectively associated with zones 1402, 1404, 1406, 1408, 1410, 1412 and 1414. The mirror segments 1452, 1454, 1456, 1458, 1460, 1462 and 1464 are arranged in a concave arrangement preferably in a circular arc within a housing element 1420.

Each of mirror segments 1452, 1454, 1456, 1458, 1460, 1462 and 1464 is preferably defined at least partially by a collection of curves, similar to curves 1148 shown in FIG. 23, disposed along one or more ellipses 1470, having a common first focus 1472 and a common second focus 1474 along a common principal axis 1476 and lying in the same plane.

For each of the mirror segments, a respective aperture axis 1477 passes through the second focus 1474. Each of the curves in a mirror segment is defined by the intersection at a point 1478 on a respective ellipse 1470, of a respective imaginary aperture axis plane 1480, which includes the aperture axis 1477, and a respective imaginary focusing surface 1482, such as a paraboloid or spherical surface. The focus of each imaginary focusing surface 1482 is at the first focus 1472.

Each imaginary focusing surface 1482 has an axis of symmetry 1484 which is parallel to a respective aperture axis plane 1480. The sensor 1442 is located at the first focus 1472. As a result, radiation passing through aperture 1426 along each aperture axis plane 1480 of each curve is focused onto the sensor at the first focus 1472 by that curve.

By varying the lengths of the curves, the area of each of the segments 1452, 1454, 1456, 1458, 1460, 1462 and 1464 which views a certain portion of its respective zone may be varied, thus correspondingly varying the sensitivity of sensor 1442 for that portion. This variation may be useful in various applications, such as for providing pet immunity by reducing sensitivity in regions close to the floor or for ensuring uniformity of sensitivity along the extent of the curtain notwithstanding distance from the sensor.

Window 1432 preferably is made of a thin material transparent to IR radiation, such as HDPE, Silicon, Germanium or any other suitable material, and preferably has a circular cross-section with its center generally at location 1486 at the center of aperture 1426. Alternatively, other appropriate window shapes, such as a tire-like window shape, may be used.

A substantial advantage of the use of a window 1432 having a tire-like shape is that such a window provides generally the same radiation attenuation at side zones and at a center zone. In contrast, were a flat window or a window having a circular cross section to be placed at the aperture, it would provide greater attenuation at side zones than at a center zone.

As an alternative, forming window 1432 with varying attenuation as a function of the vertical angle of the curtain enables control of the sensitivity of the detector, thereby providing pet immunity. Such varying attenuation may be provided by varying the thickness of the window material, such that radiation entering from different angles will traverse a corresponding different thickness of the window and will be attenuated to a correspondingly different extent.

In a preferred embodiment of the invention, such as that shown in FIG. 26, pyroelectric sensor 1442 comprises a dual element pyroelectric sensor, such as an LHi-968, which is commercially available from Perkin-Elmer of Freemont, Calif., USA.

It is a particular feature of the embodiment of FIG. 26 that an extremely small common aperture 1426, which is substantially narrower in both dimensions than apertures commonly used in PIR detectors, is provided. Preferably dimensions of the aperture are 4 mm×8 mm when using a sensor such as LHi-968, which provides coverage of an area of 15 m×15 m. It is appreciated that all of the zones defined by the mirror segments are positioned so that they intersect generally at one location 1486 at the center of common aperture 1426. Preferably, aperture 1426 is designed to frame location 1486 as closely as possible without obstructing the zones.

The advantages of the use of an extremely small aperture housing structure are even greater than those described hereinabove with reference to the embodiments of FIGS. 12-17, inasmuch as the aperture is nearly invisible from a distance and thus enables the detector to be effectively hidden from view.

Figure 27:
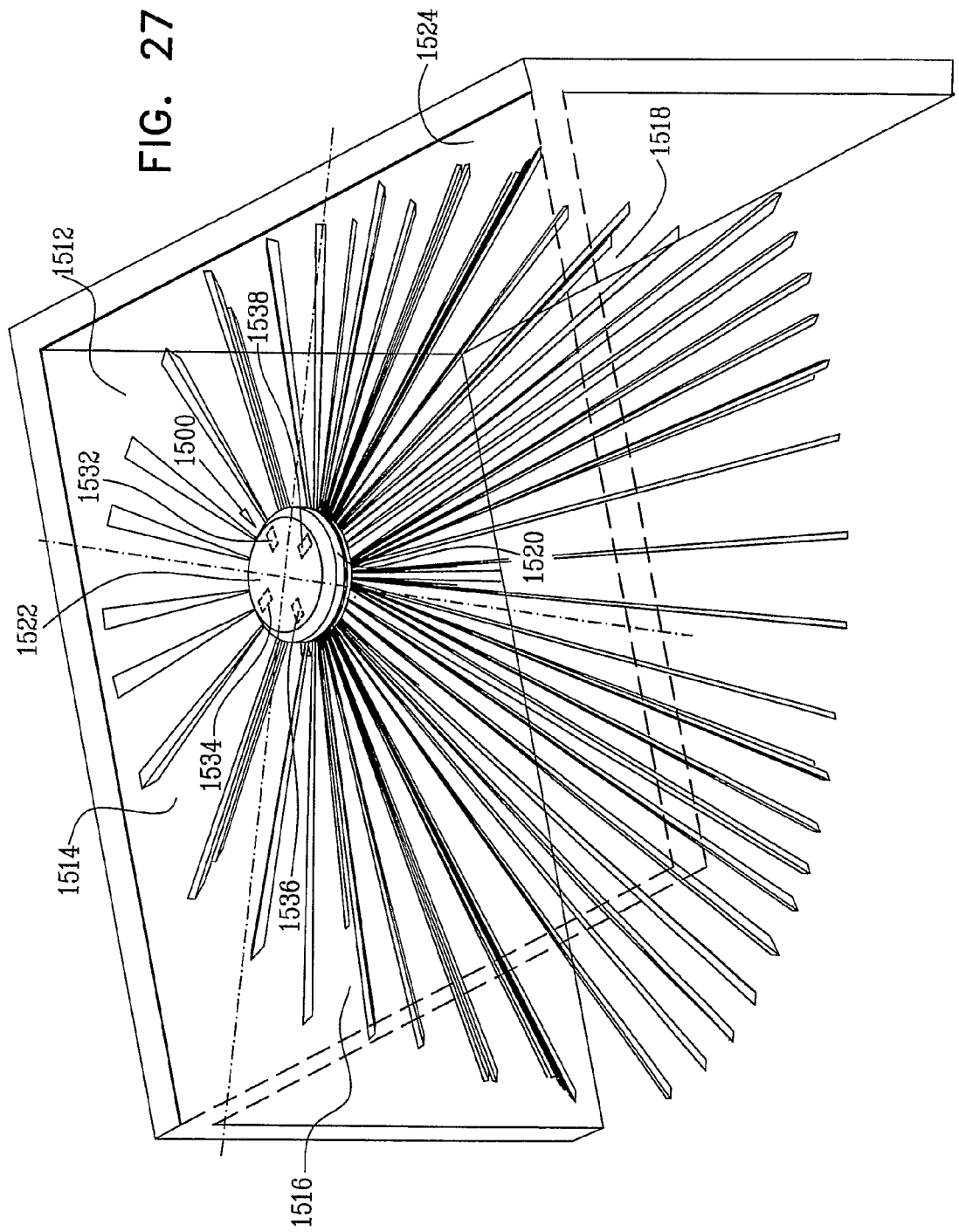
FIG. 27 is a simplified pictorial illustration of a detector constructed and operative in accordance with a further preferred embodiment of the present invention.
Figure 28:
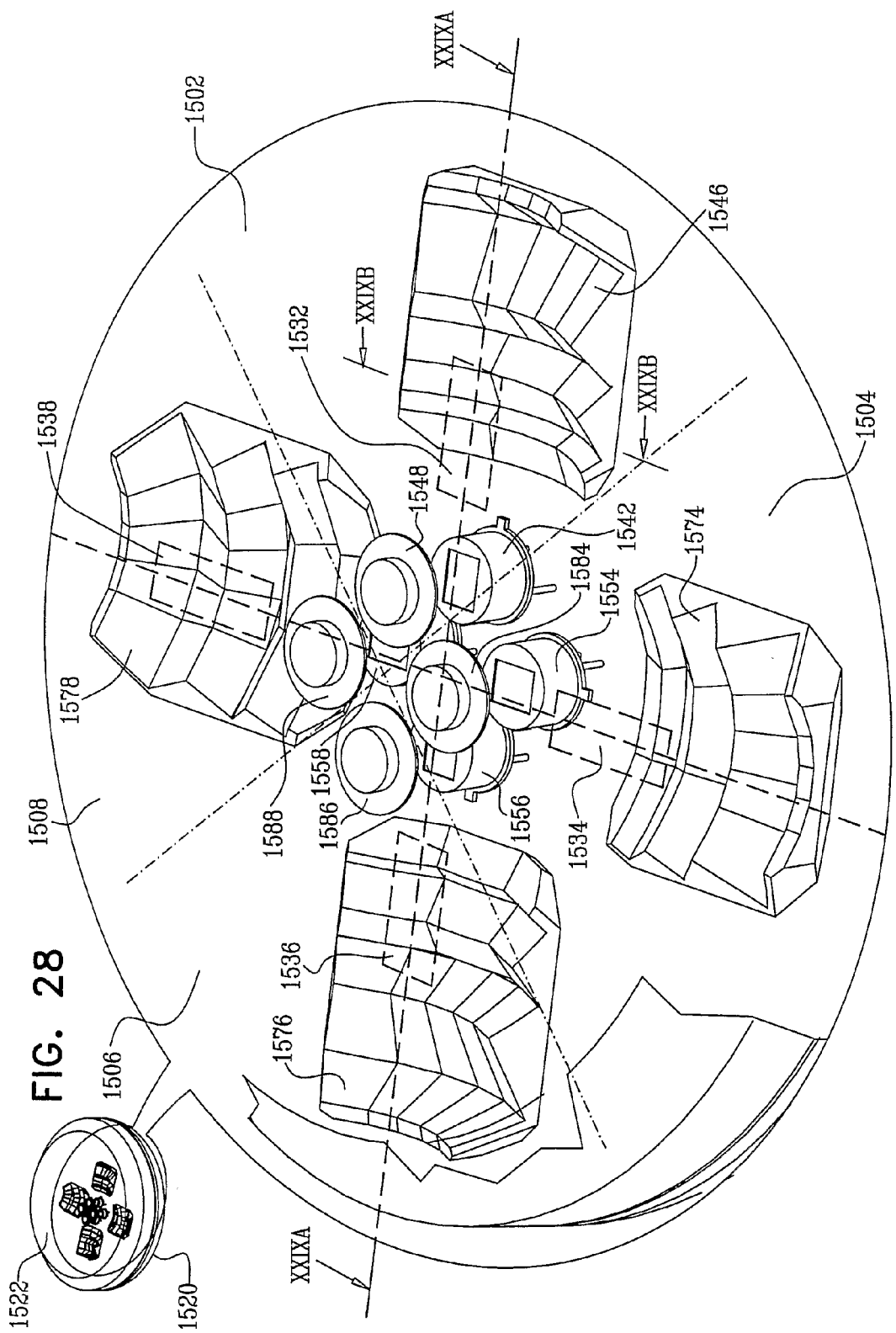
FIG. 28 is a simplified interior view pictorial illustration of the detector of FIG. 27.
Figure 29A:
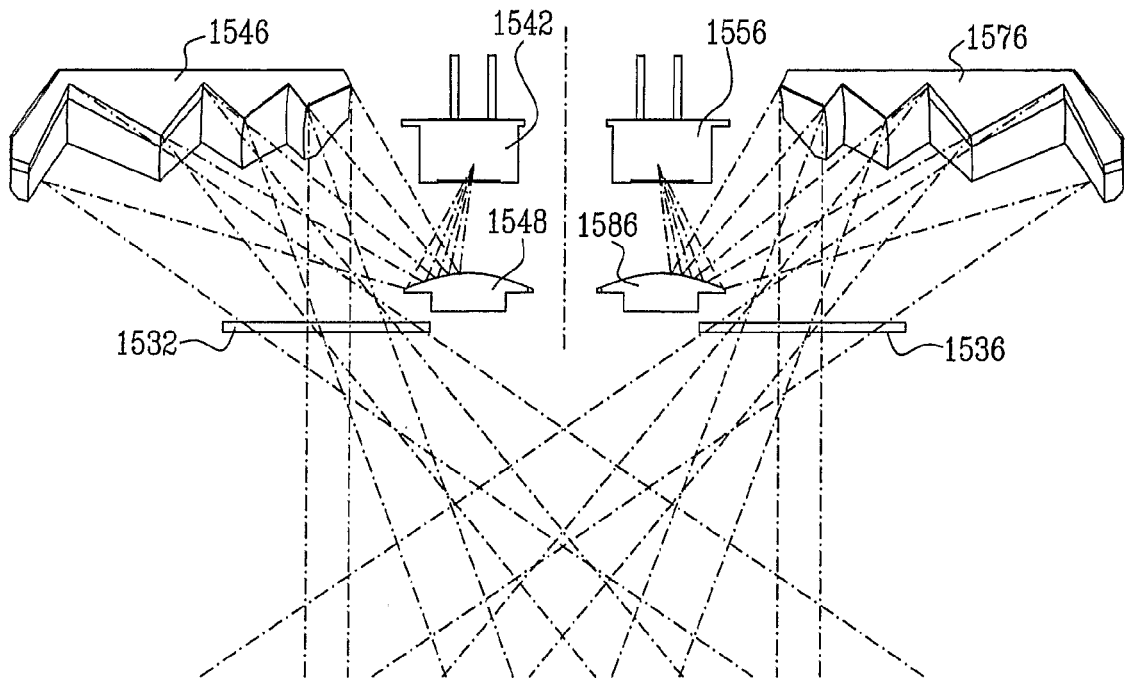
FIGS. 29A and 29B are simplified sectional illustration taken along respective section lines XXIXA-XXIXA and XXIXB-XXIXB in FIG. 28.
Figure 29B:
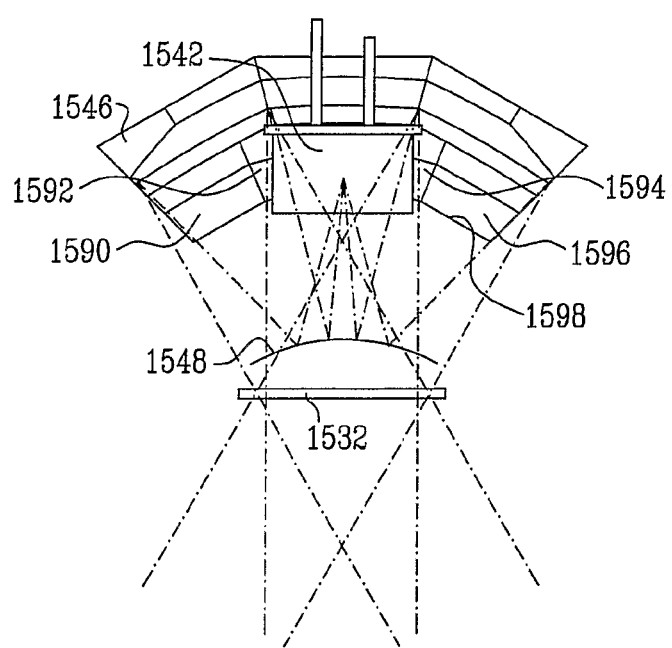

Reference is now made to FIG. 27, which is a simplified pictorial illustration of a detector constructed and operative in accordance with a further preferred embodiment of the present invention, to FIG. 28, which is a simplified interior view pictorial illustration of the detector of FIG. 27, and to FIGS. 29A and 29B which are sectional illustrations taken along respective section lines XXIXA-XXIXA and XXIXB-XXIXB in FIG. 28.

As seen in FIGS. 27-29B, there is provided a ceiling detector 1500 which preferably comprises four detection modules, respectively designated by reference numerals 1502, 1504, 1506 and 1508, having respective detection module fields-of-view, respectively designated by reference numerals 1512, 1514, 1516 and 1518, each preferably generally viewing a quarter of a room in which the detector 1500 is placed, as shown particularly in FIG. 27. As can be readily seen in FIGS. 27-29B, each of the detection module fields-of-view 1512, 1514, 1516 and 1518 includes multiple zones which are arranged in plural layers.

Detector 1500 is operative to indicate when an intruder passes through any of detection module fields-of-view 1512, 1514, 1516 and 1518 according to predetermined criteria. A certain amount of overlap may be provided between the detection module fields-of-view.

Detector 1500 preferably includes a housing 1520 and a base 1522 arranged to be mounted on a ceiling 1524 such that the base 1522 is flush with the ceiling. It is a particular feature of the present invention that housing 1520 is preferably formed with four elongate apertures, respectively designated by reference numerals 1532, 1534, 1536 and 1538, suitably aligned with respective detection modules 1502, 1504, 1506 and 1508. A window is typically disposed adjacent each of apertures 1532, 1534, 1536 and 1538. The windows are preferably made of a thin material transparent to IR radiation, such as HDPE, Silicon, Germanium or any other suitable material. The windows are preferably flat, but, alternatively, windows having a circular cross section may be used.

Detection module 1502 preferably comprises a pyroelectric sensor 1542, which receives radiation from detection module field-of-view 1512 via elongate aperture 1532 and via a multi-segmented mirror 1546 which focuses the radiation onto sensor 1542 via an intermediate reflective surface 1548, which is preferably a hyperboloid surface.

Similarly, each of detection modules 1504, 1506 and 1508 preferably comprises a pyroelectric sensor, which are respectively designated by reference numerals 1554, 1556 and 1558. Pyroelectric sensors 1554, 1556 and 1558 respectively receive radiation from detection module fields-of-view 1514, 1516 and 1518 via elongate apertures 1534, 1536 and 1538 and via reflecting surfaces 1574, 1576 and 1578 which focus the radiation via intermediate reflective surfaces 1584, 1586 and 1588 onto sensors 1554, 1556 and 1558.

It is a particular feature of the embodiment of FIGS. 27-29B that narrow, slit type common apertures 1532, 1534, 1536 and 1538 are provided. It is appreciated that all of the zones in each layer defined by the various mirror segments in a multi-segment mirror of a given detection module, such as segments 1590, 1592, 1594 and 1596 of a layer 1598 of reflective surface 1546 shown with particular clarity in FIG. 29B, are positioned so that they intersect generally at one location centered at the aperture 1532. Preferably, the aperture is designed to frame the location as closely as possible without obstructing the zones. A relatively narrow area surrounds the location of intersection, ensuring that the housing surrounding the aperture does not obscure the zones.

The advantages of the use of a narrow aperture housing structure are described hereinabove with reference to the embodiments shown in FIGS. 12-17.

In a preferred embodiment of the invention, such as that shown in FIGS. 27-29B, pyroelectric sensors 1542, 1554, 1556 and 1558 each comprise a dual element pyroelectric sensor, such as an LHi-968, which is commercially available from Perkin-Elmer of Freemont, Calif., USA.

A peripheral guard element (not shown) may be formed surrounding windows formed adjacent each of apertures 1532, 1534, 1536 and 1538 to provide enhanced protection thereto. The small aperture, typically covered by a small window, additionally may serve as a radiation filter, allowing only radiation of a certain wavelength range, such as IR radiation, to pass therethrough. The relatively narrow, small sized window reduces the cost of the filter. Furthermore, it is easier to apply anti-masking measures to protect a narrow window, than to protect a wide window.

Figure 31:
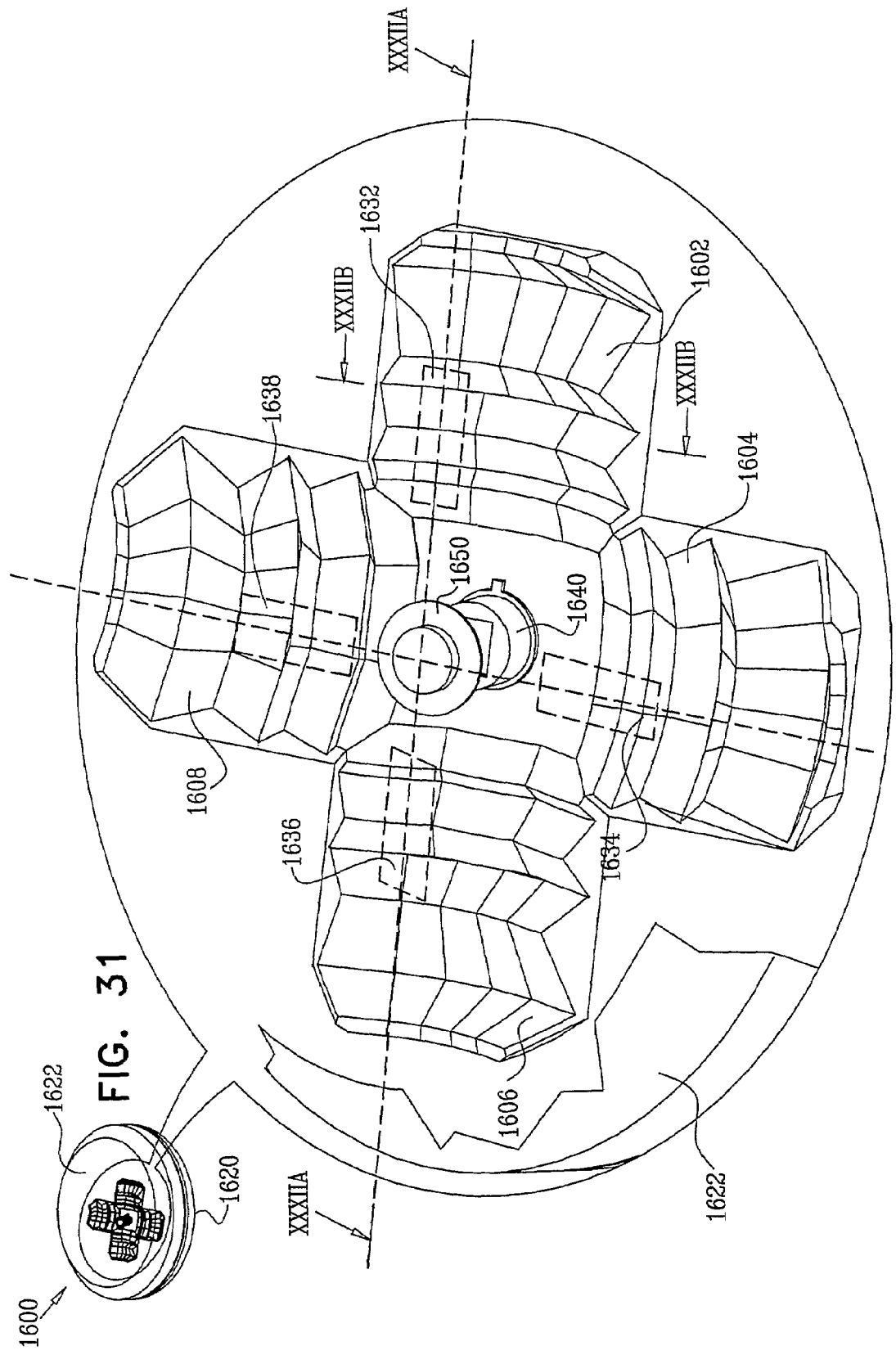
FIG. 31 is a simplified interior view pictorial illustration of the detector of FIG. 29.
Figure 32A:
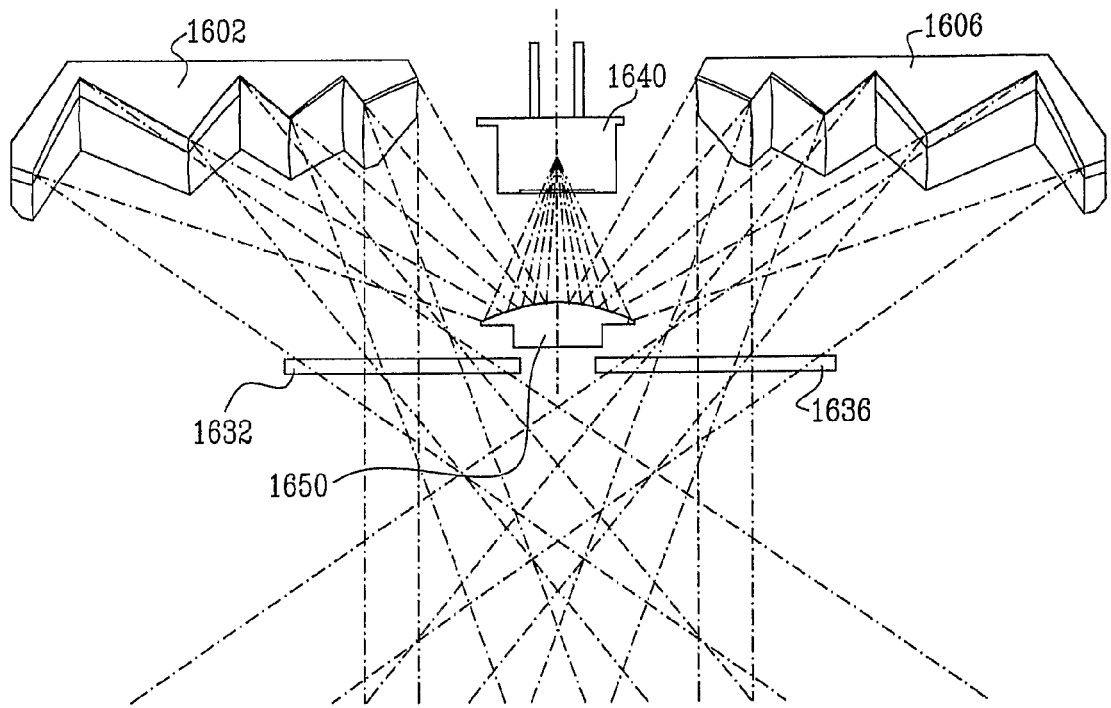
FIGS. 32A and 32B are simplified sectional illustration taken along respective section lines XXXIIA-XXXIIA and XXXIIB-XXXIIB in FIG. 31.
Figure 32B:
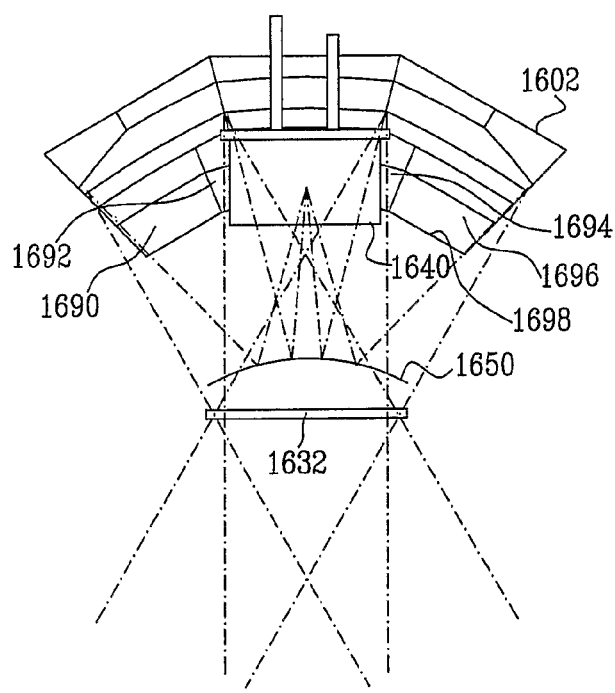

Reference is now made to FIG. 30, which is a simplified pictorial illustration of a detector constructed and operative in accordance with a further preferred embodiment of the present invention, to FIG. 31, which is a simplified interior view pictorial illustration of the detector of FIG. 30, and to FIGS. 32A and 32B which are sectional illustrations taken along respective section lines XXXIIA-XXXIIA and XXXIIB-XXXIIB in FIG. 31.

As seen in FIGS. 30-32B, there is provided a ceiling detector 1600 which preferably comprises four multi-segment reflectors, respectively designated by reference numerals 1602, 1604, 1606 and 1608, having respective reflector view regions, respectively designated by reference numerals 1612, 1614, 1616 and 1618, each preferably generally viewing a quarter of a room in which the detector 1600 is placed, as shown particularly in FIG. 30. As can be readily seen in FIG. 30, each of the reflector view regions 1612, 1614, 1616 and 1618 includes multiple zones which are arranged in plural layers.

Detector 1600 is operative to indicate when an intruder passes through any of reflector view regions 1612, 1614, 1616 and 1618 according to predetermined criteria. A certain amount of overlap may be provided between the reflector view regions.

Detector 1600 preferably includes a housing 1620 and a base 1622 arranged to be mounted on a ceiling 1624 such that the base 1622 is flush with the ceiling. It is a particular feature of the present invention that housing 1620 is preferably formed with four elongate apertures, respectively designated by reference numerals 1632, 1634, 1636 and 1638, suitably aligned with respective multi-segment reflectors 1602, 1604, 1606 and 1608. A window is typically disposed adjacent each of apertures 1632, 1634, 1636 and 1638. The windows are preferably made of a thin material transparent to IR radiation, such as HDPE, Silicon, Germanium or any other suitable material. The windows are preferably flat windows, but, alternatively, windows having a circular cross section may be used.

Detector 1600 preferably comprises a single pyroelectric sensor 1640 which receives radiation from reflector view regions 1612, 1614, 1616 and 1618 via elongate apertures 1632, 1634, 1636 and 1638 and multi-segment reflectors 1602, 1604, 1606 and 1608 which focus the radiation onto sensor 1640 via at least one intermediate reflective surface 1650, which is preferably a hyperboloid surface.

It is a particular feature of the embodiment of FIGS. 30-32B that narrow, slit type common apertures 1632, 1634, 1636 and 1638 are provided. It is appreciated that all of the zones in each zone layer defined by the various mirror segments in each multi-segment mirror, such as segments 1690, 1692, 1694 and 1696 of a layer 1698 of reflective surface 1602 shown with particular clarity in FIG. 32, are positioned so that they intersect generally at one location centered at the aperture. Preferably, the aperture is designed to frame the location as closely as possible without obstructing the zones. A relatively narrow area surrounds the location of intersection, ensuring that the housing surrounding the aperture does not obscure the zones.

The advantages of the use of a narrow aperture housing structure are described hereinabove with reference to the embodiments shown in FIGS. 12-17.

In a preferred embodiment of the invention, such as that shown in FIGS. 30-32B, pyroelectric sensor 1640 comprises a dual element pyroelectric sensor, such as an LHi-968, which is commercially available from Perkin-Elmer of Freemont, Calif., USA.

In an alternative embodiment, one of the two sensing elements in pyroelectric dual-element sensor 1640 is covered. In this arrangement, pyroelectric sensor 1640 employs a single pyroelectric sensing element and may employ the covered sensing element for thermal compensation as is known in the art.

As another alternative, instead of using a dual element pyroelectric sensor and covering one element, a single element pyroelectric sensor may be used, such as SSAC10-11, commercially available from Nippon Ceramics Co. of Japan. Any other sensors suitable for ceiling mount detectors can be used.

A peripheral guard element (not shown) may be formed surrounding windows formed adjacent each of apertures 1632, 1634, 1636 and 1638 to provide enhanced protection thereto. The small aperture, typically covered by a small window, additionally may serve as a radiation filter, allowing only radiation of a certain wavelength range, such as IR radiation, to pass therethrough. The relatively narrow, small sized window reduces the cost of the filter. Furthermore, it is easier to apply anti-masking measures to protect a narrow window, than to protect a wide window.

Figure 33:
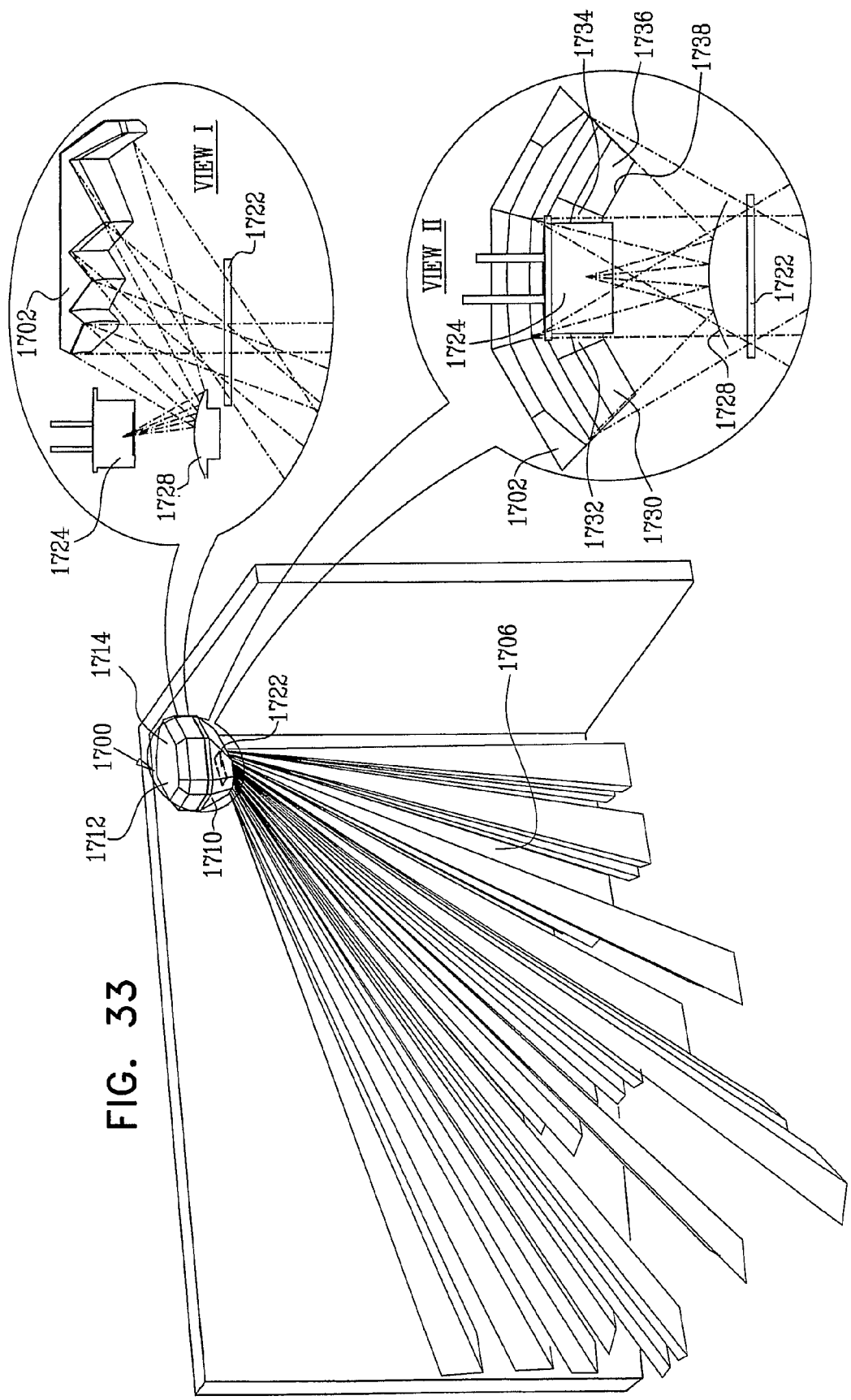
FIG. 33 is a simplified sectional illustration of a detector constructed and operative in accordance with a still further preferred embodiment of the present invention.

Reference is now made to FIG. 33, which is a simplified sectional illustration of a detector constructed and operative in accordance with a still further preferred embodiment of the present invention.

As seen in FIG. 33, there is provided a ceiling corner detector 1700 which preferably comprises a single multi-segment reflector 1702 having a field-of-view region 1706 viewing an entire room in which the detector 1700 is placed. As can be readily seen in FIG. 33, the field-of-view region 1706 includes multiple zones which are arranged in plural layers.

Detector 1700 is operative to indicate when an intruder passes through field-of-view 1706 according to predetermined criteria.

Detector 1700 preferably includes a housing 1710 and a base 1712 arranged to be mounted at the corner 1714 of a ceiling such that the base 1712 is flush with the ceiling. It is a particular feature of the present invention that housing 1710 is preferably formed with an elongate aperture 1722, suitably aligned with multi-segment reflector 1702.

Detector 1700 preferably comprises a single pyroelectric sensor 1724, which receives radiation from the field-of-view region 1706 via elongate aperture 1722 and multi-segment reflector 1702 which focuses the radiation onto sensor 1724 via an intermediate reflective surface 1728, which is preferably a hyperboloid surface.

It is a particular feature of the embodiment of FIG. 33 that common elongate aperture 1722 is provided. It is appreciated that all of the zones in each zone layer defined by the various mirror segments in multi-segment reflective surface such as segments 1730, 1732, 1734 and 1736 of layer 1738, shown with particular clarity in view II of FIG. 33, are positioned so that they intersect generally at one location centered at the aperture. Preferably, the aperture is designed to frame the location as closely as possible without obstructing the zones. A relatively narrow area surrounds the location of intersection, ensuring that the housing surrounding the aperture does not obscure the zones.

The advantages of the use of a narrow aperture housing structure are described hereinabove with reference to the embodiments shown in FIGS. 12-17.

In a preferred embodiment of the invention, such as that shown in FIG. 33, the pyroelectric sensors 1724 comprises a dual element pyroelectric sensor, such as an LHi-968, which is commercially available from Perkin-Elmer of Freemont, Calif., USA.

Figure 36A:
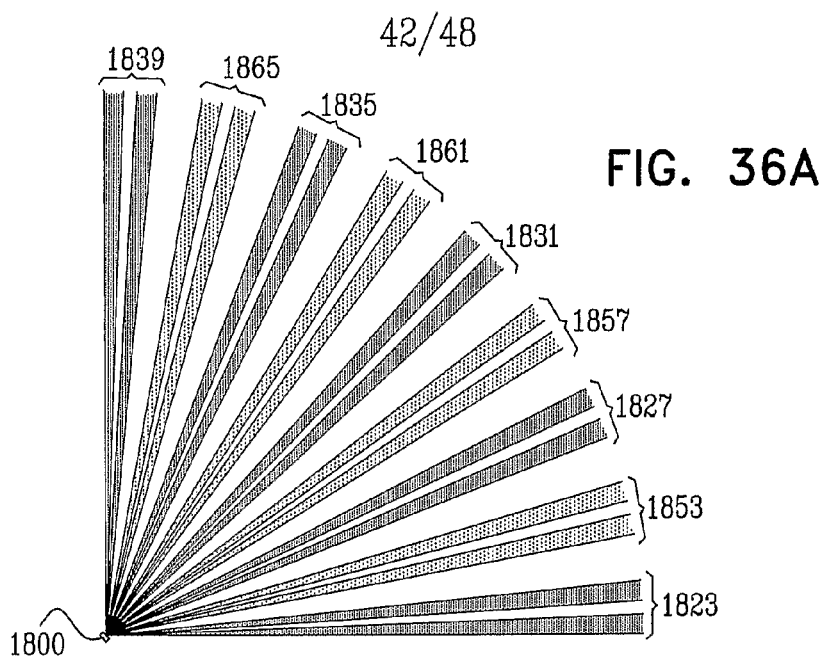
FIGS. 36A and 36B are respectively, a top view illustration and a side view illustration of a radiation pattern received by the detector assembly of FIG. 34.
Figure 36B:
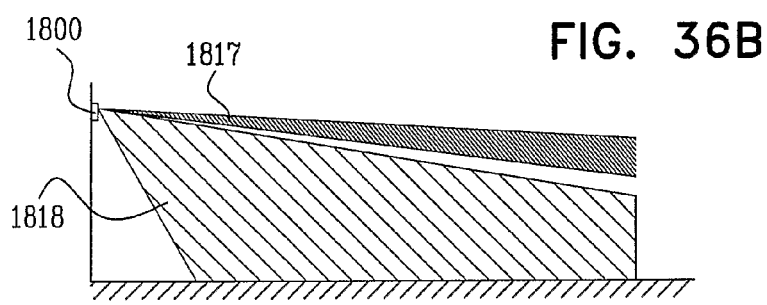
Figure 37:
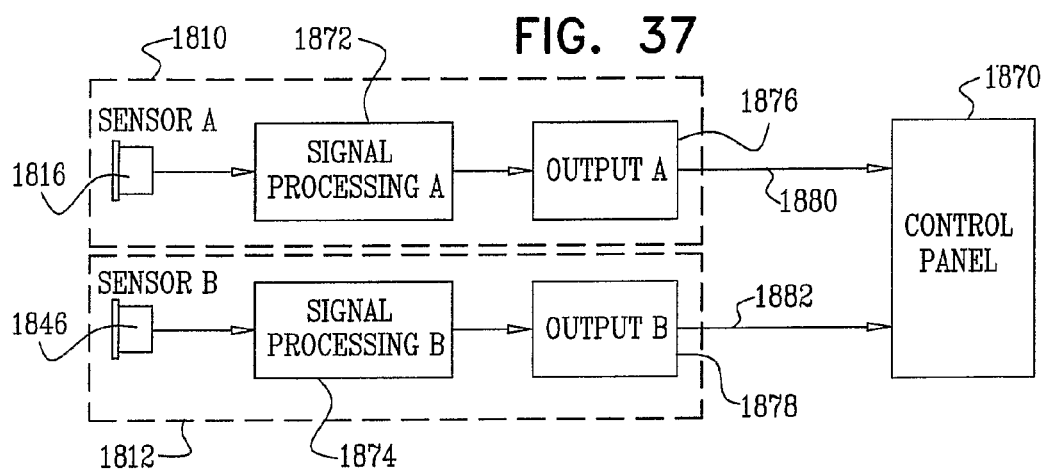
FIG. 37 is a simplified block diagram of the detector assembly of FIG. 34.

Reference is now made to FIG. 34, which is a pictorial illustration of a detector assembly constructed in accordance with yet another preferred embodiment of the present invention, to FIGS. 35A and 35B, which are respective sectional illustrations thereof, to FIGS. 36A and 36B, which are respectively, a top view illustration and a side view illustration of a radiation pattern received by the detector assembly of FIG. 34, and to FIG. 37, which is a block diagram of the detector assembly of FIG. 34.

Specifically, FIG. 34 is a general view of a detector assembly 1800 comprising two detectors 1810 and 1812 in a single housing element 1814, each detector including a pyroelectric sensor associated with one or more corresponding lens segment, defining a corresponding detection region, including a plurality of detection zones. The zones of each of the two detection regions are not overlapping.

As seen in FIGS. 34 to 37, the detectors are arranged so that each of detectors 1810 and 1812 is exclusively associated with different lens segments.

In the illustrated embodiment, a sensor 1816 of detector 1810 is associated with five pairs of lens segments, each pair defining two vertically distributed detection zones, indicated by reference numerals 1817 and 1818 which are shown with particular clarity in FIG. 36B. Preferably, vertical detection zone 1817 is a beam-shaped detection zone and vertical detection zone 1818 is a curtain-like detection zone. The zones defined by the pairs of lens segments are azimuthally distributed. Lens segments 1820 and 1822 define a pair of detection zones 1823. In a similar manner, lens segments 1824 and 1826 define a pair of detection zones 1827, lens segments 1828 and 1830 define a pair of detection zones 1831, lens segments 1832 and 1834 define a pair of detection zones 1835 and lens segments 1836 and 1838 define a pair of detection zones 1839.

As shown in FIG. 34, the lens segments 1820 and 1822, 1824 and 1826, 1828 and 1830, 1832 and 1834 and 1836 and 1838 are preferably arranged in a convex arrangement along a circular arc, in two rows. The lens segments 1820, 1824, 1828, 1832 and 1836 are preferably Fresnel lenses, while the lens segments 1822, 1826, 1830, 1834 and 1838 are preferably cylindrical type lenses. Any other suitable type of lens elements, such as, for example, diffractive lenses, and any suitable arrangement thereof, may be employed.

A sensor 1846, forming part of detector 1812, is associated with four pairs of lens segments, each pair defining two vertically distributed detection zones, similar to detection zones 1817 and 1818 (FIG. 36B). The zones defined by the pairs of lens segments are azimuthally distributed. Lens segments 1850 and 1852 define a pair of detection zones 1853. In a similar manner lens segments 1854 and 1856 define a pair of detection zones 1857, lens segments 1858 and 1860 define a pair of detection zones 1861 and lens segments 1862 and 1864 define a pair of detection zones 1865.

As shown in FIG. 34, the lens segments 1850 and 1852, 1854 and 1856, 1858 and 1860 and 1862 and 1864 are preferably arranged in a convex arrangement along a circular arc, in two rows. The lens segments 1850, 1854, 1858 and 1862 are preferably Fresnel lenses, while the lens segments 1852, 1856, 1860 and 1864 are preferably cylindrical type lenses. Any other suitable type of lens elements, such as, for example, diffractive lenses, and any suitable arrangement thereof, may be employed.

It is a particular feature of the present invention that the optical centers of lens segments 1850 and 1852 are located azimuthally between the optical centers of lens segments 1820 and 1824, as indicated by a dashed line in FIG. 34. In a similar manner, the optical centers of lens segments 1854 and 1856 are located azimuthally between the optical centers of lens segments 1824 and 1828, the optical centers of lens segments 1858 and 1860 are located azimuthally between the optical centers of lens segments 1828 and 1832 and the optical centers of lens segments 1862 and 1864 are located azimuthally between the optical centers of lens segments 1832 and 1836. As shown with particular clarity in FIGS. 34, 35A and 35B, the optical axes of detection zones 1823, 1827, 1831, 1835 and 1839, shown in FIG. 35A, are interlaced with the optical axes of detection zones 1853, 1857, 1861 and 1865, shown in FIG. 35B.

As seen with particular clarity in FIG. 36A, each of the detectors 1810 and 1812 has a plurality of azimuthally distributed detection zones. In accordance with a preferred embodiment of the present invention, the azimuthally distributed detection zones 1823, 1827, 1831, 1835 and 1839 of detector 1810 are non-overlapping with the azimuthally distributed detection zones 1853, 1857, 1861 and 1865 of detector 1812. Additionally, the detection zones 1823, 1827, 1831, 1835 and 1839 of detector 1810 are azimuthally interlaced with detection zones 1853, 1857, 1861 and 1865 of detector 1812 in a pattern such that interference confined to one detection zone of one of detectors 1810 and 1812 is not sensed by an adjacent detection zone of the other of detectors 1810 and 1812.

It is appreciated that detector assembly 1800 may be formed with any suitable detection zone pattern having interlaced detection zones which do not overlap. For example, each of the detection zones of detectors 1810 and 1812 may include four detection zone fingers, or any other suitable number of detection zone fingers.

As seen with particular clarity in FIGS. 36A and 36B, it is a particular feature of the present invention that the detectors 1810 and 1812 provide coverage over generally the same azimuthal detection region.

As seen with particular clarity in FIG. 36A, it is a particular feature of the present invention that some individual detection zones of detector 1810 are each located intermediate a pair of individual detection zones of detector 1812, and individual detection zones of detector 1812 are each located intermediate a pair of individual detection zones of detector 1810. The detection zones of detectors 1810 and 1812 are interlaced at least at a central portion of the azimuthal detection region.

Each of the detectors 1810 and 1812 comprises independent signal processing circuitry 1872 and 1874 which provides a separate independent detector output to an external alarm control panel 1870, preferably by separate output relays 1876 and 1878, and separate connecting wires 1880 and 1882 respectively. Output relays 1876 and 1878 may be wired, or may alternatively be wireless output transmitters.

The detectors 1810 and 1812 may provide detection output signals separately to alarm control panel 1870.

Figure 38:
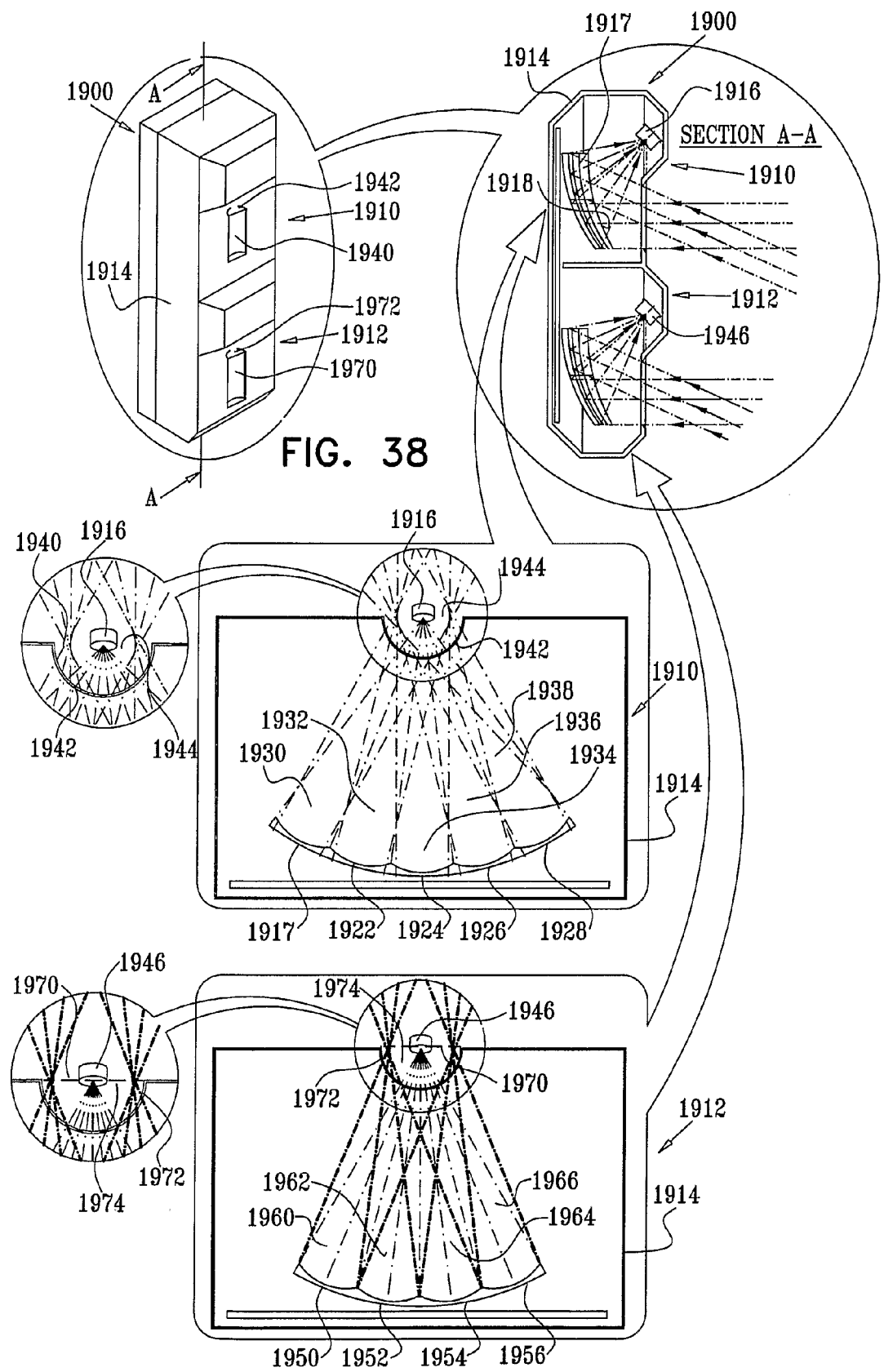
FIG. 38 is a simplified pictorial illustration of a detector assembly constructed in accordance with still another preferred embodiment of the present invention.
Figure 39A:
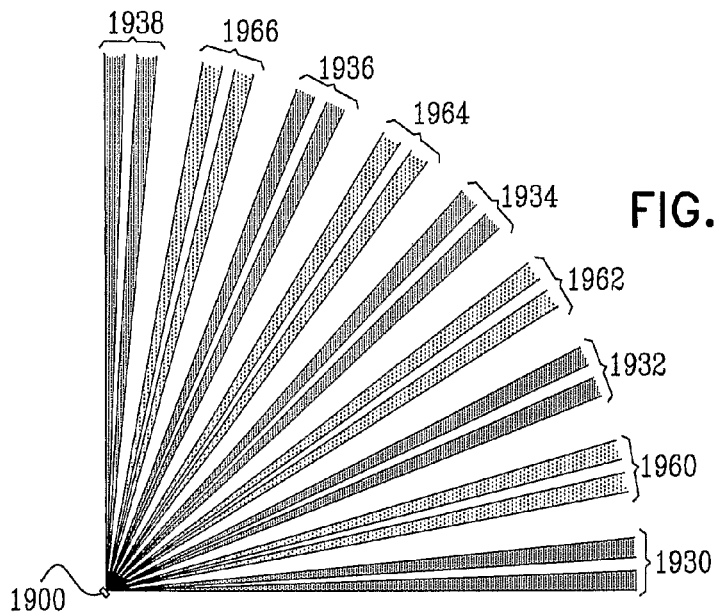
FIGS. 39A and 39B are respectively, a top view illustration and a side view illustration of a radiation pattern received by the detector assembly of FIG. 38.
Figure 39B:
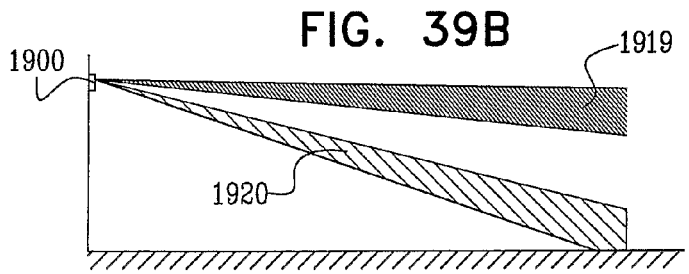
Figure 40:
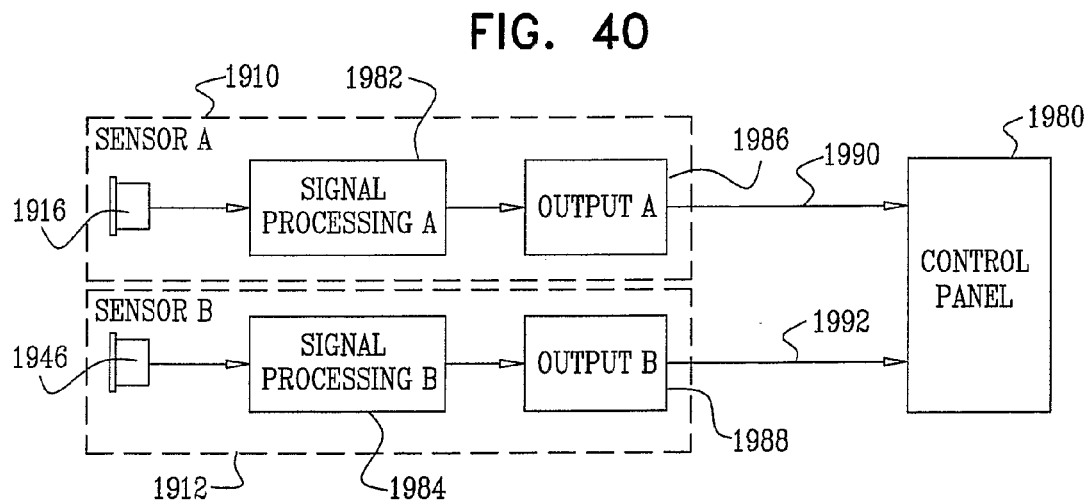
FIG. 40 is a simplified block diagram of the detector assembly of FIG. 38.

Reference is now made to FIG. 38, which is a pictorial illustration of a detector assembly constructed in accordance with still another preferred embodiment of the present invention, to FIGS. 39A and 39B, which are respectively, a top view illustration and a side view illustration of a radiation pattern received by the detector assembly of FIG. 38, and to FIG. 40, which is a block diagram of the detector assembly of FIG. 38.

Specifically, FIG. 38 is a general view of a detector assembly 1900 comprising two detectors 1910 and 1912 in a single housing element 1914, each detector including a pyroelectric sensor associated with corresponding mirror segment, defining a corresponding detection region, including a plurality of detection zones. The zones of each of the two detection regions are not overlapping.

As seen in FIGS. 38 to 40, the detectors are arranged so that each of detectors 1910 and 1912 is exclusively associated with different mirror segments.

In the illustrated embodiment, a sensor 1916 of detector 1910 is associated with five pairs of mirror segments, one of which is indicated by reference numerals 1917 and 1918 in Section A-A of FIG. 38, each pair defining two vertically distributed detection zones, indicated by reference numerals 1919 and 1920 which are shown with particular clarity in FIG. 39B. The zones defined by the pairs of mirror segments are azimuthally distributed as shown in FIG. 39A. The five pairs of mirror segments, indicated by reference numerals 1917, 1922, 1924, 1926 and 1928 define respective detection zones indicated by reference numerals 1930, 1932, 1934, 1936 and 1938.

As shown in FIG. 38, the housing element 1914 defines a top relatively narrow slit aperture 1940 adjacent which is preferably located a window 1942, preferably having a circular cross-section with its center generally at a location 1944 at the center of aperture 1940. Window 1942 preferably is made of a thin material transparent to IR radiation, such as HDPE, Silicon, Germanium or any other suitable material. Alternatively, other appropriate window shapes may be used.

A substantial advantage of the use of a window 1942 having a circular cross section is that such a window provides generally the same radiation attenuation at side zones and at a center zone. In contrast, were a flat window to be placed at the aperture, it would provide greater attenuation at side zones than at a center zone.

A sensor 1946, forming part of detector 1912, is associated with four pairs of mirror segments, each pair defining two vertically distributed detection zones, similar to detection zones 1917 and 1918 (FIG. 39B). The zones defined by the pairs of mirror segments are azimuthally distributed. The four pairs of mirror segments, indicated by reference numerals 1950, 1952, 1954 and 1956 define respective detection zones indicated by reference numerals 1960, 1962, 1964 and 1966.

As shown in FIG. 38, the housing element 1914 defines a bottom relatively narrow slit aperture 1970 adjacent which is preferably located a common window 1972, preferably having a circular cross-section with its center generally at a location 1974 at the center of aperture 1970. Window 1972 preferably is made of a thin material transparent to IR radiation, such as HDPE, Silicon, Germanium or any other suitable material. Alternatively, other appropriate window shapes may be used.

A substantial advantage of the use of a window 1972 having a circular cross section is that such a window provides generally the same radiation attenuation at side zones and at a center zone. In contrast, were a flat window to be placed at the aperture, it would provide greater attenuation at side zones than at a center zone.

It is a particular feature of the embodiment of FIGS. 38 to 40 that narrow, slit type apertures 1940 and 1970 are provided. It is appreciated that all of the zones defined by each single horizontal layer of the mirror segments of detector 1910 are positioned so that they intersect generally at one location centered at location 1944. Preferably, aperture 1940 is designed to frame location 1944 as closely as possible without obstructing the zones. A relatively narrow area surrounds location 1944, just large enough to ensure that the housing surrounding aperture 1940 does not obscure the zones. In a similar manner, all of the zones defined by each single horizontal layer of the mirror segments of detector 1912 are positioned so that they intersect generally at one location centered at location 1974. Preferably, aperture 1970 is designed to frame location 1974 as closely as possible without obstructing the zones. A relatively narrow area surrounds location 1974, just large enough to ensure that the housing surrounding aperture 1970 does not obscure the zones.

The advantages of the use of a narrow aperture housing structure are described hereinabove with reference to the embodiments of FIGS. 12-17.

Sensors 1916 and 1946 preferably comprise dual element pyroelectric sensors such as LHi-968 sensors, commercially available from Perkin-Elmer of Freemont, Calif., USA.

As seen with particular clarity in FIG. 39A, each of the detectors 1910 and 1912 has a plurality of azimuthally distributed detection zones. In accordance with a preferred embodiment of the present invention, the azimuthally distributed detection zones 1930, 1932, 1934, 1936 and 1938 of detector 1910 are non-overlapping with the azimuthally distributed detection zones 1960, 1962, 1964 and 1966 of detector 1912. Additionally, the detection zones 1930, 1932, 1934, 1936 and 1938 of detector 1910 are azimuthally interlaced with detection zones 1960, 1962, 1964 and 1966 of detector 1912 in a pattern such that interference confined to one detection zone of one of detectors 1910 and 1912 is not sensed by an adjacent detection zone of the other of detectors 1910 and 1912.

It is appreciated that detector assembly 1900 may be formed with any suitable detection zone pattern having interlaced detection zones which do not overlap. For example, each of the detection zones of detectors 1910 and 1912 may include four detection zone fingers, or any other suitable number of detection zone fingers.

As seen with particular clarity in FIGS. 39A and 39B, it is a particular feature of the present invention that the detectors 1910 and 1912 provide coverage over generally the same azimuthal detection region.

As seen with particular clarity in FIG. 39A, it is a particular feature of the present invention that some individual detection zones of detector 1910 are each located intermediate a pair of individual detection zones of detector 1912, and individual detection zones of detector 1912 are each located intermediate a pair of individual detection zones of detector 1910. The detection zones of detectors 1910 and 1912 are interlaced at least at a central portion of the azimuthal detection region.

Each of the detectors 1910 and 1912 provides a separate detector output to an external alarm control panel 1980, preferably by processing detections using separate signal processing assemblies 1982 and 1984 and providing output via separate output relays 1986 and 1988 and separate connecting wires 1990 and 1992, respectively. Output relays 1986 and 1988 may be wired, or may alternatively be wireless output transmitters.

The detectors 1910 and 1912 may provide detection output signals separately to alarm control panel 1980.

Figure 41:
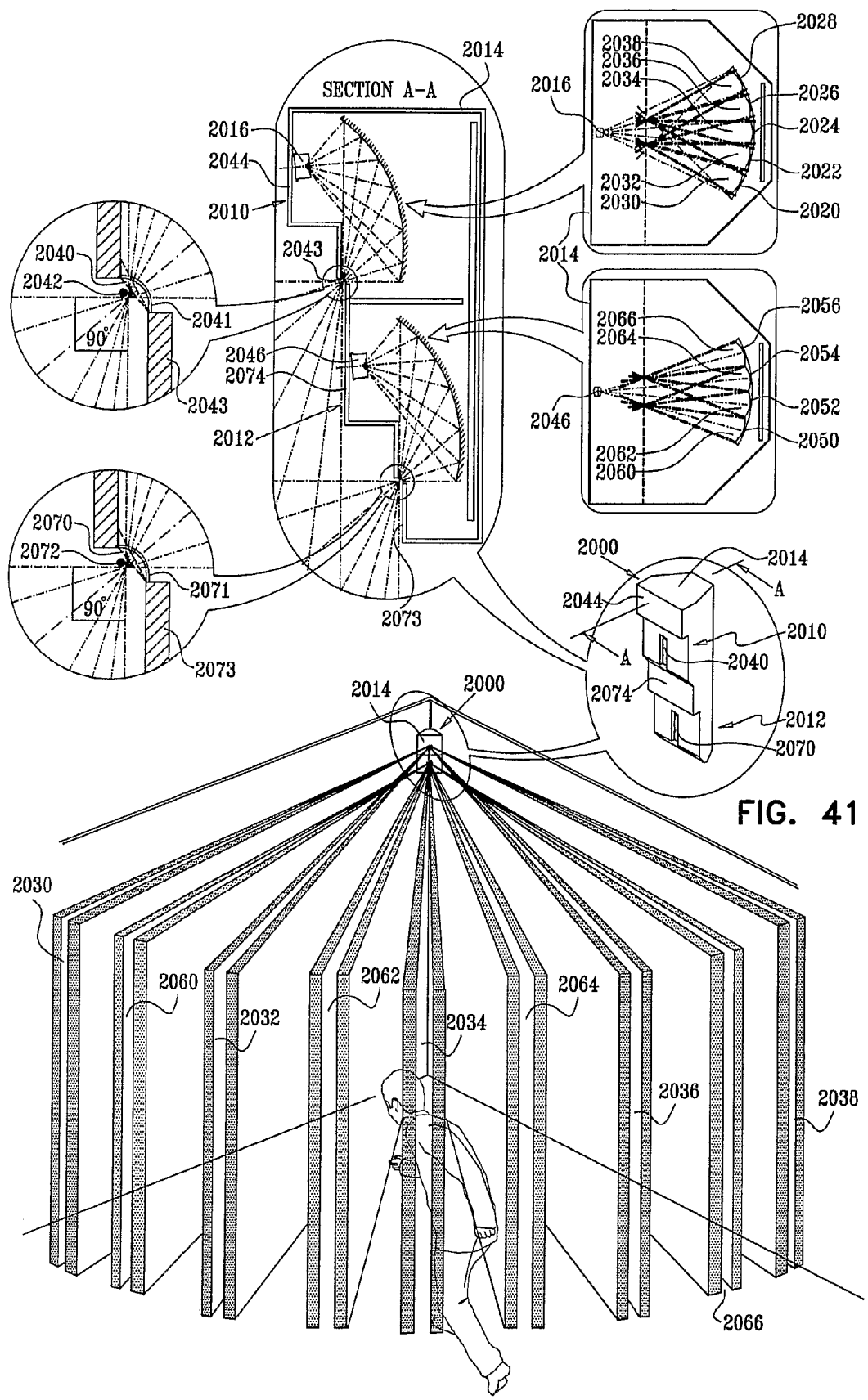
FIG. 41 is a simplified pictorial illustration of a detector assembly constructed in accordance with a still further preferred embodiment of the present invention.

Reference is now made to FIG. 41, which is a pictorial illustration of a detector assembly 2000 constructed in accordance with a further preferred embodiment of the present invention, to FIGS. 42A and 42B, which are respectively, a top view illustration and a side view illustration of a radiation pattern received by the detector assembly of FIG. 41, and to FIG. 43, which is a block diagram of the detector assembly of FIG. 41.

Specifically, FIG. 41 is a general view of a detector assembly 2000 comprising two detectors 2010 and 2012 in a single housing element 2014, each detector including a pyroelectric sensor associated with a corresponding mirror segment, defining a corresponding detection region, including a plurality of curtain-like detection zones. The zones of each of the two detection regions are not overlapping. The mirror segments of each of detectors 2010 and 2012 are arranged in a mutually concave arrangement. The curtain-like detection zones preferably generally extend through 90 degrees from the vertical to the horizontal and diverge generally through 90 degrees.

As seen in FIGS. 41 to 43, the detectors are arranged so that each of detectors 2010 and 2012 is exclusively associated with different mirror segments.

In the illustrated embodiment, a sensor 2016 of detector 2010 is associated with five mirror segments, each defining a single vertically distributed curtain-like detection zone indicated by reference numeral 2018 which is shown with particular clarity in FIG. 42B. The zones defined by the mirror segments are azimuthally distributed. The five pairs of mirror segments, indicated by reference numerals 2020, 2022, 2024, 2026 and 2028, define respective detection zones indicated by reference numerals 2030, 2032, 2034, 2036 and 2038.

As shown in FIG. 41, the housing element 2014 preferably defines a top relatively narrow slit aperture 2040 adjacent which is preferably located a window 2041, preferably having a circular cross-section with its center generally at a location 2042 at the center of aperture 2040. The housing element 2014 preferably includes a top recessed housing panel 2043 disposed below window 2041 located at aperture 2040. The recess is provided so as not to interfere with passage of radiation into aperture 2040 in a generally vertical upward direction. Housing 2014 is preferably formed with a protruding top panel 2044 disposed above window 2041, adjacent which is disposed sensor 2016. Window 2041 preferably is made of a thin material transparent to IR radiation, such as HDPE, Silicon, Germanium or any other suitable material. Alternatively, other appropriate window shapes, such as a tire-like window shape, may be used.

A substantial advantage of the use of a window 2041 having a tire-like shape is that such a window provides generally the same radiation attenuation at side zones and at a center zone. In contrast, were a flat window or a window having a circular cross section to be placed at the aperture, it would provide greater attenuation at side zones than at a center zone.

A sensor 2046, forming part of detector 2012, is associated with four pairs of mirror segments, each defining a single vertically distributed curtain-like detection zone, similar to detection zone 2018 (FIG. 42B). The zones defined by the mirror segments are azimuthally distributed. The four mirror segments, indicated by reference numerals 2050, 2052, 2054 and 2056 define respective detection zones indicated by reference numerals 2060, 2062, 2064 and 2066.

As shown in FIG. 41, the housing element 2014 preferably defines a bottom relatively narrow slit aperture 2070 adjacent which is preferably located a window 2071, preferably having a circular cross-section with its center generally at a location 2072 at the center of aperture 2070. The housing element 2014 preferably includes a bottom recessed housing panel 2073 disposed below window 2071 located at aperture 2070. The recess is provided so as not to interfere with passage of radiation into aperture 2070 in a generally vertical upward direction. Housing 2014 is preferably formed with a protruding bottom panel 2074 disposed above window 2071, which generally protrudes to the extent of recessed panel 2043, in which is disposed sensor 2046. Window 2071 preferably is made of a thin material transparent to IR radiation, such as HDPE, Silicon, Germanium or any other suitable material. Alternatively, other appropriate window shapes, such as a tire-like window shape, may be used.

A substantial advantage of the use of a window 2071 having a tire-like shape is that such a window provides generally the same radiation attenuation at side zones and at a center zone. In contrast, were a flat window or a window having a circular cross section to be placed at the aperture, it would provide greater attenuation at side zones than at a center zone.

It is a particular feature of the embodiment of FIGS. 41 to 43 that narrow, slit type common apertures 2040 and 2070 are provided. It is appreciated that all of the zones defined by the mirror segments of detector 2010 are positioned so that they intersect generally at one location centered at location 2042. Preferably, aperture 2040 is designed to frame location 2042 as closely as possible without obstructing the zones. A relatively narrow area surrounds location 2042, just large enough to ensure that the housing surrounding aperture 2040 does not obscure the zones. In a similar manner, all of the zones defined by the mirror segments of detector 2012 are positioned so that they intersect generally at one location centered at location 2072. Preferably, aperture 2070 is designed to frame location 2072 as closely as possible without obstructing the zones. A relatively narrow area surrounds location 2072, just large enough to ensure that the housing surrounding aperture 2070 does not obscure the zones.

The advantages of the use of an extremely small aperture housing structure are even greater than those described hereinabove with reference to the embodiments of FIGS. 12-17 and 23-26, inasmuch as the aperture is nearly invisible from a distance and thus enables the detector to be effectively hidden from view.

Sensors 2016 and 2046 preferably comprise dual element pyroelectric sensors such as LHi-968 sensors, commercially available from Perkin-Elmer of Freemont, Calif., USA.

As seen with particular clarity in FIG. 42A, each of the detectors 2010 and 2012 has a plurality of azimuthally distributed detection zones. In accordance with a preferred embodiment of the present invention, the azimuthally distributed detection zones 2030, 2032, 2034, 2036 and 2038 of detector 2010 are non-overlapping with the azimuthally distributed detection zones 2060, 2062, 2064 and 2066 of detector 2012. Additionally, the detection zones 2030, 2032, 2034, 2036 and 2038 of detector 2010 are azimuthally interlaced with detection zones 2060, 2062, 2064 and 2066 of detector 2012 in a pattern such that interference confined to one detection zone of one of detectors 2010 and 2012 is not sensed by an adjacent detection zone of the other of detectors 2010 and 2012.

It is appreciated that detector assembly 2000 may be formed with any suitable detection zone pattern having interlaced detection zones which do not overlap. For example, each of the detection zones of detectors 2010 and 2012 may include four detection zone fingers, or any other suitable number of detection zone fingers.

As seen with particular clarity in FIGS. 42A and 42B, it is a particular feature of the present invention that the detectors 2010 and 2012 provide coverage over generally the same azimuthal detection region.

As seen with particular clarity in FIG. 42A, it is a particular feature of the present invention that some individual detection zones of detector 2010 are each located intermediate a pair of individual detection zones of detector 2012, and individual detection zones of detector 2012 are each located intermediate a pair of individual detection zones of detector 2010. The detection zones of detectors 2010 and 2012 are interlaced at least at a central portion of the azimuthal detection region.

Each of the detectors 2010 and 2012 provides a separate detector output to an external alarm control panel 2080, preferably by processing detections using separate signal processing assemblies 2082 and 2084 and providing output via separate output relays 2086 and 2088 and separate connecting wires 2090 and 2092, respectively. Output relays 2086 and 2088 may be wired, or may alternatively be wireless output transmitters.

The detectors 2010 and 2012 may provide detection output signals separately to alarm control panel 2080.

Figure 46A:
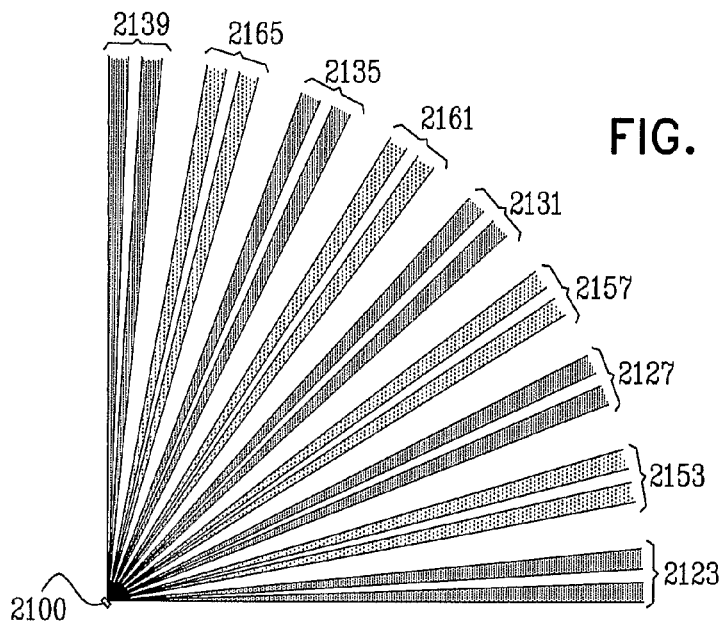
FIGS. 46A and 46B are respectively, a top view illustration and a side view illustration of a radiation pattern received by the detector assembly of FIG. 44.
Figure 46B:
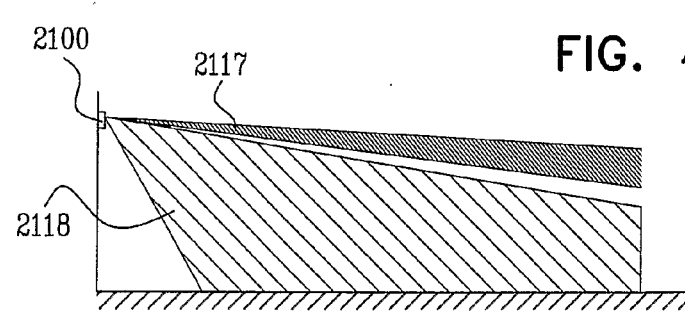
Figure 47:
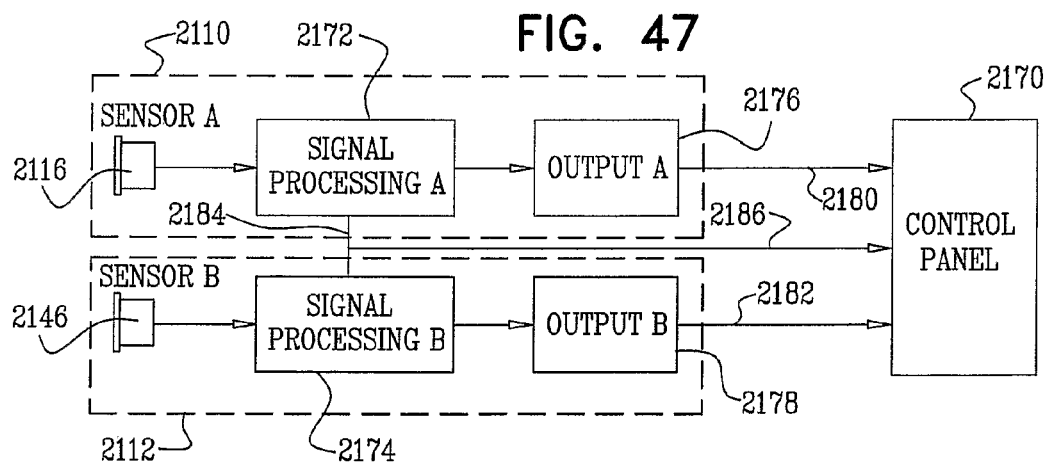
FIG. 47 is a simplified block diagram of the detector assembly of FIG. 44.

Reference is now made to FIG. 44, which is a pictorial illustration of a detector assembly constructed in accordance with still another preferred embodiment of the present invention, to FIGS. 45A and 45B, which are respective sectional illustrations thereof, to FIGS. 46A and 46B, which are respectively, a top view illustration and a side view illustration of a radiation pattern received by the detector assembly of FIG. 44, and to FIG. 47, which is a block diagram of the detector assembly of FIG. 44.

Specifically, FIG. 44 is a general view of a detector assembly 2100 comprising two detectors 2110 and 2112 in a single housing element 2114, each detector including a pyroelectric sensor associated with one or more corresponding lens segment, defining a corresponding detection region, including a plurality of detection zones. The zones of each of the two detection regions are not overlapping.

As seen in FIGS. 44 to 47, the detectors are arranged so that each of detectors 2110 and 2112 is exclusively associated with different lens segments.

In the illustrated embodiment, a sensor 2116 of detector 2110 is associated with five pairs of lens segments, each pair defining two vertically distributed detection zones, indicated by reference numerals 2117 and 2118 which are shown with particular clarity in FIG. 46B. Preferably, vertical detection zone 2117 is a beam-shaped detection zone and vertical detection zone 2118 is a curtain-like detection zone. The zones defined by the pairs of lens segments are azimuthally distributed. Lens segments 2120 and 2122 define a pair of detection zones 2123. In a similar manner, lens segments 2124 and 2126 define a pair of detection zones 2127, lens segments 2128 and 2130 define a pair of detection zones 2131, lens segments 2132 and 2134 define a pair of detection zones 2135 and lens segments 2136 and 2138 define a pair of detection zones 2139.

As shown in FIG. 44, the lens segments 2120 and 2122, 2124 and 2126, 2128 and 2130, 2132 and 2134 and 2136 and 2138 are preferably arranged in a convex arrangement along a circular arc, in two rows. The lens segments 2120, 2124, 2128, 2132 and 2136 are preferably Fresnel lenses, while the lens segments 2122, 2126, 2130, 2134 and 2138 are preferably cylindrical type lenses. Any other suitable type of lens elements, such as, for example, diffractive lenses, and any suitable arrangement thereof, may be employed.

A sensor 2146, forming part of detector 2112, is associated with four pairs of lens segments, each pair defining two vertically distributed detection zones, similar to detection zones 2117 and 2118 (FIG. 46B). The zones defined by the pairs of lens segments are azimuthally distributed. Lens segments 2150 and 2152 define a pair of detection zones 2153. In a similar manner lens segments 2154 and 2156 define a pair of detection zones 2157, lens segments 2158 and 2160 define a pair of detection zones 2161 and lens segments 2162 and 2164 define a pair of detection zones 2165.

As shown in FIG. 44, the lens segments 2150 and 2152, 2154 and 2156, 2158 and 2160 and 2162 and 2164 are preferably arranged in a convex arrangement along a circular arc, in two rows. The lens segments 2150, 2154, 2158 and 2162 are preferably Fresnel lenses, while the lens segments 2152, 2156, 2160 and 2164 are preferably cylindrical type lenses. Any other suitable type of lens elements, such as, for example, diffractive lenses, and any suitable arrangement thereof, may be employed.

It is a particular feature of the present invention that the optical centers of lens segments 2150 and 2152 are located azimuthally between the optical centers of lens segments 2120 and 2124, as indicated by a dashed line in FIG. 44. In a similar manner, the optical centers of lens segments 2154 and 2156 are located azimuthally between the optical centers of lens segments 2124 and 2128, the optical centers of lens segments 2158 and 2160 are located azimuthally between the optical centers of lens segments 2128 and 2132 and the optical centers of lens segments 2162 and 2164 are located azimuthally between the optical centers of lens segments 2132 and 2136. As shown with particular clarity in FIGS. 44, 45A and 45B, the optical axes of detection zones 2123, 2127, 2131, 2135 and 2139, shown in FIG. 45A, are interlaced with the optical axes of detection zones 2153, 2157, 2161 and 2165, shown in FIG. 45B.

As seen with particular clarity in FIG. 46A, each of the detectors 2110 and 2112 has a plurality of azimuthally distributed detection zones. In accordance with a preferred embodiment of the present invention, the azimuthally distributed detection zones 2123, 2127, 2131, 2135 and 2139 of detector 2110 are non-overlapping with the azimuthally distributed detection zones 2153, 2157, 2161 and 2165 of detector 2112. Additionally, the detection zones 2123, 2127, 2131, 2135 and 2139 of detector 2110 are azimuthally interlaced with detection zones 2153, 2157, 2161 and 2165 of detector 2112 in a pattern such that interference confined to one detection zone of one of detectors 2110 and 2112 is not sensed by an adjacent detection zone of the other of detectors 2110 and 2112.

It is appreciated that detector assembly 2100 may be formed with any suitable detection zone pattern having interlaced detection zones which do not overlap. For example, each of the detection zones of detectors 2110 and 2112 may include four detection zone fingers, or any other suitable number of detection zone fingers.

As seen with particular clarity in FIGS. 46A and 46B, it is a particular feature of the present invention that the detectors 2110 and 2112 provide coverage over generally the same azimuthal detection region.

As seen with particular clarity in FIG. 46A, it is a particular feature of the present invention that some individual detection zones of detector 2110 are each located intermediate a pair of individual detection zones of detector 2112, and individual detection zones of detector 2112 are each located intermediate a pair of individual detection zones of detector 2110. The detection zones of detectors 2110 and 2112 are interlaced at least at a central portion of the azimuthal detection region.

Each of the detectors 2110 and 2112 comprises signal processing circuitry 2172 and 2174 which provides a detector output to an external alarm control panel 2170, preferably by separate output relays 2176 and 2178, and separate connecting wires 2180 and 2182 respectively. Output relays 2176 and 2178 may be wired, or may alternatively be wireless output transmitters. The signal processing circuitry 2172 may be interconnected with the signal processing circuitry 2174, as indicated by a connection 2184.

Various alternative logic algorithms may be utilized by detectors 2110 and 2112 in determining when respective alarm outputs should be provided by output relays 2176 and 2178.

The detectors 2110 and 2112 may provide detection output signals separately to alarm control panel 2170.

In accordance with one embodiment of the present invention, each of the detectors 2110 and 2112 may separately provide detection output signals to alarm control panel 2170 only if the other of detectors 2110 and 2112 also senses motion within a predetermined time period. This logic helps prevent false alarms, as an alarm is not activated if the detection is limited to a single detector.

Alternatively or additionally, an alarm output may not be provided from one of detectors 2110 and 2112 to alarm control panel 2170 if a detection output signal is generated by the other of detectors 2110 and 2112 simultaneously, as simultaneous detection output signals generated simultaneously by both detectors 2110 and 2112 may indicate that the signals are generated due to interference occurring in the detection regions of both detectors and not due to motion of an intruder within the detection regions.

As a further alternative a multiple mode detector may be provided in which a user can select a mode in which detectors 2110 and 2112 may provide a common detection output signal to alarm control panel 2170. For example, if one of detectors 2110 and 2112 generates a motion detection signal, and within a predetermined time duration a motion detection signal is generated by the other of detectors 2110 and 2112, an alarm signal is initiated by the first of detectors 2110 and 2112 to generate a motion detection signal, and a confirmed common detection output signal may be provided to alarm control panel 2170 by a common output relay 2186 or by either of output relays 2176 and 2178.

Preferably, one or more conditions for initiation of an alarm signal to the control panel 2170 may be preset by the user, such as by setting one or more switches (not shown) within detector assembly 2100 to a desired alarm logic option.

It will be appreciated by persons skilled in the art that the present invention is not limited to what has been particularly shown and described hereinabove. Rather the scope of the present invention includes both combinations and subcombinations of the various features described hereinabove as well as modifications and variations thereof as would occur to a person of skill in the art upon reading the foregoing specification and which are not in the prior art.

The invention claimed is:

1. A passive infra-red detector comprising:
   at least two sub-detectors, each operative to receive infra-red radiation from a corresponding one of at least two sub fields-of-view; and
   signal processing circuitry, receiving output signals from said at least two sub-detectors and noting time relationships of said output signals from said at least two sub-detectors and providing a motion detection output in response to receipt of said output signals from said at least two sub-detectors, representing traversal of said at least two sub fields-of-view, having a time relationship which meets at least one predetermined criterion,
   at least one of said at least one predetermined criterion being traversal of said at least two sub fields-of-view in a first direction at least a predetermined time following traversal of said at least two sub fields-of-view in a second direction, generally opposite to said first direction.

2. A passive infra-red detector according to claim 1 and wherein said signal processing circuitry selectably provides at least one of a visual indication and an audible indication during said predetermined time.

3. A passive infra-red detector according to claim 2 and wherein said signal processing circuitry selectably provides both said visual indication and said audible indication during said predetermined time.

4. A passive infra-red detector according to claim 1 and wherein said predetermined time is defined by a user.

* * * * *